(12) United States Patent
Diebel

(10) Patent No.: US 11,582,341 B2
(45) Date of Patent: *Feb. 14, 2023

(54) CAMERA OPENING FOR SMARTPHONE CASE TO REDUCE FLASH GLARE

(71) Applicant: Incase Designs Corp., Irvine, CA (US)

(72) Inventor: Markus Diebel, San Francisco, CA (US)

(73) Assignee: Vinci Brands LLC, Tustin, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/950,903

(22) Filed: Nov. 17, 2020

(65) Prior Publication Data

US 2021/0075904 A1 Mar. 11, 2021

Related U.S. Application Data

(63) Continuation of application No. 16/397,821, filed on Apr. 29, 2019, now Pat. No. 10,841,417, which is a continuation of application No. 15/857,413, filed on Dec. 28, 2017, now Pat. No. 10,277,731, which is a continuation of application No. 15/097,212, filed on Apr. 12, 2016, now Pat. No. 9,866,676, which is a continuation of application No. 13/966,189, filed on Aug. 13, 2013, now Pat. No. 9,313,305, which is a continuation of application No. 13/894,329, filed on May 14, 2013, now Pat. No. 9,325,365, which is a continuation of application No. 13/622,904, filed on Sep. 19, 2012, now Pat. No. 8,442,604, which is a (Continued)

(51) Int. Cl.
*H04M 1/7246* (2021.01)
*G03B 17/02* (2021.01)
*G03B 17/56* (2021.01)
*H04M 1/02* (2006.01)
*H04B 1/3888* (2015.01)
*H04W 52/02* (2009.01)

(52) U.S. Cl.
CPC .......... *H04M 1/7246* (2021.01); *G03B 17/02* (2013.01); *G03B 17/56* (2013.01); *H04B 1/3888* (2013.01); *H04M 1/0264* (2013.01); *H04W 52/0296* (2013.01); *G03B 2215/0503* (2013.01); *Y02D 30/70* (2020.08)

(58) Field of Classification Search
CPC .. H04M 1/04; H04M 1/0264; H04M 1/72575; H04M 1/7246; H04W 52/0296; H04B 1/3883; H04B 1/3888; G03B 17/02; G03B 17/56; G03B 2215/0503; Y02D 30/70
USPC ......................... 455/575.8, 90.3, 575.1, 572
See application file for complete search history.

(56) References Cited

U.S. PATENT DOCUMENTS 8,442,604 B1 * 5/2013 Diebel .............. H04W 52/0296
455/575.8

* cited by examiner

*Primary Examiner* — John J Lee

(57) ABSTRACT

A case for portable electronic devices such as smartphones includes a feature to prevent glare from a flash from affecting images and video captured by a camera lens and also may include a battery to extend battery life of the electronic device. Smartphones have telephony, Internet connectivity, and camera and video features. Photos and video may be uploaded through the Internet or sent to other phones. The case has a hole for a camera flash of the smartphone. The edging of the hole is colored black or another dark color to prevent glare from appearing in the photos or video taken by the smartphone when using the camera flash.

10 Claims, 42 Drawing Sheets

Related U.S. Application Data continuation of application No. 13/185,200, filed on Jul. 18, 2011, now Pat. No. 8,509,864.

(60) Provisional application No. 61/365,302, filed on Jul. 16, 2010.

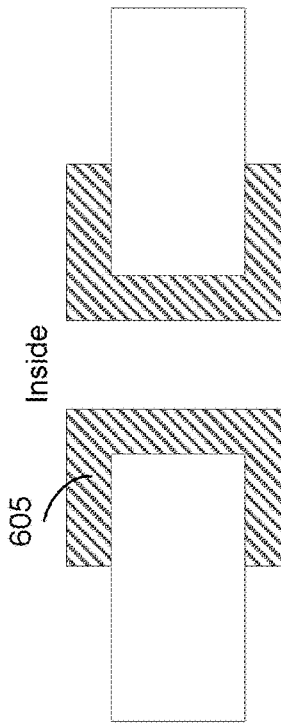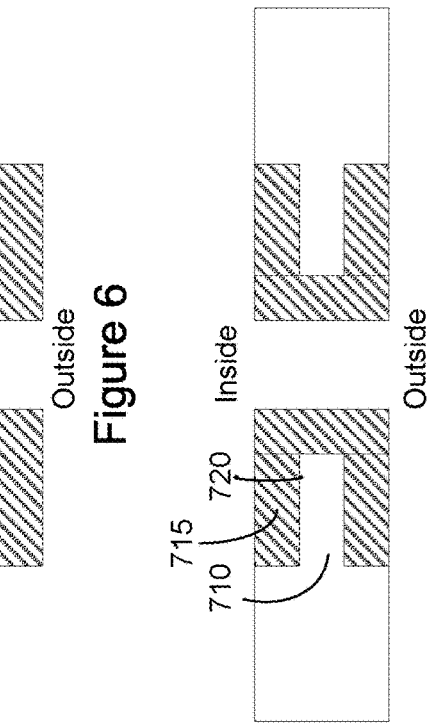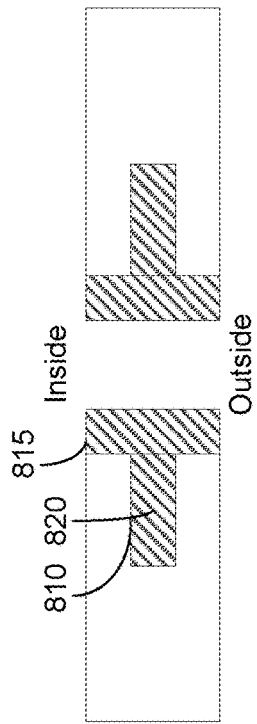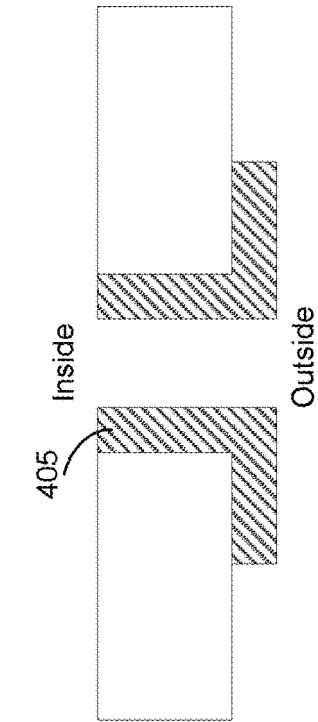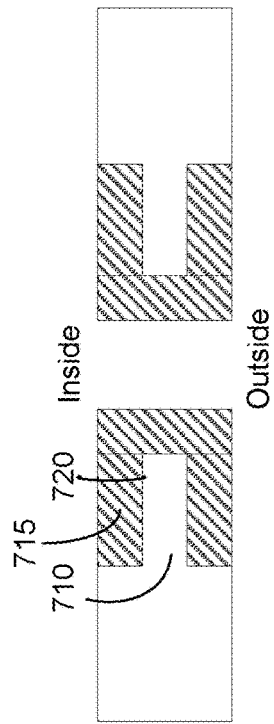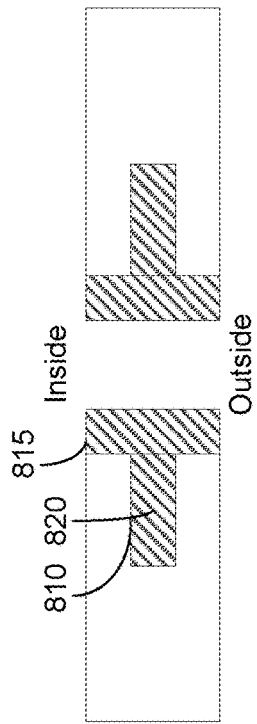

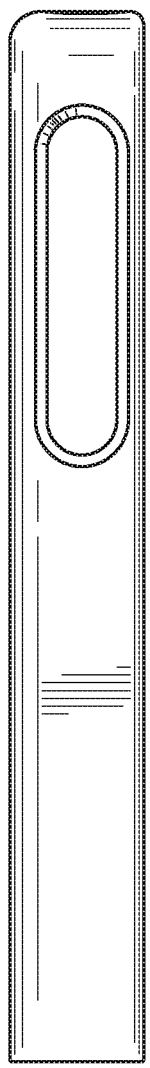
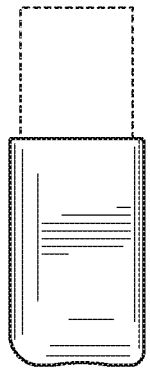
Figure 24
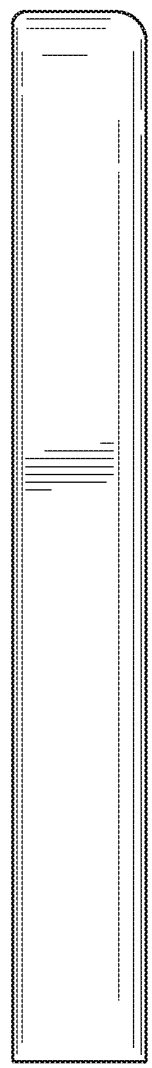
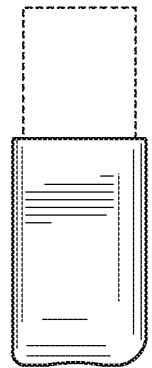
Figure 25

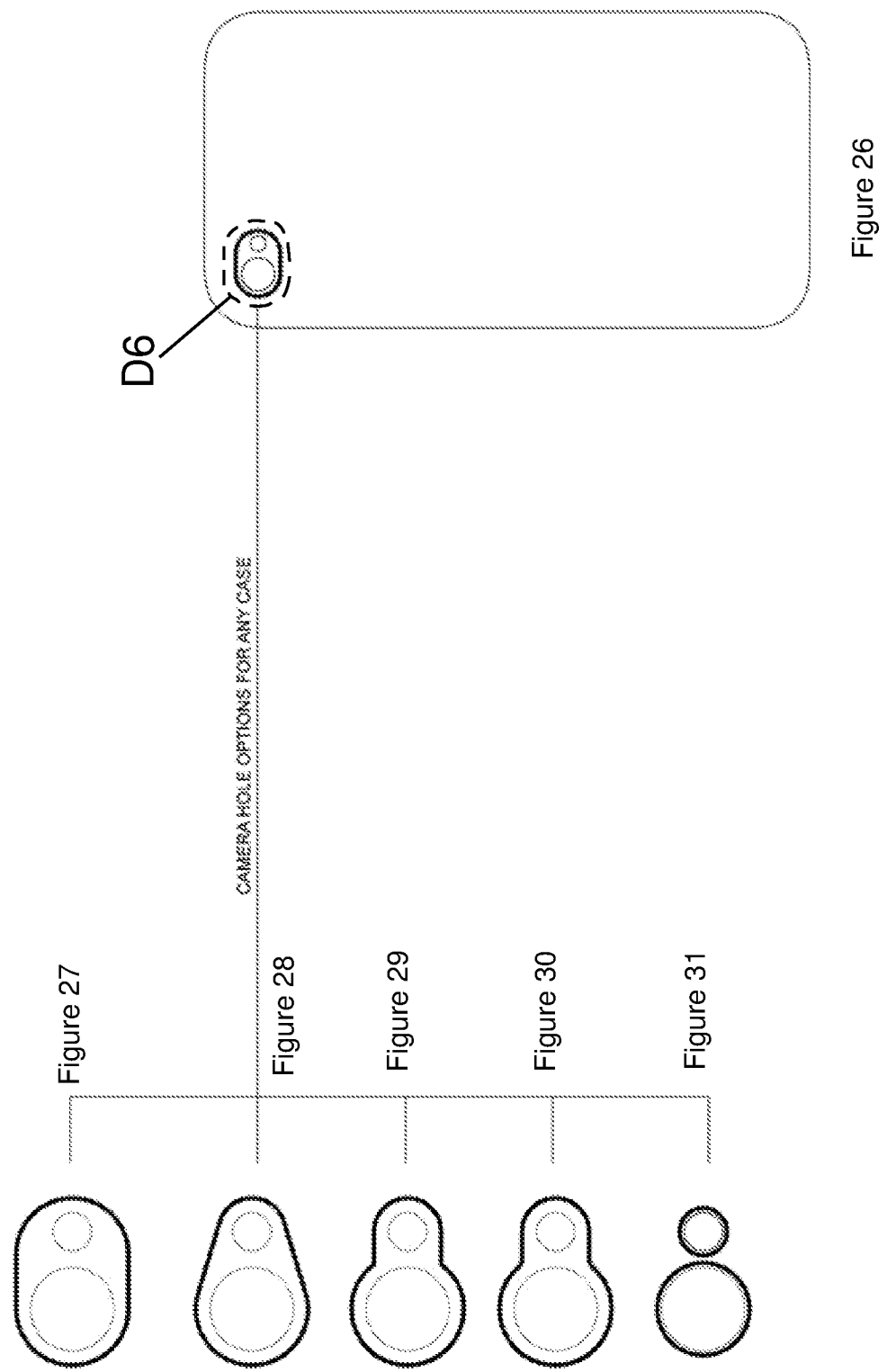

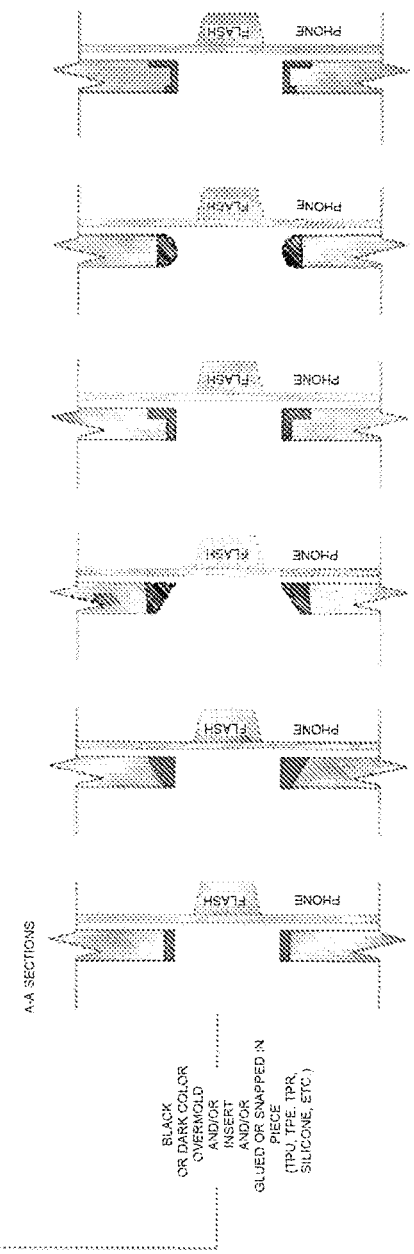
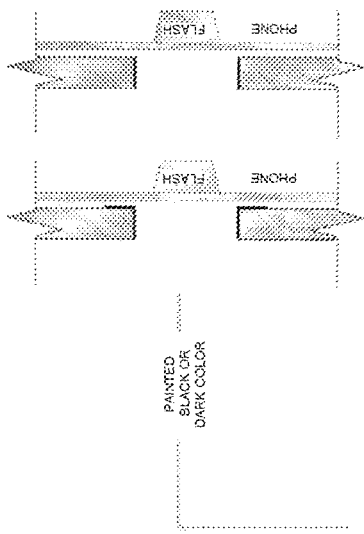
Figure 32

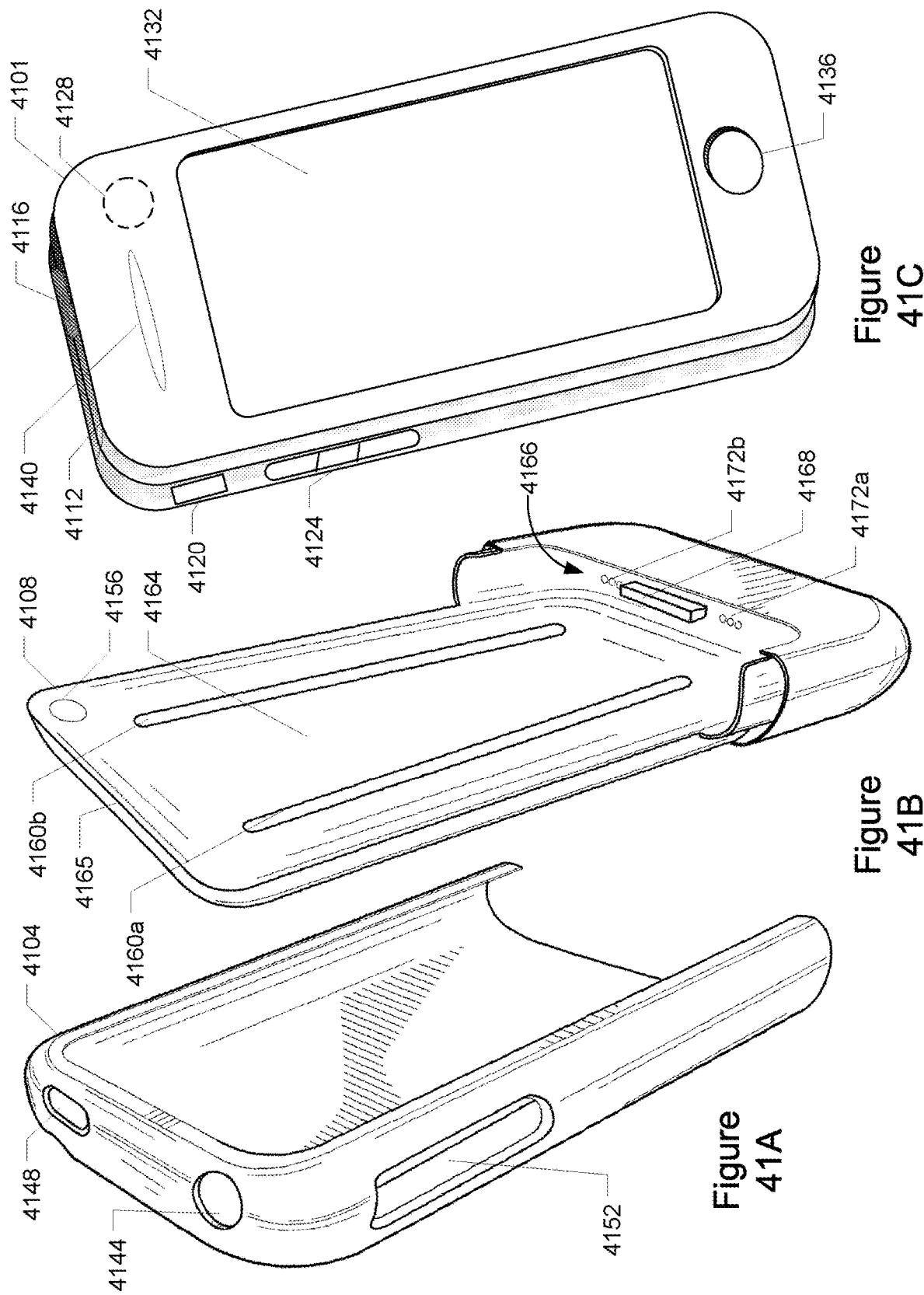

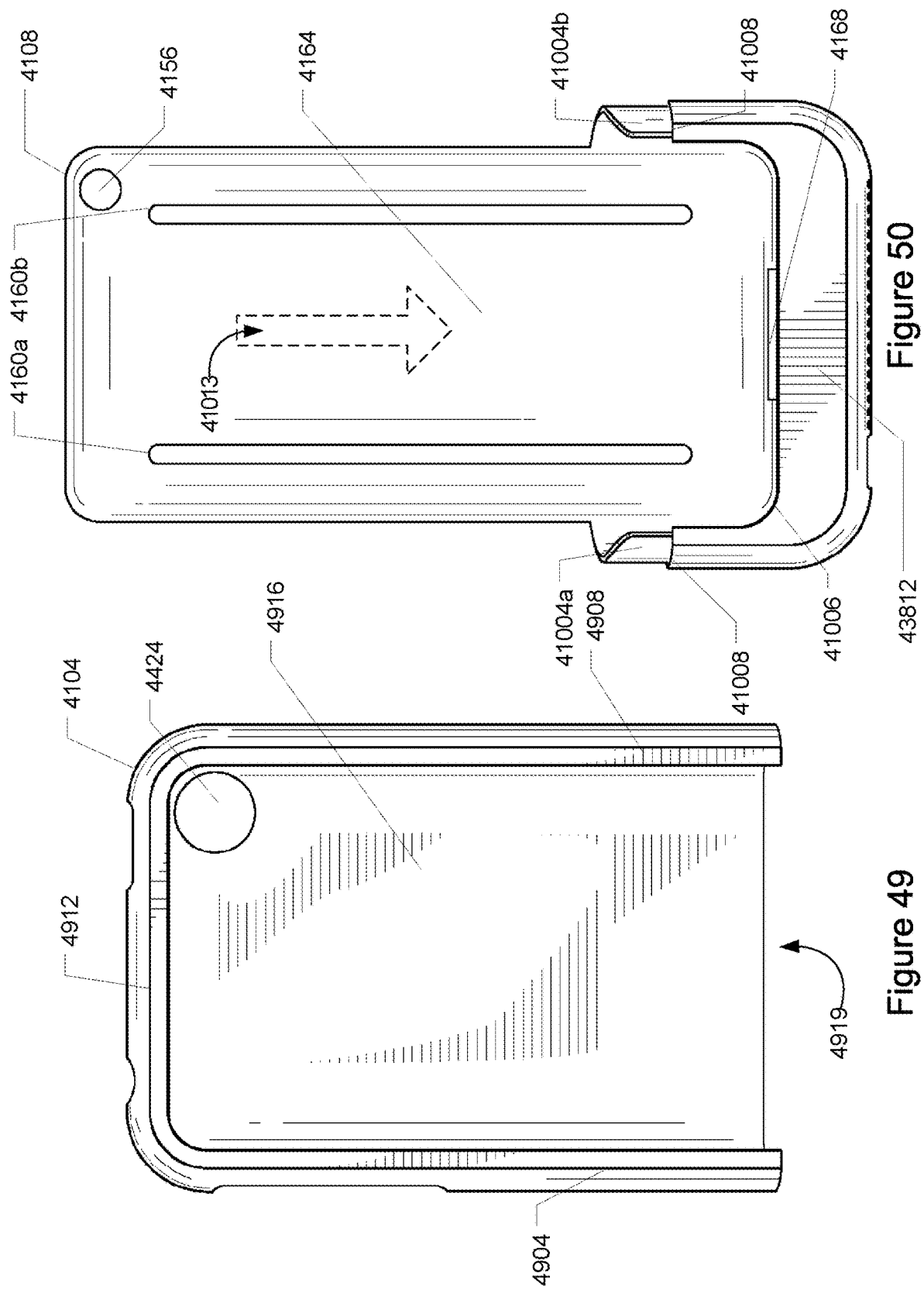

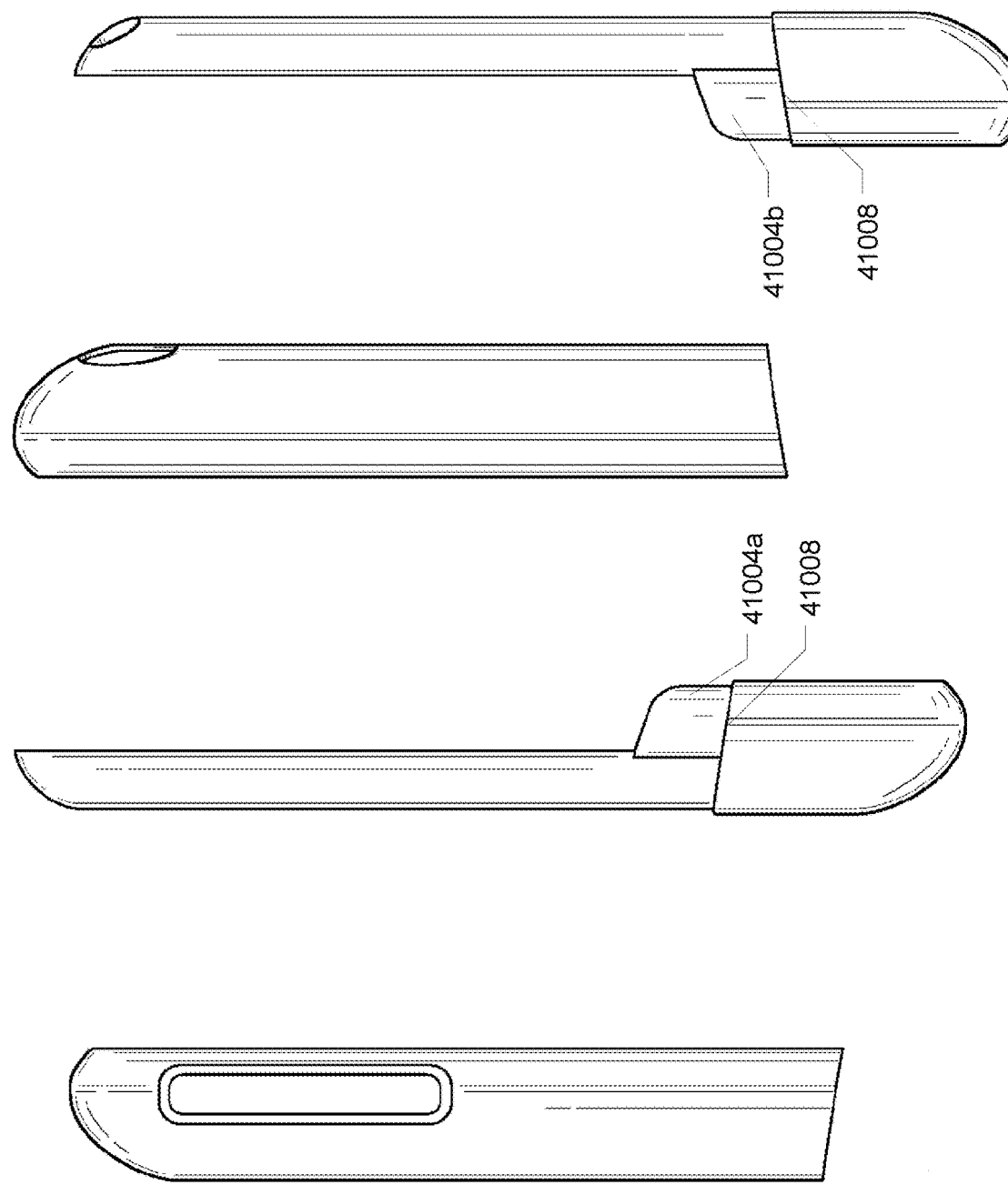

| Mode | Case USB Connector | Case Battery | Phone Battery | Case Status | Case Button | Case Indicator Lights | Phone Status |
|---|---|---|---|---|---|---|---|
| Power-Up | Connect to power | Charged | X (don't care) | | | 5th LED blinks once to indicate power is connected | Phone does not need to be in case, but if it is, phone status is normal |
| Charge Case Battery | Connect to power | Discharged | X (don't care) | Charge case battery until it is fully charged. Case battery charges phone battery (if discharged). | Push for fuel gauge; hold for sync mode | See fuel gauge and sync modes | Normal when phone battery is sufficiently charged |
| Fuel Gauge | X (don't care) | Charged | X (don't care) | | Push button to show battery level | 5 LEDs indicate charge level of case battery | Phone does not need to be in case, but if it is, phone status is normal |
| Charge Phone Battery | X (don't care) | Charged | Discharged | Case uses case battery to charge phone battery and top off as needed. If USB plug is connected to power, the case battery is charged. | Push for fuel gauge; hold for sync mode | See fuel gauge and sync modes | Normal after phone battery becomes sufficiently charged. If phone battery is completely discharged, it may take about 5 minutes to be sufficiently charged. Indicator on phone display may indicate charging. |
| Sleep Mode | Not connected | Completely Discharged | X (don't care) | Case is inactive. Battery display button and indicator lights do not function. Cannot enter sync mode and fuel gauge does not work. | Not functional | Not functional | Normal |

Figure 67

| Mode | Case USB Connector | Case Battery | Phone Battery | Case Status | Case Button | Case Indicator Lights | Phone Status |
|---|---|---|---|---|---|---|---|
| Extended Sleep Mode | Not connected | Charged | Phone not in case | Case will retain its battery power for a certain time period. To exit extended sleep mode: (1) put a phone in the case; (2) press case button (which activates fuel gauge); (3) connect case via cable to power source | Push button will exit extended sleep mode | Turned off | Phone is not in case |
| Initial Phone Connect | X (don't care) | Charged | Charged | | | | Normal; phone does not show a nag screen. |
| Sync | Connect to Computer | Charged | Charged | Upon entering sync mode, exit other modes (e.g., charging); connect phone and computer together through USB cable. Cable need not be connected to enter sync mode, but cable should be connected within 30 seconds, or case will automatically exit sync mode. | Push and hold button for 3 seconds to enter sync mode | 5th LED blinks continuously to indicate sync mode | Phone in sync mode (e.g., shows sync enabled on display). Phone may indicate not charging. |
| Exit Sync | Disconnecting cable will exit sync | Charged | Charged | To exit sync mode: (1) exits automatically after 30 seconds of inactivity; (2) disconnect cable; (3) press button (which activates fuel gauge). | Push button will exit sync | 5th LED turns off when sync mode exited | Phone exits sync mode and resumes normal operation |

Figure 68

CAMERA OPENING FOR SMARTPHONE CASE TO REDUCE FLASH GLARE

CROSS-REFERENCE TO RELATED APPLICATIONS

This application is a continuation of U.S. patent application Ser. No. 14/397,821, filed on Apr. 29, 2019, which is a continuation of U.S. patent application Ser. No. 15/857,413, filed on Dec. 28, 2017 and issued as U.S. Pat. No. 10,277,731 on Apr. 30, 2019, which is a continuation of U.S. patent application Ser. No. 15/097,212, filed on Apr. 12, 2016 and issued as U.S. Pat. No. 9,866,676 on Jan. 9, 2018, which is a continuation of U.S. patent application Ser. No. 13/966,189, filed on Aug. 13, 2013 and issued as U.S. Pat. No. 9,313,305 on Apr. 12, 2016, which is a continuation of U.S. patent application Ser. No. 13/894,329, filed on May 14, 2013 and issued as U.S. Pat. No. 9,325,365 on Apr. 26, 2016, which is a continuation of U.S. patent application Ser. No. 13/622,904, filed on Sep. 19, 2012 and issued as U.S. Pat. No. 8,442,604 on May 14, 2013, which is a continuation of U.S. patent application Ser. No. 13/185,200, filed on Jul. 18, 2011 and issued as U.S. Pat. No. 8,509,864 on Aug. 13, 2013, which claims the benefit of and priority to U.S. Provisional Patent Application Ser. No. 61/365,302, filed on Jul. 16, 2010, the entireties of which are hereby incorporated herein by reference.

BACKGROUND

This disclosure relates to cases for portable electronic devices and smartphones that have cameras and flashes.

Protective cases are used to protect portable electronic devices from possible damage. It is desirable that these cases allow users to use the functionality of their devices while the devices remain in their cases. Cases may also be used to enhance the functionality and capabilities of the device.

For example, portable electronic devices and smartphones have cameras used to take pictures and capture video. With a flash, these cameras can take pictures and video in low light or dark conditions. However, the flash can cause glare that will cause the pictures and video to become washed out, which is undesirable.

Thus there is a need for cases for portable electronic devices that will protect the devices, while at the same time prevent or reduce glare appearing in pictures and video taken by the cameras when a flash is used.

SUMMARY

A case for portable electronic devices including smartphones includes a feature to prevent glare from a flash from affecting images and video captured by a camera lens and also a battery to extend battery life of the electronic device. Smartphones have telephony, Internet connectivity, and camera and video features. Photos and video can be uploaded through the Internet or sent to other phones. A case has hole for a camera flash of the smartphone to pass through. The edging of the hole is colored black (e.g., black pigment, black paint, or black ink) or another dark color (e.g., dark blue, dark green, or violet) to prevent glare from appearing in the photos or video taken by the smartphone when using the camera flash.

In an implementation, a method of making a case for an electronic device includes: forming a back of the case having an inside surface and outside surface; forming a camera-flash opening in the back of the case, where the camera-flash opening extends from the inside surface through to the outside surface; and applying a dark coloring to an edging of the camera flash opening. This dark coloring can be black and the case can be white or other light coloring. The dark coloring may be a black paint or black ink. The dark coloring may be from overmolding, inserting, gluing, or snapping, or any combination of these, a dark colored material over the edging of the camera-flash opening. The dark colored material may be the same or different from the material used for the case. A slope of the edging may be 0 or greater.

In an implementation, a case for an electronic device has a first case portion including: a first base surface upon which a back of a housing of the electronic device will be placed against, where the base surface includes a top edge; and a lower sidewall, connected to the first base surface at an end opposite of the top edge, that will be positioned against a bottom side edge of the electronic device.

The case has a second case portion including: an upper sidewall that will be positioned against a top side edge of the electronic device when the second case portion is seated against the first case portion, and an open side end, opposite the upper sidewall. The second case portion slides onto the first case portion through the open side end. When the second case portion is seated against the first case portion, the first and second case portions meet at and form a seam or part line which extends across a back of the case.

The case has a camera-flash opening, including a hole through the back of the case, where the camera-flash opening has a length dimension greater than a width dimension, and an edging of the camera-flash opening has a dark-colored coloring. The edging of the camera-flash opening has a different coloring compared to the material of the back of the case.

The second case portion is seated against the first case portion. A first open-shaped opening for the first case portion merges with a second open-shaped opening for the second case portion to form a front opening of the case through which a screen of the electronic device will be visible, the front opening having a closed shape. The back opening has a closed shape through which a camera flash and camera lens of the electronic device will be visible.

In an implementation, a case for an electronic device includes: a first base surface upon which a back of a housing of the electronic device will be placed against, a camera-flash opening, including a hole through a back of the case, where the camera-flash opening has a length dimension greater than a width dimension, and an edging of the camera-flash opening has a dark-colored coloring, and the camera-flash opening has a closed shape through which a camera flash and camera lens of the electronic device will be visible.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3 shows a cross section of a case at the camera-flash opening where the edging has a dark color.

FIG. 4 shows a cross section of a case at the camera-flash opening where the edging and outside border around the opening has a dark color.

FIG. 5 shows a cross section of a case at the camera-flash opening where the edging and inside border around the opening has a dark color.

FIG. 6 shows a cross section of a case at the camera-flash opening where the edging, inside, and outside border around the opening has a dark color.

FIG. 7 shows a cross section of a case at the camera-flash opening having a dark colored insert.

FIG. 8 shows a cross section of a case at the camera-flash opening having another implementation of a dark colored insert.

FIG. 24 shows a left side view of the case in the disassembled position.

FIG. 25 shows a right side view of the case in the disassembled position.

FIG. 26 shows a back of a case to show examples of camera opening or hole options from FIGS. 27-31.

FIG. 27 shows a first opening option having an oval shape.

FIG. 28 shows a second opening option having an egg shape.

FIG. 29 shows a third opening option having a keyhole shape.

FIG. 30 shows a fourth opening option having a keyhole shape.

FIG. 31 shows a fifth opening option having two circular openings.

FIG. 32 shows a back of a case with a section line passing through camera-flash opening to show examples of camera opening or hole treatment options from FIGS. 33-40.

FIG. 33 shows a first treatment option where the edging and inside border around the opening is painted a dark color (e.g., black).

FIG. 34 shows a second treatment option where the edging, but not the border is painted a dark color.

FIG. 35 shows a third treatment option where a dark color material (e.g., overmold or insert) is attached to the opening edging.

FIG. 36 shows a fourth treatment option where the dark color material is attached to a sloped edge in the case material opening.

FIG. 37 shows a fifth treatment option where the dark color material has a sloped edge.

FIG. 38 shows a sixth treatment option where the dark color material is received in a countersink or recess of the case.

FIG. 39 shows a seventh treatment option where the dark color material has a rounded edge.

FIG. 40 shows an eighth treatment option where the dark color material is received in two countersinks or recesses of the case.

FIG. 41A shows an upper case portion for a case for a portable electronic device.

FIG. 41B shows a lower case portion for a case for the portable electronic device.

FIG. 41C shows an example of a portable electronic device.

FIG. 49 shows a front view of the upper case portion.

FIG. 50 shows a front view of the lower case portion.

FIG. 53 shows a left side view of the upper case portion.

FIG. 54 shows a left side view of the lower case portion.

FIG. 55 shows a right side view of the upper case portion.

FIG. 56 shows a right side view of the lower case portion.

FIGS. 67 and 68 show tables listing operational modes of the portable electronic device case.

FIG. 70 shows the rightmost indicator light turned on.

FIG. 71 shows the leftmost indicator light turned on.

FIG. 72 shows three indicator lights turned on.

FIG. 73 shows five indicator lights turned on.

DETAILED DESCRIPTION

Figure 1:
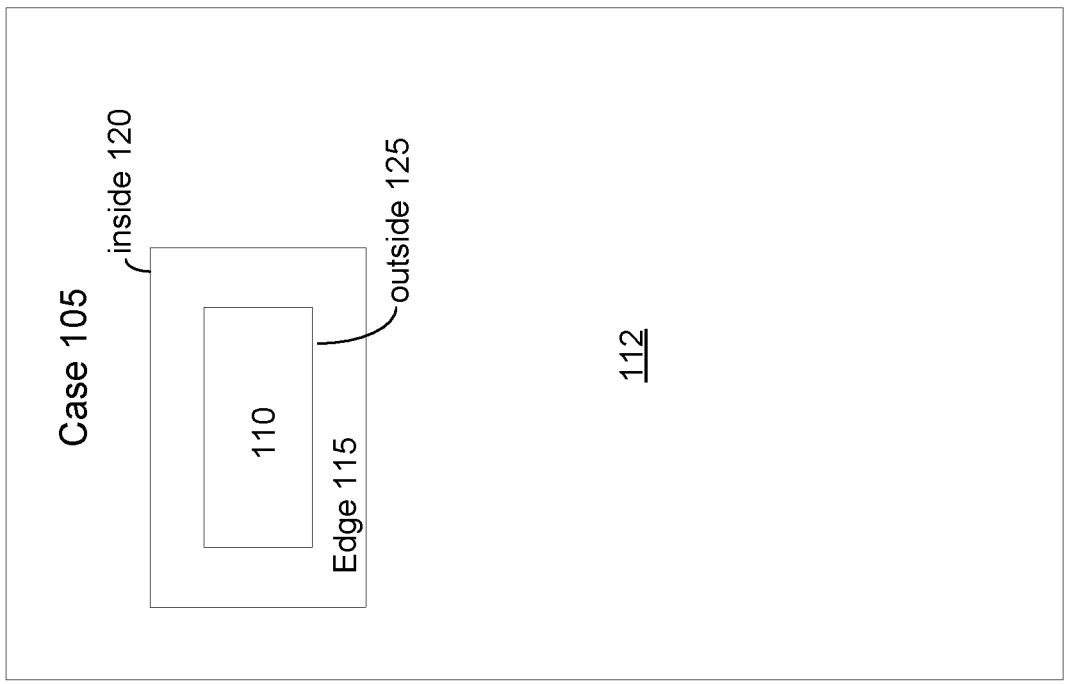
FIG. 1 shows a block diagram of a back view of a case having a single camera-flash opening.

FIG. 1 shows a block diagram of a back view of a first embodiment of a case 105 for a smartphone or other portable electronic device. In a specific implementation, the case is used for the Apple iPhone 4g (from Apple Inc.).

Smartphones and portable electronic devices are valuable because of their functionality, the information they contain, and time and expense to replace. A case is typically much easier and less expensive to replace than the device which it houses and protects.

A case protects the smartphone or portable electronic device from scratches, dings, dents, and other damage. The case also provides shock absorption. The case will absorb impacts, preventing shock to the components of the device which are often delicate. The case can also improve the grip to the device and case combination. The case may include a texture pattern, be made from a tacky material, or have a tacky coating, or include a wrist or neck strap. The case may also be waterproof or water resistant to protect the device from rain, snow, and surf.

A case is typically an important accessory for the device that it protects. For, a person might accidentally drop a smartphone in the case on the floor when running to catch a flight for a business trip at the airport. The case may crack or even shatter into many pieces, but the smartphone will remain intact and unbroken, saved by the case. The person can pick up the smartphone, continue on the flight, and use the smartphone on the business trip.

If the smartphone had not been protected by a case, the smartphone might have become broken. The screen may become cracked or there might have been other damage rendering the device inoperable. The person typically would not have been able to replace the smartphone soon enough, especially if there was important information saved on the smartphone (e.g., sales presentation slides) that are needed for the business trip.

Further, a case may be useful in improving wireless reception and preventing dropped calls. For example, the iPhone 4g includes a stainless steel band around the edge of the phone. This band functions as two antennas for the iPhone 4g. Depending on how a user grips the stainless steel band, the wireless reception strength may be diminished and result in dropping of a call. Since the case is made from an insulator or nonconductive material (e.g., polycarbonate, silicon, or rubber), the user's gripping of the case will no longer short to the stainless steel band. Regardless of the user's grip, the wireless reception strength will be unaffected. Therefore, cases for smartphones and portable electronic devices are valuable accessories.

This patent application describes aspects of the invention with respect to the iPhone 4g. However, the principles of the invention are not limited to the iPhone 4g, but are applicable to any portable electronic device or smartphone or other telephony device. Some examples of other devices that the invention will be applicable to include cameras, video cameras, webcams, media players including MP3 and video players, personal digital assistants (PDAs) such as the iPAQ line of products from Hewlett Packard (www.hp.com), handheld computers, Blackberry smartphones (from Research in Motion Limited, na.blackberry.com), Samsung smartphones (www.samsung.com), Motorola phones (www.motorola.com), HTC smartphones (www.htc.com), phones running the Android platform or operating system from Google (www.google.com, www.android.com), Nokia phones (www.nokiausa.com), and laptop and notebook computers.

Figure 10:
FIG. 10 shows a front view of the smartphone.
Figure 9:
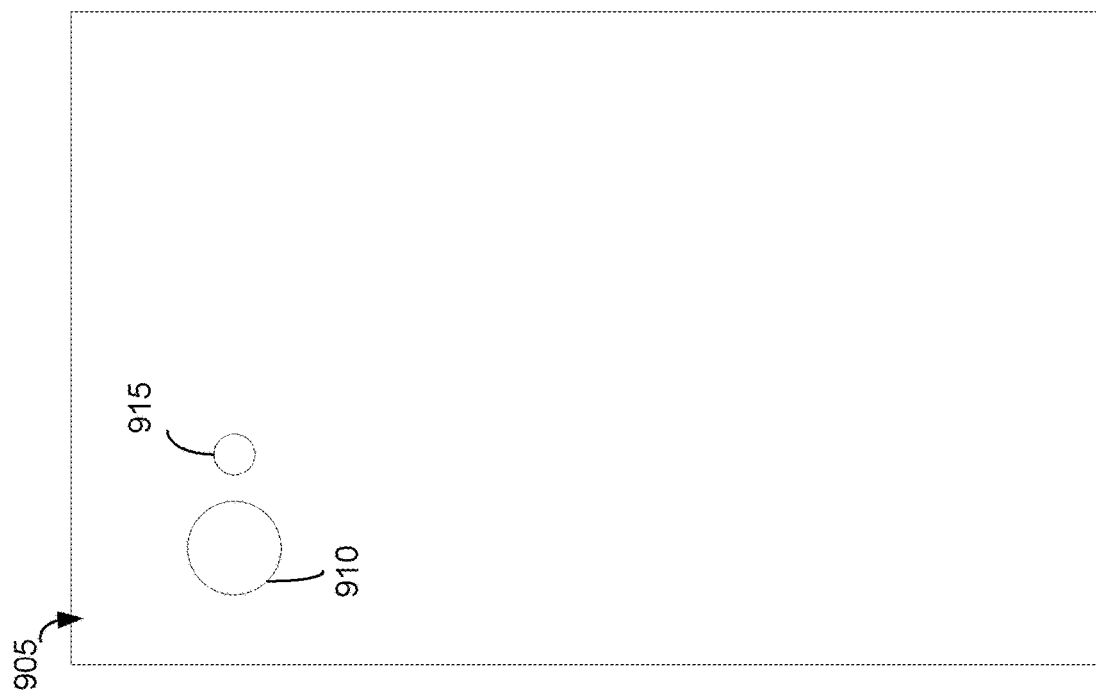
FIG. 9 shows a back view of a representative smartphone.

A feature of the smartphone or electronic device is a camera with flash. For example, FIG. 9 shows a back view of a representative smartphone 905. FIG. 10 shows a front view of the smartphone. In a specific implementation, the smartphone is the iPhone 4g. The iPhone 4g has a 5-megapixel camera 910 with a built-in LED flash 915 on its back. The built-in LED flash illuminates low-light scenes. When taking pictures or photographs, the LED works as a flash. When shooting video, the LED can stay on to light up the scene. The flash is positioned very close (e.g., about 1-5 millimeters) to the camera lens.

In FIG. 1, a back of the case has a single opening 110 for both the camera lens and flash of the phone. While the phone is in the case, the user can use the camera and flash without needing to remove the phone from the case.

When using the flash to take picture or video, glare may be introduced in the picture or video. The glare may result when the smartphone is not in a case under certain circumstances or conditions, such as the case having a white or glossy back or the flash striking another surface, bouncing back, and being captured by the camera. Placing the smartphone in a case may increase the glare, especially for light color cases or cases other than black. For example, a white smartphone case may cause images and video captured by the camera to have more glare from the flash as compared to black cases.

Further, glare may result from light leakage from the flash and backlight of the phone. For example, some phones have a semi-translucent back piece. Some commentators have speculated that light from the flash and backlight of the phone leaks into the semi-translucent back piece which causes the back piece to glow—similar to a light guide. The glowing light is captured by the camera which then results in poor pictures such as the pictures being "washed out." When the phone is placed in a case without glare reducing features as presented in this patent application, the picture and video quality may be further degraded because the glowing light may bounce off the inside back of the case and be reflected into the camera lens.

This patent application presents techniques for a case to prevent or reduce the glare from the flash in pictures and video taken by the camera. Such techniques may reduce glare compared to untreated cases and even compared to a smartphone not in a case.

As shown in FIG. 1, this case includes single opening 110, an outside case surface 112, and an inside case surface, opposite the outside case surface. Opening 110 includes an edge or edging 115. The edging is between an inside 120 of the case and an outside 125 of the case. According to a technique, the edging of the camera-flash opening is made black or another dark color such as dark gray, charcoal, brown, mahogany, dark cherry, dark green, dark purple, midnight blue, chocolate, and others.

A glossy black color will reduce flash glare, especially compared to a white color case without the black coloring. A matte black color or matte finish may reduce glare even further. The black coloring on the edging reduces glare by reducing light bouncing off the edging surface and affecting pictures and video taken with the camera lens.

Figure 2:
FIG. 2 shows a block diagram of a back view of a case having two openings.

FIG. 2 shows a back view of a second embodiment of a case 205. This case is similar to the case shown in FIG. 1, but this case includes two openings. There is a first opening 210 having a first edging 215 and a second opening 220 having a second edging 225. The first opening is for one of the camera lens or flash of the phone. The second opening is for another of the camera lens or flash of the phone.

In a specific implementation, both the first edging of the first opening and the second edging of the second opening are made a dark color. In another specific implementation, at most one of the first or second edgings is made a dark color which can reduce the cost to make a case. For example, the first edging of the first opening can be made a dark color and the second edging of the second opening can be in a light color. Alternatively, the configuration can be swapped so that the second edging of the second opening can be made a dark color and the first edging of the first opening can be in a light color.

When both the first and second edgings are made the dark color more glare may be reduced as compared when just one of edgings is made the dark color. However, in some cases it may not be desirable to make both edgings the dark color. Some cameras are less sensitive to glare as compared to other cameras. For example, the camera may include a lens filter such as a polarizing filter to reduce glare. When this is the case, one of the edgings (e.g., flash opening edging) may be made in the dark color and another of the edgings (e.g., camera opening edging) may be in a light color.

Whether a case has two camera-flash openings—one opening for the camera and another opening for the flash (FIG. 2) or a single camera-flash opening (FIG. 1) depends on various factors such as the distance between the camera lens and flash, the thickness of the case material, the size or diameter of the camera lens and flash, or combinations of these. Two openings may reduce glare more than a single opening because there will be some case material between the camera and flash to absorb or block light that would otherwise result in glare. A single large opening can make it easier for the camera lens and flash to be cleaned without having to remove the phone from the case.

FIGS. 3-8 show cross sections of different embodiments of a camera-flash opening of a case. These figures show what portions, regions, or surfaces of the camera-flash opening may have a dark-colored coloring as indicated by the shaded blocks so that glare to pictures and video taken by the camera can be prevented or reduced.

FIG. 3 shows a cross section of a first embodiment of a case where there is a dark-colored coloring 305 on the edging of the camera-flash opening, but the outside and inside of the case near the opening are in a lighter color (e.g., white).

FIG. 4 shows a cross section of a second embodiment of a case where there is a dark-colored coloring 405 on the edging of the opening and a portion of the outside surface of the case, but the inside of the case is in a lighter color. When this case is viewed from the front (i.e., looking from the outside towards the inside of the case), the dark-colored coloring will appear as a black or dark-colored ring around the opening. For example, the ring may surround, encircle, or at least partially encircle the opening. This ring faces away from the back of the phone. The ring may have circular or noncircular shape. The ring may be referred to as a border, rim, margin, brim, shoulder, outline, or frame.

Making the outside surface of the case near the opening a dark color can help to prevent or reduce glare from light that would otherwise be reflected off the outside case surface near the opening. The glare can be from light from the flash reflecting off a surface and bouncing back towards the camera, ambient light, or both. Thus, the black or dark coloring can also be applied to the outside of the case (not only on the edging of the opening).

FIG. 5 shows the opposite of FIG. 4. Specifically, FIG. 5 shows a cross section of a third embodiment of a case where there is a dark-colored coloring 505 on the edging of the opening and a portion of the inside surface of the case, but not on the outside of the case.

When the phone is in the case, there may be a small gap between the phone and the case. Then the flash can bounce off the inside back of the case, especially if the inside back has a light coloring or glossy finish. Therefore, in a further implementation, the black or dark coloring can be also applied in a border or ring surrounding the camera-flash opening on the inside back of the case. This black or dark color ring faces the back of the phone.

FIG. 6 shows a combination of FIGS. 4-5. Specifically, FIG. 6 shows a cross section of a fourth embodiment of a case where there is a dark-colored coloring 605 on the edging of the opening, a portion of the inside surface of the case, and a portion of the outside surface of the case near the opening.

Whether a case includes a dark-colored coloring on the edging only (FIG. 3), on the edging and outside surface surrounding the opening (FIG. 4), on the edging and inside surface surrounding the opening (FIG. 5), or on the edging, and inside and outside surfaces (FIG. 6) depends on factors such as the design of the camera, whether or not there will be a small gap between the phone and the case, or both. For example, if the camera, flash, or both of the phone are designed so that they are recessed into the back of the phone it may be desirable to apply a dark colored ring to the inside of the case to prevent the flash from bouncing off the inside back of the case. However, if the camera, flash, or both protrudes out from the back surface of the phone such that they also protrude into the camera-flash opening of the case it may not be desirable to apply the dark color to the inside surface of the case because the flash is unlikely to bounce off the inside back of the case and into the camera.

In a specific implementation, when manufacturing the case, a step is to apply black paint (e.g., flat black paint) or black ink or a black coating to an edging of the camera-flash opening. This step can be applied to any case exhibiting a glare issue including light color cases such as white, yellow, orange, pink, and others. When using black paint, the paint may be sprayed on or applied using a brush, paintbrush, or sponge. When using black ink, the ink may be applied using a marker or felt-tipped pen such as a Sharpie® marker, or a Magic Marker®. A template or guide can be placed onto the case when applying the black or dark coloring so that other surfaces of the case not intended to be colored are not accidentally colored with the dark coloring. A dark coating may be applied via heat sealing or press welding.

This step can be applied to any of the camera-flash opening arrangements discussed in this application. For an arrangement having two openings, the coloring can be applied to the edging of both openings, or any one of the openings.

In another specific implementation, a black or dark color material is used in the edging of the camera-flash opening. The black coloring material can be overmolded, inserted, glued (e.g., using epoxy), adhered, screwed, press-fitted, or snapped in place (or any combination of these) on the case. The black coloring material can be the same material as the other case material, or the black coloring material may be a different material from the other case material. The case material may be polycarbonate, silicone, thermoplastic polyurethane (TPU), thermoplastic elastomer (TPE), thermoplastic rubber (TPR), fiberglass, carbon fiber, or many others, or a composite or combination of these. For example, the case material is polycarbonate and thermoplastic rubber in black is fitted (e.g., like a grommet) into the camera-flash opening.

As another example, the case material can have first durometer and the black coloring material can have a second durometer where the first durometer is greater than the second durometer. The first durometer may be about 75 on a type D scale which is about the value for hard plastic. The second durometer may be about 50 which is about the value for rubber or solid truck tires on the type D scale.

In a specific implementation, dark-colored coloring 305 shown in FIG. 3 is a black band, strip, or black loop of material that is glued, bonded, fused, or otherwise attached to the edging of the camera-flash opening.

In another specific implementation, the coloring is a piece of material that is overmolded on the case. Overmolding is a molding or injection molding process where one material such as TPE is molded onto a second material such as rigid plastic. The overmolded or first material forms a strong bond with the second material as a result of the overmolding process. Some specific examples of overmolding techniques include insert molding and multi-shot injection molding.

In another specific implementation, dark-colored coloring 405 (FIG. 4), 505 (FIG. 5), or 605 (FIG. 6) is an insert that is attached to the case. The insert may be referred to as a grommet or eyelet. A grommet includes a tube portion and at least one flange, flared, or collared portion connected to an end of the tube portion. The tube portion is inserted through the camera-flash opening so that the flange portion butts up or is seated against the outside surface of the case (FIG. 4) or the inside surface of the case (FIG. 5). Alternatively, the grommet can have a flange portion at both ends of the tube portion so that when the grommet is attached to the case, a first flange portion will butt up against the outside surface of the case and a second flange portion will butt up against an inside surface of the case so that there will be a dark colored region on both the outside and inside of the case as shown in FIG. 6.

FIG. 7 shows a cross section of a fifth embodiment of a case where the case includes a ridge 710 and the dark-colored coloring is a grommet or insert 715 that is at least partially held in place or retained by the ridge. The grommet includes a notch 720 which receives the ridge. The ridge may be referred to as a ledge, projecting edge, step, flange, tab, collar, or ring. The notch may be referred to as a groove, channel, or recess. When looking at a plan view of the case, the opening will appear to have a step down, recess, or counter sink. This step down can allow the grommet flange to sit flush with the case surface.

FIG. 8 shows a cross section of a sixth embodiment of a case. This case is similar to the case shown in FIG. 7, but the ridge and notch components are swapped. That is, the case includes a notch 810 and a grommet 815 includes a ridge 820.

With the case designs shown in FIGS. 7-8 the grommet may be able to stay secured within the camera-flash opening without using an adhesive because of the ridge and notch configuration or features. Omitting the step of applying an adhesive in the manufacturing process can save time and reduce the cost to make a case. Further, there will be no adhesive that will accidentally ooze out that will need to be cleaned from the case surface.

The dark or black color material or insert may be polycarbonate, silicone, thermoplastic polyurethane (TPU), thermoplastic elastomer (TPE), thermoplastic rubber (TPR), fiberglass, carbon fiber, paper, a sticker, a decal, felt, fabric (e.g., leather or imitation leather), cardboard, plastic, nylon, metal (e.g., stainless steel or aluminum), or many others, or a composite or combination of these. Materials such as silicon, rubber, and plastic are generally soft and less likely to scratch the phone or other objects that the insert may come into contact with. However, the insert may be made of a rigid material such as metal (e.g., stainless steel or aluminum) which may be brushed, or painted or anodized a dark color. A rigid insert may be installed using a setting tool or press. Alternatively, a rigid insert may include threads so that it can be screwed into the camera-flash opening of the case.

The dark or black color material may be provided separately from the case itself so that users can retrofit their existing cases that may have glare issues.

These techniques to reduce glare or treat the camera-flash opening with a dark or black coloring material can be applied to any of the camera-flash opening arrangements discussed in this application. For an arrangement having two openings, the dark or black coloring material can be applied to the edging of both openings, or any one of the openings.

The table A below shows a specific implementation of a flow for making a case having a camera-flash opening with a glare preventing or reducing feature. It should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

TABLE A

| | |
|---|---|
| Step 1 | Provide a case. |
| Step 2 | Make a camera-flash hole through a back of the case. |
| Step 3 | Apply a dark-colored coloring to the camera-flash hole |

In a step 1, a case for the phone is provided. In a step 2, a camera-flash hole is made through a back of the case. Steps 1 and 2 may be combined in a single step such as when the case is provided via injection molding. For injection molding, there is a mold of the case or a portion of the case. A liquid or uncured plastic is injected or poured into the mold along with a catalyst. The mold and plastic is subjected to a temperature to activate the catalyst and material. After a sufficient time for processing to occur, the mold can be opened, and the plastic case portion removed. The case portion can be cleaned and flashing removed. The mold used in the processing can include features (e.g., pattern or core) that will form features (e.g., camera-flash opening) of the case described in this application.

In a step 3, the dark-colored coloring is applied to the camera-flash hole. As discussed above, the dark-colored coloring may be applied to just the edging of the hole (FIG. 3), the edging and border of the hole on the case outside (FIG. 4), the edging and border of the hole on the case inside (FIG. 5), or edging and border of the hole on the case inside and outside (FIG. 6).

In a specific implementation, applying the dark-colored coloring involves a single technique such as applying black paint to the camera-flash opening or inserting a grommet into the camera-flash opening.

Alternatively, the application of the dark-colored coloring may involve a combination of techniques, i.e., two or more techniques. For example, black paint may be applied to the edging and a black color material such as a piece of rubber may be applied as a border around the camera-flash opening. The black color material may be a dark sticker or film having an adhesive back (i.e., pressure sensitive adhesive) so that the sticker can be fastened to a surface of the case around the camera-flash opening. The sticker may have a hole that is to be aligned with the camera-flash opening so that camera and flash of the phone can be exposed through the opening. Or the sticker may not have a hole. The sticker may be a continuous sheet of material that is placed over and covers the opening. Afterwards a blade is used to cut or punch a hole through the sticker so that the camera-flash opening of the case can be exposed or made visible.

Table A and the discussion accompanying table A above describes a proactive or positive technique of applying a dark-colored coloring to the camera-flash opening. However, in another specific implementation, the dark-colored coloring of the camera-flash opening is from leaving the opening untreated or is an act of omission. In this specific implementation, the original color of the case is black or another dark color. The surfaces of the case, but not the areas around the camera-flash opening, are made a light color. Thus, the areas around the camera-flash opening remain in the original black or dark color and the other case surfaces will be in the light color as a result of applying the light color. Table B below shows a specific implementation of a flow for making a case where the dark-colored coloring of the camera-flash opening is from leaving the opening untreated.

TABLE B

| | |
|---|---|
| Step 1 | Provide a black or dark-colored case. |
| Step 2 | Make a camera-flash hole through a back of the case. |
| Step 3 | Apply a light-colored coloring to the case, but not to the camera-flash hole. |

Steps 1 and 2 can be similar to steps 1 and 2 in table A above, but in this specific implementation, the case is provided as a dark-colored case. That is, the original starting material of the case is a dark color such as black (e.g., black plastic). In a step 3, a light-colored coloring (e.g., white paint) is applied to the case surfaces such as the outside case surface, inside case surface, or both, but the light-colored coloring is not applied to the camera-flash hole or opening.

Thus, the edging of the camera-flash opening, the outside border around the opening, the inside border around the opening, or combinations of these remain in the original dark color, but the other portions of the case will have been made a light color.

To help ensure that the light-colored coloring is not applied to the camera-flash opening, a mask, shield, template, or other covering can be applied to the opening so that the edging and other surfaces bordering the opening not intended to be made a light color are protected from the coloring process.

Alternatively, the camera-flash opening may be created after the light-colored coloring is applied to the originally black case. Upon creating the opening, the edging of the opening will be black because the original case material was black. The opening may be created by milling, drilling, or punching an opening through the back of the case.

The case can be manufactured to have any desired case color, and the camera-flash opening will have a darker color than the case color. This darker color will help prevent glare from the flash from affecting images and video captured by the camera lens. This opening with the darker color edging will eliminate or reduce glare from appearing in the pictures and video taken by a camera lens through this opening.

Colors of the visible spectrum (e.g., red, orange, yellow, green, blue, indigo, and violet) extend from about 390 nanometers to about 750 nanometers. Colors can further include unsaturated colors (e.g., nonspectral colors) that are mix of multiple wavelengths. The color white (e.g., 100 percent saturated white) is lighter than any color in the spectrum. The color black (e.g., 100 percent saturated black) is darker than any color in the spectrum.

Yellow is a color of the spectrum at about 570 nanometers to 590 nanometers. Generally, the colors above yellow, wavelengths from 590 nanometers to 750 nanometers (including orange and red), are considered progressively darker than yellow. For example, at the same or similar intensity level, red is considered darker than orange. Generally, the colors below yellow, wavelengths from 570 nanometers to 380 nanometers (including green, cyan, blue, and violet) are also considered progressively darker than yellow. For example, at the same or similar intensity level, blue is considered darker than cyan, which is darker than green, which is darker than yellow.

A color wheel is an arrangement of colors in a circle. Some color wheels have been developed by Sir Isaac Newton, Johann Wolfgang Goethe, Johannes Itten, and others. A color wheel can also be used to help determine whether a color is lighter or darker than another color. A color wheel is an arrangement of colors around a circle. Yellow is at one position in the circle. The color opposite (i.e., 180 degrees separation) of yellow is purple. Purple is a nonspectral color (a mixture red and violet) and is in the wheel between magenta and violet. Progressing clockwise around the color wheel from yellow toward purple, the arrangement of the colors include: yellow-orange, orange, red-orange, red, and red-purple or magenta. At the same or similar intensity level, the colors of the wheel become progressively darker from yellow to purple.

Progressing counterclockwise around the color wheel from yellow toward purple, the arrangement of the colors include: yellow-green, green, blue-green, blue, and blue-purple (or violet). As in the clockwise direction discussed above, at the same or similar intensity level, the colors of the wheel become progressively darker from yellow to purple.

Thus, whether a first color is lighter or darker than a second color can be determined by their positions on the color wheel with respect to yellow. The greater the degree of separation from yellow, the darker the color. For example, assume on the color wheel that a first degree of separation between yellow and a first color (e.g., orange) is about 60 degrees as measured in a clockwise direction from yellow to the first color. A second degree of separation between yellow and a second color (e.g., red) is about 120 degrees. The second degree of separation (120 degrees) is greater than the first degree of separation (60 degrees). So, the second color (red) is darker than the first color (orange).

A reference line from yellow to purple can divide the color wheel into first and second portions. The colors in the first portion can be the colors seen when progressing clockwise around the color wheel from yellow to purple, i.e., yellow-orange, orange, red-orange, red, and red-purple or magenta. The colors in the second portion can be the colors seen when progressing counterclockwise around the color wheel from yellow to purple, i.e., yellow-green, green, blue-green, blue, and blue-purple (or violet). Whether a color in the first portion is lighter or darker than a color in the second portion can also be determined by the degree of separation from yellow.

For example, assume that a first color is red-purple which is in the first portion of the color wheel. A second color is green which is in the second portion of the color wheel. A first degree of separation between yellow and the first color (red-purple) may be about 150 degrees (or positive 150 degrees) when measured clockwise from yellow to the first color. A second degree of separation between yellow and the second color (green) may be about −60 degrees (or minus 60 degrees) when measured counterclockwise from yellow to the second color. Thus, when the color is in the first portion of the color wheel, the degree of separation is measured in a clockwise direction from yellow. When the color is in the second portion of the color wheel, the degree of separation is measured in a counterclockwise direction from yellow. In this example, the first degree of separation (150 degrees) is greater than the second degree of separation (−60 degrees). So, the first color (red-purple) is darker than the second color (green).

Generally, the term "hue" is synonymous with color. Hue describes the distinct characteristic of color that distinguishes, for example, red from yellow from blue. Hues are dependent on the dominate wavelength of light that is emitted from an object. For example, blue objects emit light having wavelengths ranging from about 490 nanometers to about 450 nanometers. Red objects emit light having wavelengths ranging from about 700 nanometers to about 635 nanometers. Thus, the color of an object can be determined by the wavelength of light emitted from the object. In other words, the color of an object is considered "red" when the object reflects more of the "red" wavelength of light, i.e., wavelengths of about 700 nanometers as compared to other wavelengths. Specifically, the object is absorbing wavelengths of light except for wavelengths around 700 nanometers—which corresponds to the color red.

Although black, white, and gray are sometimes described as achromatic or hueless colors, a color may be referred to as "black" if it absorbs all frequencies of light. That is, an object that absorbs all wavelengths of light that strike it so that no parts of the spectrum are reflected is considered to be black. Black is darker than any color on the color wheel or spectrum. In contrast, white is lighter than any color on the color wheel or spectrum. If an object reflects all wavelengths of light equally, that object is considered to be white. Gray is an imperfect absorption of the light or a mixture of black and white.

In addition to hue, saturation or intensity is another dimension of color. Generally, for a given color, a more saturated version of the color can be better at reducing glare than a less saturated version of the color. So, in a specific implementation, for a given case color, the color is more saturated at the camera-flash opening as compared to the color at the case surface.

More particularly, saturation refers to the dominance of hue in a color. Saturation is the ratio of the dominant wavelength to other wavelengths in the color. Saturation can provide an indication of the amount of white or white pigment that is mixed in with the color. As the color becomes less saturated there will be more white. The color may be referred to as a tint, i.e., a variation of a color produced by adding white to it. Mixing in white with a color can make the color lighter. Mixing in black with a color can make the color darker. The resulting color may be referred to as a shade. When gray (i.e., black and white) is mixed with a color the resulting color may be referred to as a tone.

Thus, the intensity of a dark color can be mixed with white to make the color lighter. Conversely, a light color can be mixed with black to make the color darker. So, a case can be of a dark color that is mixed with white to lighten the dark color, the camera-flash opening can be of a saturated light color, and the camera-flash opening color can be darker than the case color because of the white used to lighten the case color. Similarly, the camera-flash opening can be of a light color that is mixed with black, the case can be of a dark color, and the camera-flash opening color will be darker than the case color because of the black used to darken the camera-flash opening.

For example, at the same or similar intensity level, red is darker than green. However, the intensity of red can be altered by mixing in white to lighten the red and make pink. Red, when mixed with white, can then be lighter than green. So, in a specific implementation, a red case includes a green camera-flash opening, where the red includes some white mixed in to make the red lighter than the green.

Some other examples of case color combinations where the intensity of a color is altered such as by mixing in white to lighten the case color (and thus provide a darker camera-flash opening) include: an orange case having a blue camera-flash opening; a purple case having a green camera-flash opening; a purple case having an orange camera-flash opening; an orange, case having a green camera-flash opening; a blue case having a green camera-flash opening; a red-orange case having a green camera-flash opening; a blue case having a yellow-green camera-flash opening; a red case having an orange camera-flash opening; a red case having a blue camera-flash opening; and a red-orange case having an orange camera-flash opening. For each of these cases, the case color is mixed with white so that the case color will be lighter than the color of the camera-flash opening. Conversely, the camera-flash opening will be darker than the case color.

In a specific implementation, a case is of a single color, e.g., red. The outside surface of the case has a first level of saturation of the color red. The camera-flash opening or edging has a second level of saturation of red. The second level of saturation is greater than the first level of saturation. In other words, the outside surface of the case has a greater amount of white mixed in with the red than the edging. Alternatively, the edging may be described as having a greater amount of red pigment than the outside surface of the case. In this specific implementation, the color of the camera-flash opening may be described as dark red and the outside case surface may be described as light red.

In another specific implementation, the color at the camera-flash opening has some black mixed in so as to darken the color at the opening. For example, a case may be of a single color such as orange, but at the camera-flash opening the orange color can be mixed with black to darken the orange color at the opening and reduce glare to pictures and video taken with the camera.

According to an aspect of the invention, generally, the edging of the camera-flash opening has a darker color than the case color, sufficient to eliminate or reduce glare from appearing in pictures or video taken with the camera lens through the opening. For example, the opening can be black and the case color can be any color on the color wheel or spectrum as black is darker than any color on the color wheel. A case can be in a light color (e.g., white or yellow) and the camera-flash opening can be black. The color at the opening can be pure black or a variation of black such as light black (i.e., have some white mixed in), gray, or charcoal. The case surface may be painted using a metallic paint so that it has iridescent and reflective properties, but such paint will not be applied to the camera-flash opening in order to prevent glare.

As discussed above, the amount of glare can depend on the specific color (and color properties or characteristics) selected for a case. Another factor that can contribute to glare is surface finish.

Generally, a roughened surface diffuses more light than a smooth surface. The rougher the surface, the more reflectivity is reduced. More specifically, light reflected from a surface includes a specular component and a diffuse component. The specular component is perceived as glare or can cause glare to appear in pictures and video taken by the camera. The sum of the specular reflectance and the diffuse reflectance is referred to as the total reflectance. For shiny surfaces, the specularly reflected light is relatively strong and the diffused light is weaker. On rough or low gloss surfaces, the specular component is weak and the diffused light is stronger.

Light reflecting off a mirror is an example of specular reflection. A mirror's reflectivity is typically about 85 percent, but can be more or less depending on the material, coating, and smoothness of the surface finish. The camera-flash opening of the case is designed so that its reflectivity will be less than that of the case surface to help reduce glare to pictures and video taken by the camera. For example, if the case surface reflects about 60 percent of the light, the reflectivity of the camera-flash opening (e.g., edging surface) will be less than 60 percent such as 10 percent. The edging surface may be referred to as being "darker" than the case surface because the edging surface reflects less light than the case surface.

One technique to reduce reflectivity is to roughen the surface. As discussed above, the rougher the surface, the more reflectivity is reduced. So, the camera-flash opening edging, border surface surrounding the opening, or both may be sanded (e.g., via sandpaper, sandblasting, or bead-blasting) to roughen the surface. That is, these regions near the opening will be treated or given a surface finish so that they will have less reflectivity as compared to the case outside surface, inside surface, or both. The camera-flash opening may be given a matte or flat finish which has a lower reflectivity than a mirror or gloss finish.

Other techniques to roughen include applying a chemical (e.g., an acid or solvent) to etch the case material surface. The surface may be roughened using a deposition process which may involve depositing and gluing small particles around the opening. There can be a spray or dip coating which upon drying will leave a roughened layer behind.

In this specific implementation, the camera-flash opening will have a higher surface roughness than the outside case surface, inside case surface, or both. Roughness is a measure of the texture of a surface. It can be quantified by the vertical deviations of a real surface from its ideal form. If these deviations are large, the surface is rough; if they are small the surface is smooth.

The camera-flash opening may instead or additionally be treated with an antireflective coating to reduce reflection and thus glare to pictures and video taken by the camera. When light moves from one medium to another (such as when light enters a sheet of glass after traveling through air), some portion of the light is reflected from the surface (referred to as the interface) between the two media. A thin layer of material at the interface and having an index of refraction between those of the two media can be used to reduce reflection.

In a specific implementation, to reduce glare, the camera-flash opening such as the edging surface is treated so that it is less reflective than, for example, the outside case surface. According to an aspect of the invention, generally, an edging of the camera-flash opening has a lower reflectivity than a reflectivity of the case, sufficient to eliminate or reduce glare from appearing in pictures or video taken with the camera lens through the opening.

The amount of specular light reflected off the edging surface from a light source is less than an amount of specular light reflected off the outside case surface. Alternatively, the amount of diffuse light reflected off the edging surface from the light source is greater than an amount of diffuse light reflected off the outside surface from the light source. Specular reflection measurements may be made using a specular glossmeter. In a specific implementation, the reflectivity of the case at the camera-flash opening is reduced such as via a matte finish to a level sufficient to prevent or reduce glare to the pictures and video taken with the camera.

Thus, in addition to color, other techniques to reduce glare include providing a particular surface characteristic, texture, or finish such as by roughening the surface to increase the light absorbing or light diffusing quality of the camera-flash opening, applying an antiglare or antireflective coating, or combinations of these.

The case colors may be specified using a color space system or standard. Some examples of color space systems include the Pantone Matching System (PMS), Pantone Plastics color system, the Munsell color system, the ICI Colour Dimensions Colour Atlas by the Imperial Chemical Industries Plc of London, CIE 1931 XYZ color space, created by the International Commission on Illumination (CIE), the CIE 1976 (L*, u*, v*) color space, the Hunter L, a, b color space, and others. A color space or color model is a system for describing color numerically.

For example, the Hunter L, a, b color space or scale is a three-dimensional rectangular color space based on the opponent-colors theory. The "L" value indicates the lightness of a color. The "L" value can range from 0 to 100 where 0 is black and 100 is white. The "a" value indicates the color's position between red and green. Positive "a" values are red; negative values are green, and 0 is neutral. The "b" value indicates the color's position between yellow and blue. Positive "b" values are yellow; negative values are blue; and 0 is neutral.

A color's lightness value can be measured using a color measurement tool such as a spectrophotometer or colorimeter. Specifically, the CIE lightness value can provide an indication of the amount of glare where high lightness values can indicate more glare than low lightness values. Colors having low lightness values can generally be described as dark colors. Colors having high lightness values can generally be described as light colors. Generally, the case colors will be selected so that the color of the camera-flash opening has a lower lightness value than the case surface in order to prevent or reduce glare to pictures and video taken by the camera.

The color measurements may be done at any point or location on the case. In a specific implementation, a first measurement reference point on the outside case surface is selected such that the color at that selected point is the most light as compared to other points on the outside case surface (e.g., has the most white as compared to other regions or areas on the outside case surface). For example, if the outside case surface has a pattern that includes regions of white and regions of black, in this specific implementation, the selected reference point will be within a white region. A second measurement reference point is at the camera-flash opening such as within the edging of the camera-flash opening. The color at the second reference point is darker than the color at the first reference point.

In various implementations, a technique to reduce glare may include a painted inner ring, using an insert mold, a co-molded ring with body form, or a snap in ring where a secondary lens may be applied, or combinations of these. The secondary lens can be polarized lens (e.g., a polarized lens filter) to help reduce glare.

Figure 11:
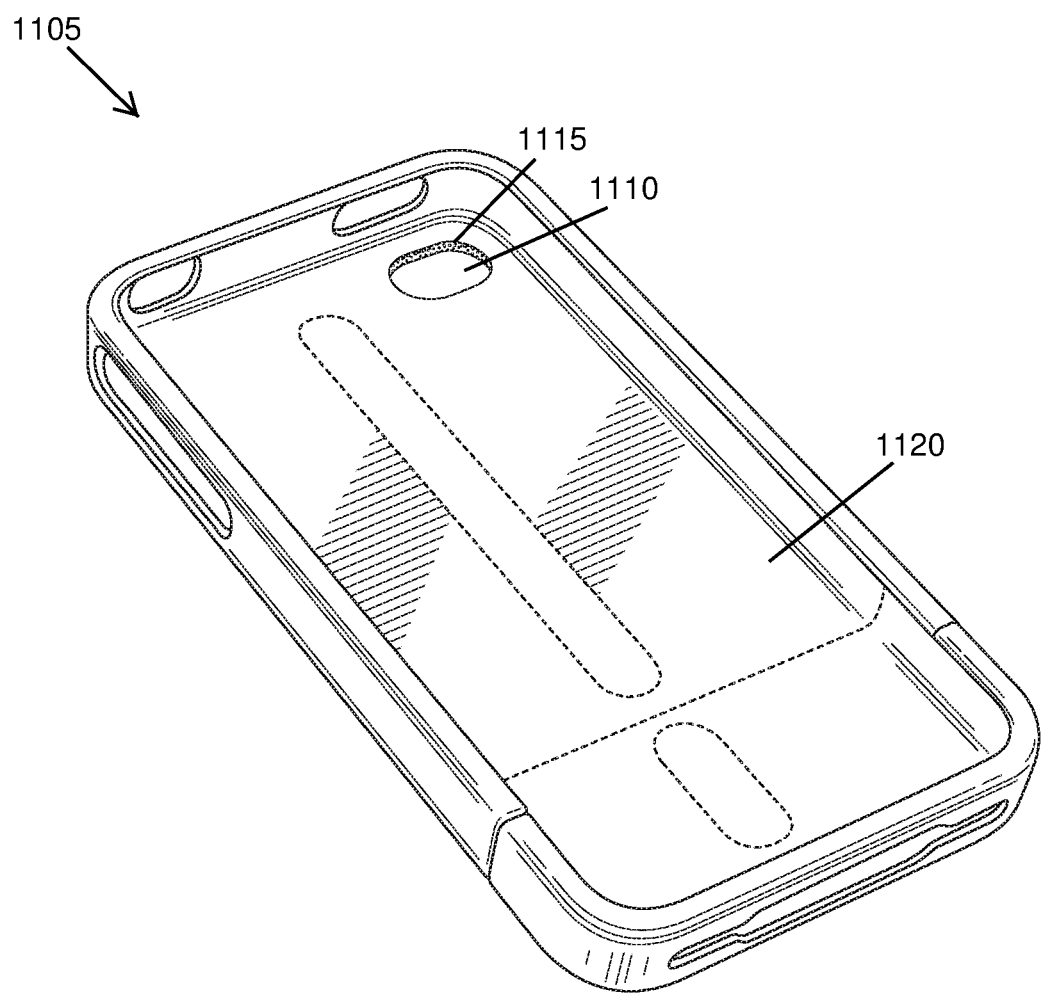
FIG. 11 shows a front perspective view of a specific implementation of a case having a camera-flash opening with a glare-reducing feature.

FIG. 11 shows a perspective view of a specific implementation of a case 1105. The case includes a camera-flash opening 1110 which includes a hole through the back of the case. The hole extends from the outside case surface to the inside case surface. The camera-flash opening has an edge or edging 1115 that has a dark-colored coloring, e.g., is colored black or another dark color to prevent or reduce glare to pictures and video taken by the camera. The edging is between the outside and inside case surfaces. The camera-flash opening has a length dimension that is greater than a width dimension of the opening. A front opening 1120 of the case allows a screen 1012 (FIG. 10) of the phone to be accessed. The case may further include other openings so that other features or controls of the phone can be accessed while the phone remains protected in the case.

Figure 12:
FIG. 12 shows a back perspective view of the case.
Figure 13:
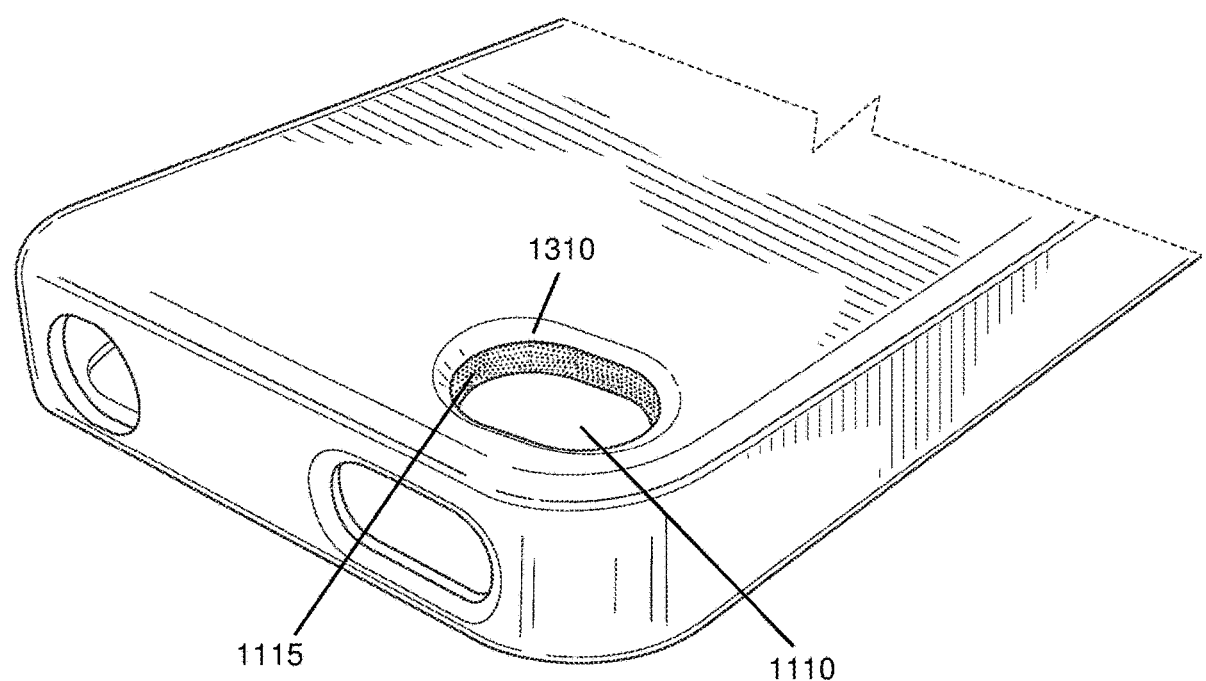
FIG. 13 shows a close-up view of the back of the case at the camera-flash opening.

FIG. 12 shows a perspective view of a back of the case shown in FIG. 11. FIG. 13 shows a close-up perspective view of a corner of the case where the camera-flash opening is located.

The opening includes a bevel 1310 on the outside of the case. The bevel may be referred to as a lens hood. The bevel is sloped or angled down towards hole to help direct light away from the camera that would otherwise appear as glare in pictures and video. In this specific implementation, the bevel has not been treated with the dark coloring. In another specific implementation, the lens hood (along with the edging of the opening) is treated with the dark coloring.

Figure 14:
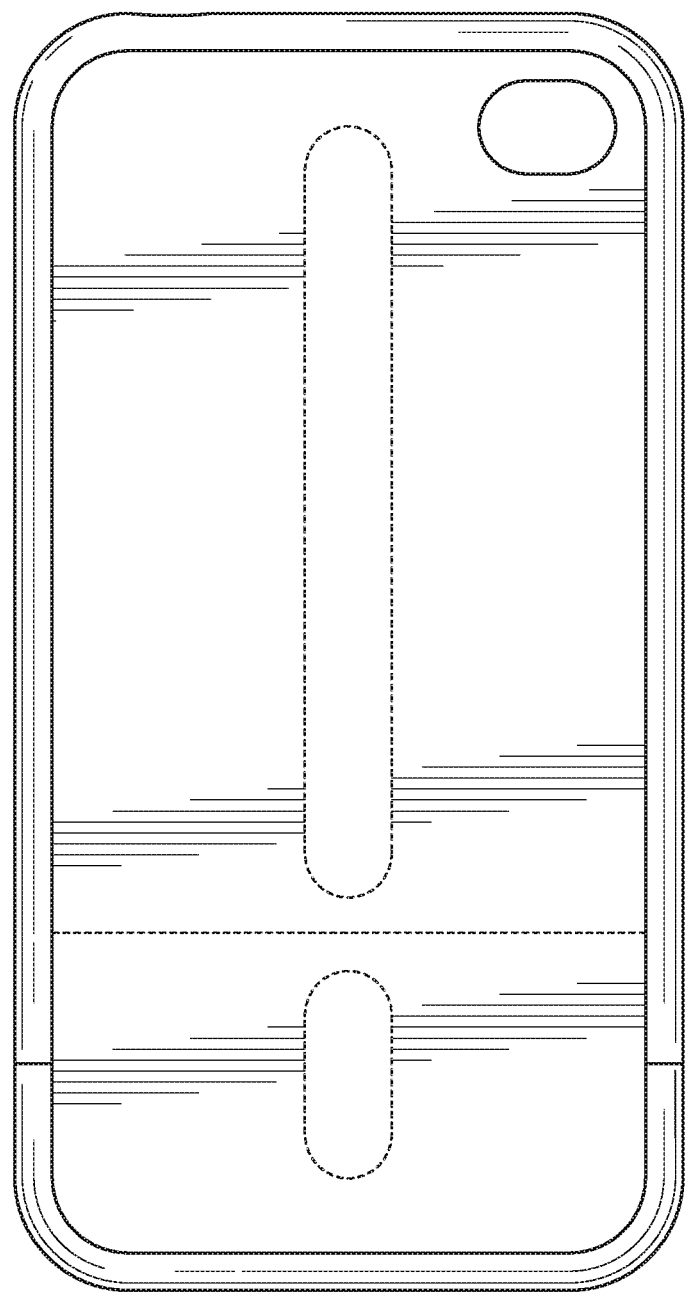
FIG. 14 shows a front view of the specific implementation of the case.
Figure 15:
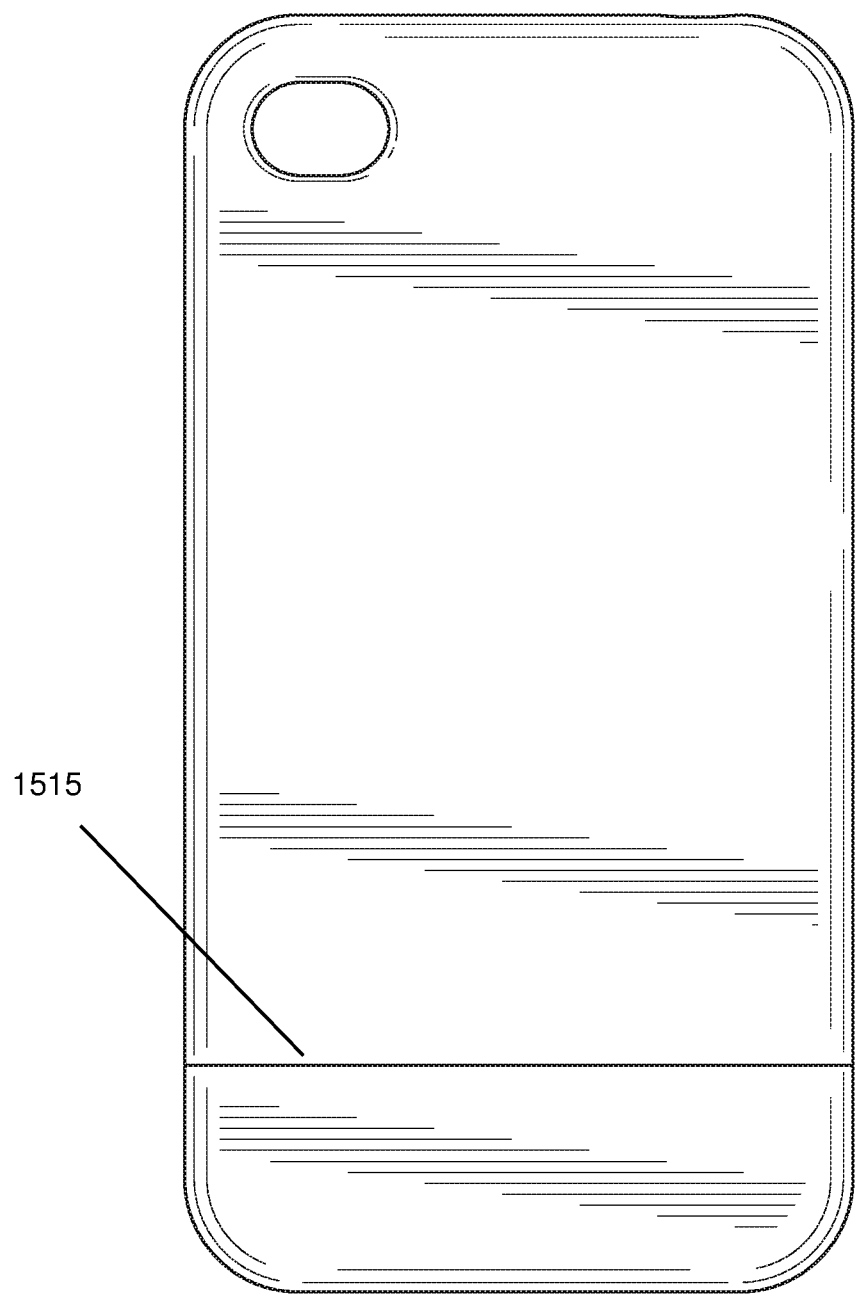
FIG. 15 shows a back view of the case.
Figure 16:
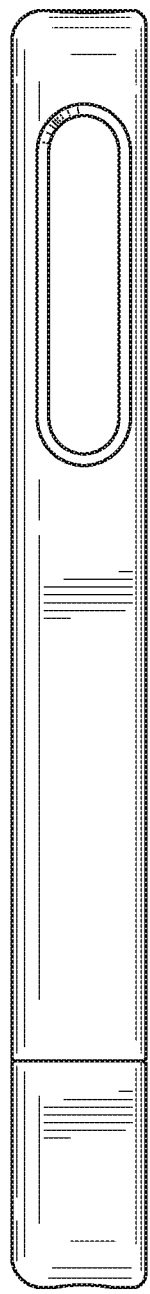
FIG. 16 shows a left side view of the case.
Figure 17:
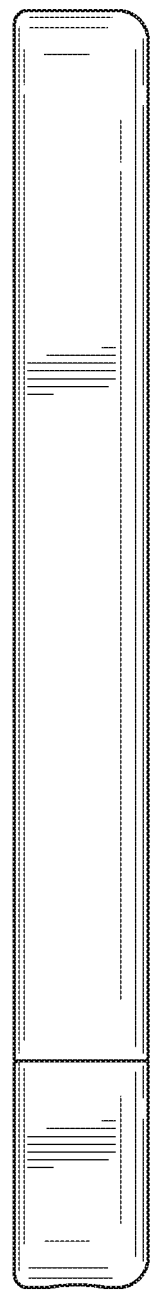
FIG. 17 shows a right side view of the case.
Figure 18:
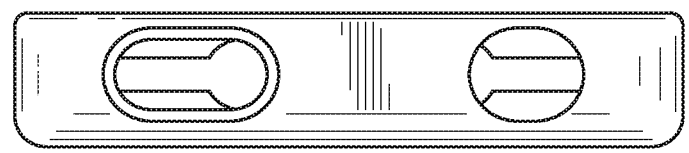
FIG. 18 shows a top view of the case.
Figure 19:
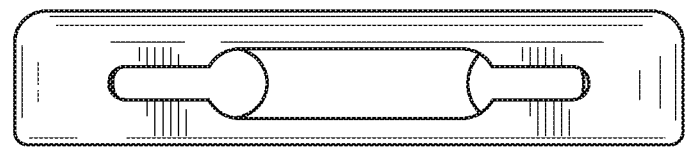
FIG. 19 shows a bottom view of the case.
Figure 20:
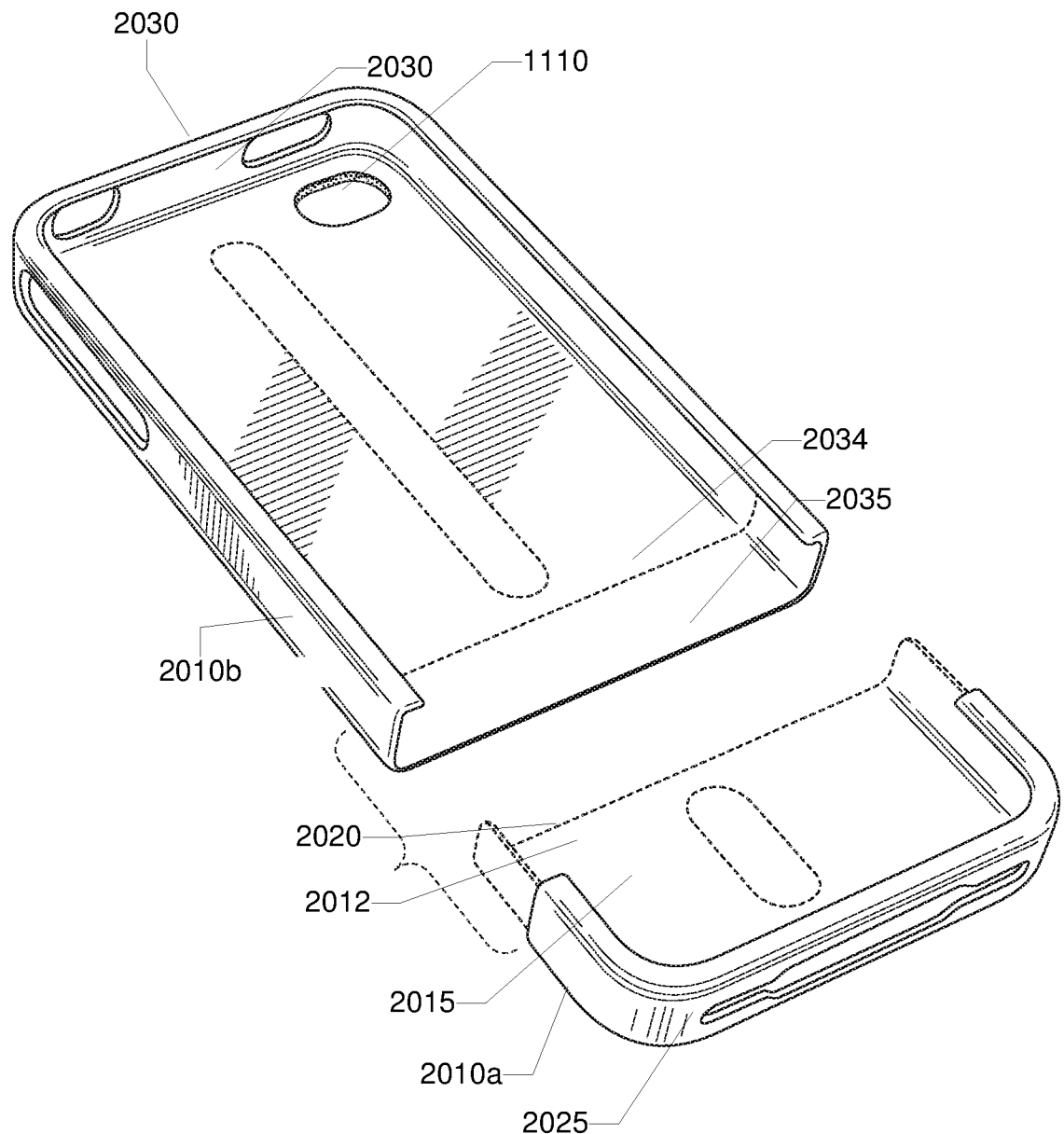
FIG. 20 shows a front perspective view of the case in a disassembled position.
Figure 21:
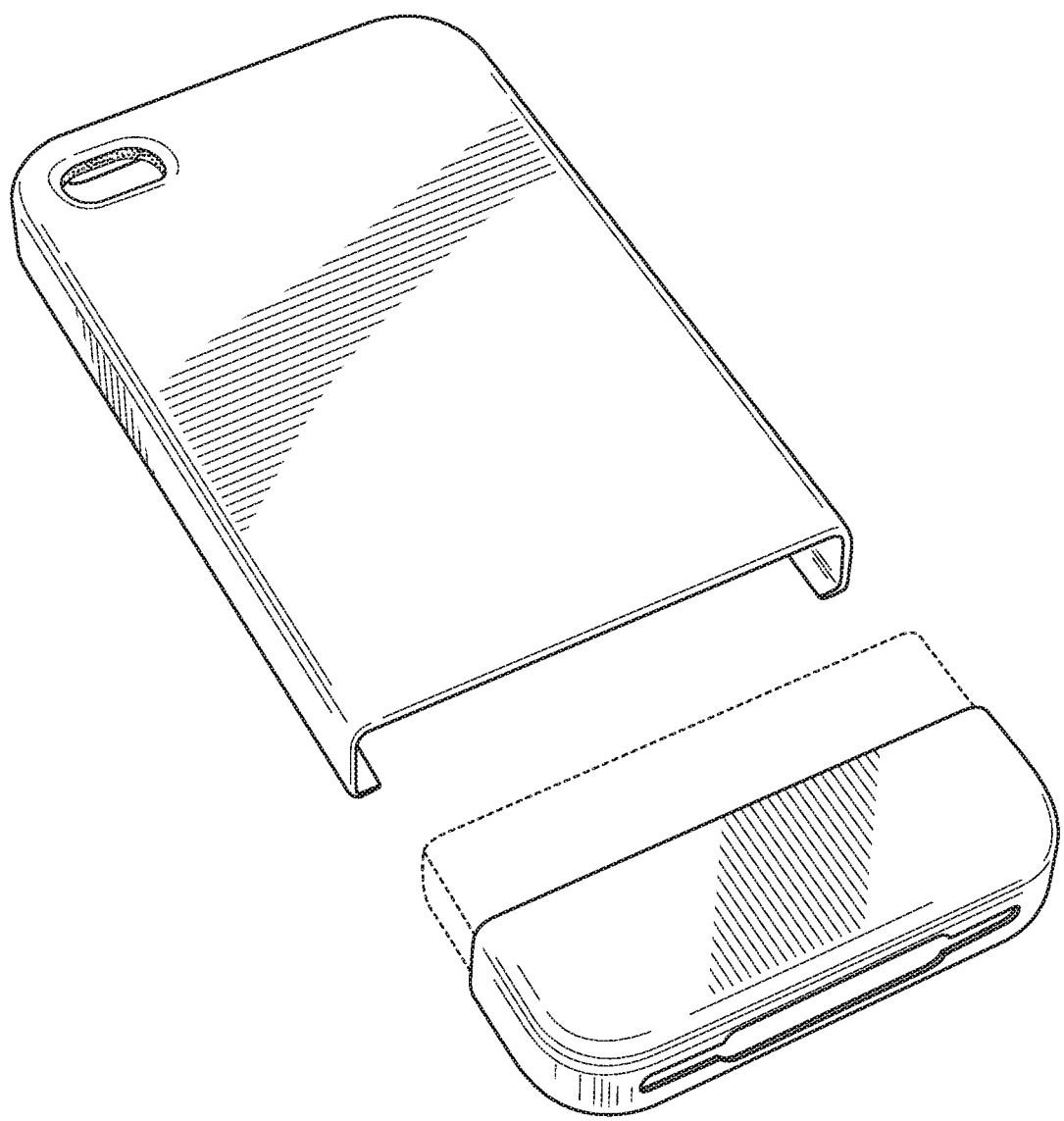
FIG. 21 shows a back perspective view of the case in the disassembled position.
Figure 22:
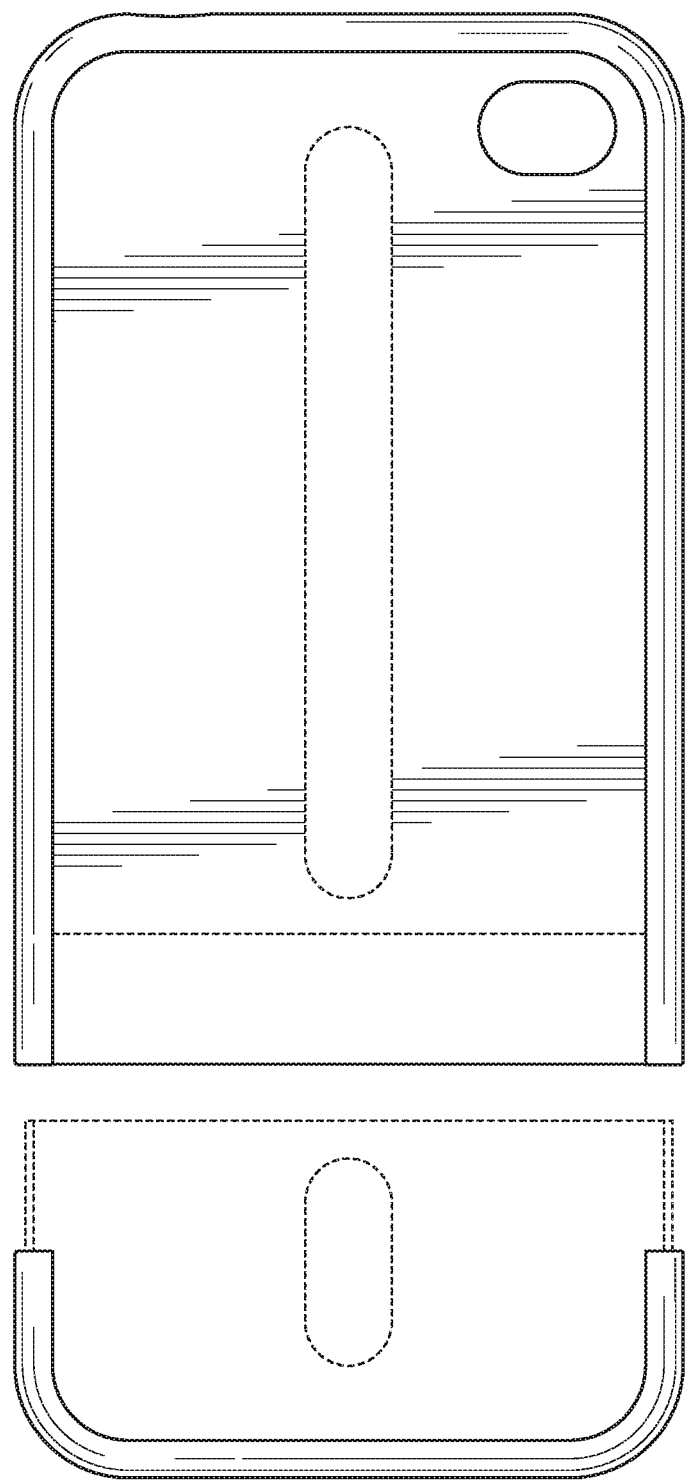
FIG. 22 shows a front view of the case in the disassembled position.
Figure 23:
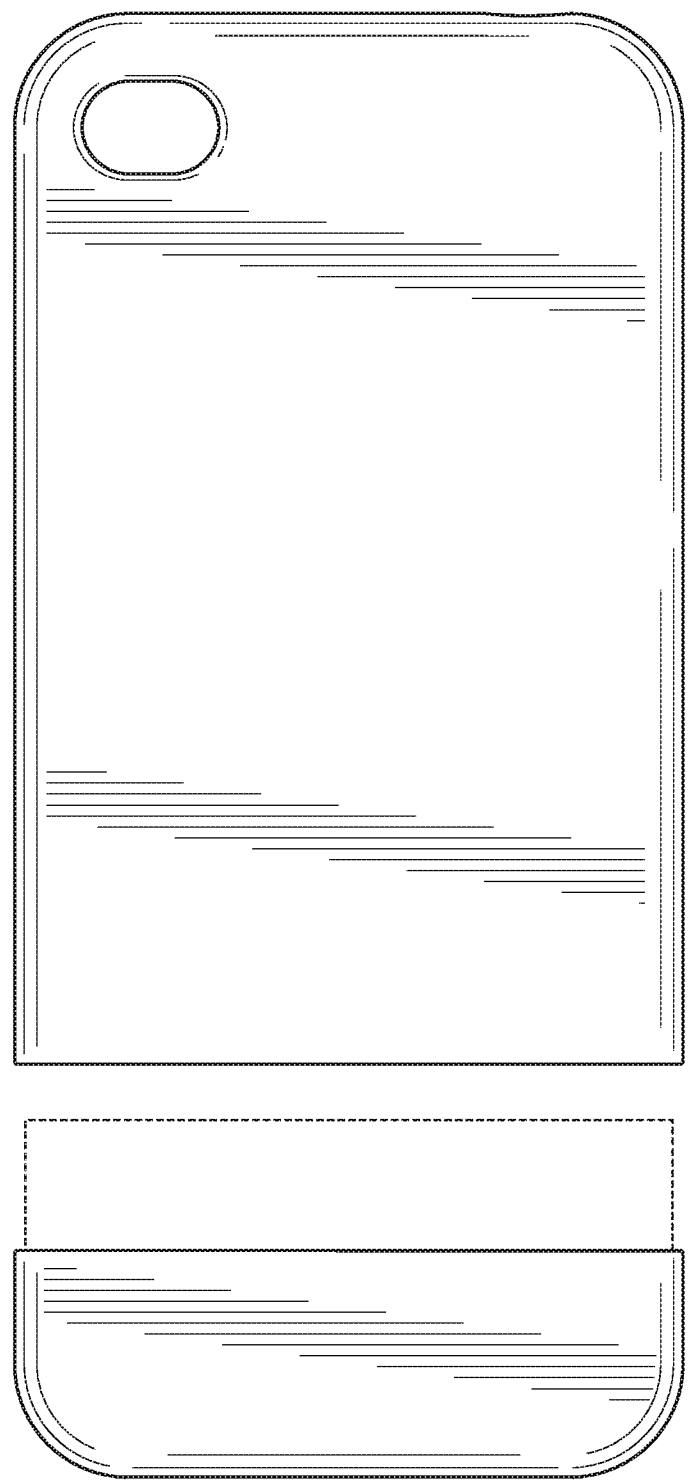
FIG. 23 shows a back view of the case in the disassembled position.

FIGS. 14-25 show some other views of case 1105. FIG. 14 shows a front view of the case. FIG. 15 shows a back view of the case. FIG. 16 shows a left side view of the case. FIG. 17 shows a right side view of the case. FIG. 18 shows a top view of the case. FIG. 19 shows a bottom view of the case. FIG. 20 shows a perspective of a front view the case in a disassembled position. FIG. 21 shows a perspective of a back view of the case in the disassembled position. FIG. 22 shows a front view of the case in the disassembled position. FIG. 23 shows a back view of the case in the disassembled position. FIG. 24 shows a left side view of the case in the disassembled position. FIG. 25 shows a right side view of the case in the disassembled position.

Referring now to FIG. 20, this case includes a first or lower case portion 2010a and a second or upper case portion 2010b. The first case portion includes a first open-shaped opening 2012, and a first base surface 2015 upon which a back of a housing of the electronic device will be placed against. The first base surface includes a top edge 2020 and a lower sidewall 2025, connected to the first base surface at an end opposite of the top edge, that will be positioned against a bottom side edge of the electronic device.

The second case portion includes an upper sidewall 2030 that will be positioned against a top side edge of the electronic device when the second case portion is seated against the first case portion. The second case portion further includes a second open-shaped opening 2034, and an open side end 2035, opposite the upper sidewall. The second case portion slides onto the first case portion through the open side end. When the second case portion is seated against the first case portion, the first and second case portions meet at and form a seam 1510 (FIG. 15) which extends across a back and sides of the case as shown in FIGS. 15-17. This seam and the location of the seam is further discussed in U.S. Pat. No. 7,612,997, issued Nov. 3, 2009 and U.S. patent application Ser. No. 12/847,887, filed Jul. 30, 2010 which are incorporated by reference.

When the second case portion is seated against the first case portion, the first open-shaped opening for the first case portion merges with the second open-shaped opening for the second case portion to form front opening 1120 (FIG. 11) of the case through which a screen 1010 of the electronic device (FIG. 10) will be visible. The front opening has a closed shape. Similarly, the camera-flash opening or back opening has a closed shape through which a camera flash and camera lens of the electronic device will be visible.

In this specific implementation, as shown in FIG. 20, camera-flash opening 1110 is in second or upper case portion. However, this location can change depending upon, for example, the location of the seam as described in U.S. Pat. No. 7,612,997 and U.S. patent application Ser. No. 12/847,887. Thus, in another specific implementation, the camera-flash opening is in the first or lower case portion.

The camera-flash opening has generally an oval or obround shape. The shape may be formed from two semicircles that are joined together using two parallel lines. However, the camera-flash opening shown in the case of FIGS. 11-25 is merely one example of an opening that can be used.

In other case embodiments, the camera-flash opening (or openings) may have different shapes or arrangements. For example, FIGS. 26-31 show a variety of camera and flash-hole options for a case. Specifically, FIG. 26 shows a back of a case having camera-flash opening for the camera and flash of the phone which the case holds. A detail section D6 indicates a shape of the opening. The detail section may have any of the opening options shown in FIGS. 27-31.

FIG. 27 shows a first opening arrangement that has a single opening having an oval or obround shape. FIG. 28 shows a second opening arrangement that has a single opening having a tear drop or egg-shaped shape (or shape like an outline of a belt going around a large gear and a small gear). FIGS. 29-30 show a third and fourth opening arrangement that has a single opening having a keyhole shape, being larger around the camera lens and smaller around the flash. FIG. 31 shows a fifth opening arrangement that has two circular openings, one large circular opening for the camera lens and a smaller circular opening for the flash.

There are other possible opening arrangements and shapes including polygonal, triangular, square, rectangular, rounded rectangular, triangular, hexagonal, octagonal, and so forth. Opening shapes and arrangements are further discussed in U.S. patent application Ser. No. 12/847,887, filed Jul. 30, 2010, which is incorporated by reference. Aspects and principles of the invention are applicable to the camera-flash opening arrangements presented in this application and also to other arrangements not specifically discussed. Any opening arrangement in FIGS. 27-31 and described above can be used for the case in FIGS. 11-25, and also for other portable electronic device cases.

FIG. 32 shows a back of a case with a camera-flash opening 3210 where the camera and flash of the phone (shown in the figure as circles with a broken line) are exposed through the opening. A section line A-A has been drawn through opening 3210 or the camera hole to indicate some camera hole edge treatment options as shown in the section views of FIGS. 33-40. A case regardless of what material the case is made of can have any of the edge treatment options shown in FIGS. 33-40.

FIGS. 33-34 show a painted black or other dark color treatment option applied to the camera-flash opening. The treatment options are indicated in the figures as dark heavily shaded lines or blocks. Specifically, FIG. 33 shows a first treatment option where an edge of the opening and an inside border surrounding the opening has been painted black. FIG. 34 shows a second treatment option where the edge of the camera opening has been painted black, but the inside and outside surfaces of the case surrounding the opening has not been painted black.

FIGS. 35-40 show camera hole treatment options where an insert or overmold is used. In a specific implementation, the dark heavily shaded blocks in FIGS. 35-40 indicate a black or dark colored insert or a glued or snapped in piece that may be TPU, TPE, TPR, silicon, or others as discussed above. In another specific implementation, the dark heavily shaded blocks in FIGS. 35-40 indicate an overmold. More specifically, FIG. 35 shows a third treatment option where a black or dark colored material has been applied to just the edge of the camera hole.

FIG. 36 shows a fourth treatment option where a case material edge of the opening has been sloped and a dark colored material has been applied to the sloped case material edge. The slope is angled so that when viewing the opening from the inside of the case towards the outside of the case and without the dark colored material, the case material edge slopes towards the outside or converges towards the outside. In other words, the opening becomes smaller or narrows as one moves from the inside of the case and towards the outside of the case. When the dark colored material is attached to the sloped case material edges a large area of the dark colored material (or border) will be facing the inside of the case (i.e., facing towards the flash) to help prevent the flash from bouncing off the inside of the case.

In another specific implementation, the slope of the case material edge is reversed from that shown in FIG. 36. That is, the size or area of the case material hole increases or enlarges as one moves from the inside of the case and towards the outside. In this specific implementation, when the dark colored material is attached to the sloped case material edges a large area of the dark colored material (or border) will be facing the outside of the case (i.e., facing away from the flash) to help prevent glare on the outside of the case.

Another benefit of sloping the case material camera-flash opening before applying the dark material is to provide more surface area as compared to a nonsloped or straight case material opening. The additional surface area can help to improve the bond between the case material and the dark material so that the dark material does not accidentally separate from the case.

In the implementations shown in FIGS. 33-35, the camera-flash opening (or rather the finished camera-flash opening) has a 0-degree slope, which means the edging is transverse or perpendicular to the plane of the phone and flash. Another technique to reduce glare is to manufacture the slope to be greater than 0 degrees, so that the opening has a concave edging (when viewed from the outside of the back side of the case). This can also be done by using a black or dark color material in the edging of the camera-flash opening. This dark material can alter the slope (from the original camera-flash opening edging). The dark coloring material can be overmolded, inserted, glued, or snapped in place (or any combination of these) on the case. The dark coloring material can be the same material as the other case material, or the dark coloring material may be a different material from the other case material.

For example, FIG. 37 shows a fifth treatment option where a dark colored material attached to the camera hole edge has a sloped face or edging. That is the slope is greater than 0 degrees. This sloping can help to reduce glare and provide good illumination of the camera subjects via the flash.

Generally, as light leaves a light source such as a flash, the light spreads out like a cone. That is, as the light photons leave the flash, the photons start to spread out in a cone-shaped beam or radiate outwards. So, sloping the edging of the camera-flash opening helps to reduce the amount of spreading photons or light rays which strike the edging surface of the camera-flash opening. These light rays, instead of illuminating the camera subjects, may instead be reflected back towards the camera and appear as glare in pictures and video taken by the camera.

Further, with the sloped edging, less of the spreading light rays will be blocked by the opening edging which means more light will reach the camera subjects. With more light reaching the subjects, the subjects will be better illuminated.

As the angle of the edging slope increases the likelihood of light reflecting back and causing glare may be reduced. For example, the law of reflection states that the angle of incidence is equal to the angle of reflection. Specifically, a ray of light approaching a surface may be referred to as the incident light ray. The ray of light that reflects off the surface may be referred to as the reflected light ray. At the point of incidence, i.e., where the incident light ray strikes the surface, a line can be drawn perpendicular to the surface. This line may be referred to as the normal line. The normal line divides the angle between the incident light ray and the reflected light ray into two equal angles. The angle between the incident ray and the normal may be referred to as the angle of incidence. The angle between the reflected light ray and the normal may be referred to as the angle of reflection, which is equal to the angle of incidence.

So, for edging having a 0 degree slope, when an incident light ray approaches the edging and strikes the edging at, for example, an angle of incidence of 45 degrees, the reflected light ray will have an angle of reflection of 45 degrees and may be directed towards the camera lens. The reflected light ray may then appear as glare in pictures and video taken by the camera. However, with a sloped edging the incident light ray will have a different angle of incidence and angle of reflection. With the sloped edging, the reflected light ray can be directed away from the camera lens so that glare to pictures and video taken by the camera can be prevented or reduced.

The angle of the slope can range from about 5 degrees to about 60 degrees including, for example, about 10, 20, 30, 45, or more than 60 degrees as measured from a horizontal line perpendicular to the opening. The angle may be less than 5 degrees. The particular angle of the slope can depend on factors such as the angle of the flash's reflector, the design of the flash and camera, the camera lens aperture, and so forth.

In an implementation, the thickness of the case can be altered to reduce glare. Under some conditions a thicker case is more effective at reducing glare issues than a thinner case. When a thicker thickness is used, the slope of the camera-flash opening edging can be altered to make it more concave as shown in FIG. 37, which will reduce glare issues. That is, the thicker case can have a sloped edging, i.e., an edging having a slope greater than 0 degrees, where the sloped edging acts as a lens hood. A lens hood helps to prevent or reduce glare by preventing undesirable light (e.g., lens flare) from entering the camera lens. Lens flare can be created when a very bright light, such as bright sunlight, enters the camera lens and hits the camera's sensor. This can cause undesirable bright streaks to appear in pictures and video taken by the camera.

Under other conditions, a thinner thickness can reduce glare. The case may be made to be thinner at the camera-flash opening region to reduce glare and thicker elsewhere to strengthen the case. Whether to use a thicker case or a thinner case can depend on factors such as the type of camera lens, e.g., wide angle lens versus telephoto lens. For example, a thick case can allow for a wide lens hood. But, when such a hood is used with a telephoto lens, the wide hood may not be able to prevent lens flare. So, it can be desirable to select a case thickness based on the type of camera lens.

FIG. 38 shows a sixth treatment option where the case material opening or hole has a countersink or depression on the inside of the case. This allows a dark colored material having a flange (e.g., insert or grommet) to be inserted into the hole such that the flange is recessed into the countersink and lies flush with the inside surface of the case.

Because of the countersink, the flange does not protrude past the inside surface of the case so that the back of the camera can be placed very close to the inside of the case. This helps to give the case a form factor or size that is very close to the form factor of the phone. In another specific implementation, the case is designed so that the flange does protrude past the inside surface of the case. This can allow the flange to contact the phone and make a seal around the flash of the phone. The sealing provided by the flange can help to prevent the light from escaping and bouncing off the inside of the phone.

Although FIG. 38 shows the countersink on the inside of the case, in another specific implementation, the countersink is on the outside of the case when, for example, the flange is to be on the outside of the case.

FIG. 39 shows a seventh treatment option where a dark colored material for the case camera-flash opening has an edging that is rounded, curved, or convex. Rounding the edging can further reduce glare and help prevent the spreading light rays from the flash from being blocked at the opening. See discussion on sloped edging above.

FIG. 40 shows a seventh treatment option where a dark colored material (or portions of the dark colored material) are recessed into a first countersink or depression on the outside of the case, and a second counter sink or depression on the inside of the case. In a specific implementation, the dark colored material is a grommet having a tubular body portion, a first flange connected to an end of the tubular body portion, and a second flange connected to an opposite end of the tubular body portion. The first flange is recessed into the first countersink and the second flange is recessed into the second counter sink.

In this specific implementation, the area of the first countersink (or first flange) is less than the area of the second countersink (or second flange). In other words, there is a greater area or amount of the black material on the inside of the case as compared to the outside of the case. This implementation may be appropriate where it is likely that there will be more glare that results from light bouncing off the inside of the case as compared to the outside of the case, such as when there is a large gap between the back of the phone and the inside of the case.

In another specific implementation, the area of the first countersink (or first flange) is greater than the area of the second countersink (or second flange). In other words, there is a greater area or amount of the black material on the outside of the case as compared to the inside of the case. This implementation may be appropriate where it is likely that there will be more glare that results from light outside of the case as compared to the inside of the case.

In another specific implementation, the areas of the first and second countersinks or flanges are the same.

Any of the treatment options shown in FIGS. 33-40 and described above can be used with any of the opening arrangements shown in FIGS. 27-31.

FIGS. 11-25 show merely one specific implementation of a case with a camera-flash opening having features to prevent or reduce glare. The case is of a two-piece design. However, as one of skill in the art would recognize, a case can be of a single-piece or one-piece design. With a single-piece case design the case can be designed to snap onto a back of the phone. Further, in a specific implementation, the case will include a battery, enclosed between the base back surface and the back of the case to lengthen a battery life of the device. A battery case is described in U.S. Pat. No. 7,612,997, issued Nov. 3, 2009, which is incorporated by reference.

This invention relates to a case for portable electronic devices, and more specifically, to a case with a battery.

There are many types of portable electronic devices including personal digital assistants (PDAs), computers, smartphones, mobile phones, satellite phones, cellular phones, pagers, music player, MP3 players, media players, digital cameras, video cameras, bar code scanner, global positioning system (GPS), and portable game consoles. Typically these devices are battery powered, so that people can carry and use the devices during their daily lives (e.g., on a bus or train, while in flight on an airplane, at the gym on the stair stepper, walking down an aisle, riding a bike, or driving a car).

These portable electronic devices allow people to play and record music, send and receive e-mail, send text messages, browse Web pages, make phone calls, play and record video, take and view pictures, edit documents, and much more. These devices continue to revolutionize the way people interact, learn, connect with other people, conduct business, and find things. They help people manage their daily lives and sometimes are an entertainment source.

Because portable electronic devices are somewhat fragile and used to carry valuable personal information (e.g. phone numbers, financial information, private photos or videos, and favorite music tracks), many people protect their portable electronic devices using cases. Depending on the particular case design, these cases protect the back, side, and front of the devices from scratches, dings, drops, and other physical damage. Some cases may even have pockets to hold extra batteries or memory. So, when a battery becomes discharged, the person can take the used battery out of the portable electronic device and replace it with a fresh battery from the case's pocket. Then the used battery can be recharged using a recharger at home.

Also as modern portable electronic devices evolve, they continue to provide more features and greater functionality. For example, screen sizes become larger and have greater resolution. The devices have greater wireless range or capabilities (e.g., 3G broadband wireless) and more numbers of sensors (e.g., touch screen, accelerometer, proximity sensor, and ambient light sensor). Applications that run on the devices also may use more processing power. All these improvements and changes usually are an additional drain on the battery, shortening how long these devices can be used on a single charge.

Therefore, it is desirable to increase the battery life of portable electronic devices and also to protect these devices from damage. There is a need for a portable electronic device case that also provides additional battery life.

A case for an electronic device protects and extends the battery life of the electronic device. The case has a lower case portion and an upper case portion, which assemble together to protect the top, side, and bottom edges of the electronic device. The lower case portion includes a battery to extend the battery life of the electronic device.

To assemble the case together, the upper case portion slides onto the electronic device and the lower case portion. The case has openings which allow a user with fully access the features of the portable electronic device. A front opening of the case for a screen of the electronic device is formed by a merging of partial openings in the upper and lower case portions. The case also allows the electronic device to synchronize with another device without removing it from the case.

In an implementation, a case for an electronic device includes a lower case or first case portion including: a base surface upon which a back of the electronic device will be placed against, where the base surface includes a top edge; a battery, enclosed in the lower case portion; electronic circuitry, connected to the battery; a lower sidewall, connected to the base surface at an end opposite of the top edge, that will be positioned against a bottom side edge of the electronic device; an inner connector, on the lower sidewall, positioned to connect to a connector of the electronic device, and connected through the electronic circuitry to the battery; and an outer connector, positioned on an outside bottom side of the lower case portion, connected through the electronic circuitry to the battery and inner connector.

The case includes an upper or second case portion including: an upper sidewall that will be positioned against a top side edge of the electronic device when the upper case portion is seated against the lower case portion; and an open side end, opposite of the upper sidewall. The upper case portion slides onto the lower case portion through the open side end in a direction along the base surface from the top edge to the lower sidewall. When the upper case portion is seated against the lower case portion, the upper and lower case portions meet at and form a seam which extends across a back of the case.

In various implementations, the upper case portion further includes a left sidewall having an opening through which buttons on a left side of the electronic device will be accessible. The lower case portion further includes a back surface having a button, connected to the electronic circuitry, positioned on a side of the seam line closer to the outside bottom side of the lower case portion. The lower case portion includes an opening through the base back surface against which a camera lens opening of the electronic device will be placed. The lower and upper case portion are made of rigid plastic material. In particular, the upper and lower portions are not made of a relatively flexible material such as rubber or silicone.

The lower case portion includes: a first group of openings, positioned on the lower sidewall on a first side from the inner connector, where a first speaker opening for the electronic will be placed against the first openings when electronic device is connected to the inner connector. There is a second group of openings, positioned on the lower sidewall on a second side from the inner connector, where a second speaker opening for the electronic will be placed against the second openings when electronic device is connected to the inner connector. There is a third plurality of openings, positioned on the outside bottom side, where each of the third openings is smaller than an opening for the outer connector.

When the upper case portion is seated against the lower case portion, a first open-polygon opening for the lower case portion merges with a second open-polygon opening for the upper case portion to form a front opening, having a closed-polygon shape, of the case through which a screen of the electronic device will be visible. When the upper case portion is seated against the lower case portion, on a back side of the case, the upper case portion overlaps at least one portion of the lower case portion to hold the upper case to the lower case portion.

The lower case portion has a button, connected to the electronic circuitry. By using the button, the case can be switch from one mode to another. For example, via the button, the case is placed in a first mode during which synchronizing with the electronic device will be permitted or in a second mode during which charging of the electronic device will be permitted.

The lower case portion includes some lighting indicators (e.g., LEDs), which are connected to the electronic circuitry. After pressing the button for a first time period, the lighting indicators will specify a level of charge remaining for the battery. After pressing the button for a second time period, longer than the first time period, the circuit enters the first mode (e.g., synchronization). When connecting a cable to the outer connector of the lower case portion, the cable does not pass through any opening of the upper case portion.

In an implementation, a method making an electronic device case includes: providing a lower case portion of the electronic device case including a base front surface and base back surface; enclosing a battery between the base front surface and base back surface; connecting electronic circuitry to the battery and an inner and outer connector; and providing an upper case portion for the electronic device case that slides onto the lower case portion, where when the upper case portion is seated against the lower case portion, the upper and lower case portions form a seam which extends across a back of the case.

In various implementations, the base back surface includes a base upper back surface and base lower back surface, the base back surface has a first side, a second side, and a first thickness between the first and second sides. The method further includes: enclosing the electronic circuitry between the base front surface and the base lower back surface; making a cavity in the base lower back surface, where the cavity extends from the second side toward, but not through to the first side, and a second thickness from an end of the cavity to the first side is thinner than the first thickness; and positioning a lighting source of the electronic circuitry facing toward the cavity, wherein when turned on, the lighting source emits visible light that passes through the second thickness, but not the first thickness, to the first side.

The method includes: providing a button in the base back surface, where the button is connected to the electronic circuitry and a surface of the button is flush with a surface of the base back surface; providing indicator lights in the base back surface, where the indicator lights are connected to the electronic circuitry; after holding the button for a first time period, using the indicator lights to show a charge level of the battery; and after holding the button for a second time period, longer than the first time period, entering a sync mode to establish a data path between the inner and outer connectors.

After entering the sync mode, pressing the button causes exiting of the sync mode. After entering the sync mode, at least one of the indicator lights is used to indicate the circuitry is in the sync mode. A metal shield is provided between the electronic circuitry and the base front surface.

In an implementation, a kit for case for an electronic device includes: a foam tray (e.g., black foam) including a first compartment and a second compartment; a cable, contained within the first compartment; and a case for a portable electronic device, contained within the second compartment.

The case includes: a lower case portion comprising a base front surface and base back surface; a battery, contained between the base front surface and base back surface; electronic circuitry, coupled to the battery; and an upper case portion, attached to the lower case portion. A a first open-polygon opening for the lower case portion merges with a second open-polygon opening for the upper case portion to form a front opening of the case through which a screen of the electronic device will be visible, the front opening having a closed-polygon shape.

The cable is a universal serial bus cable having a first end with a USB Type A plug connector and a second end having USB Mini-B plug connector. When the lower case portion is attached to the lower case portion, the upper and lower case portions meet at and form a seam which extends across a back of the case.

In an implementation, a case for an electronic device includes a lower case portion and upper case portion that slides onto the lower case portion. The lower case portion includes a battery; electronic circuitry, connected to the battery; a lower sidewall; and an inner connector, positioned on the lower sidewall and connected to the battery through the circuitry. A first opening is positioned on the lower sidewall in a first direction (e.g., left) away from the inner connector. A second opening is positioned on the lower sidewall in a second direction (e.g., right) away from the inner connector, where the second direction is opposite of the first direction. The first and second openings may be audio openings (e.g., stereo sound).

An outer connector is positioned on a bottom side of the lower case portion and connected to the battery and inner connector through the circuitry. A third opening is positioned on the bottom side, where a first line through the first opening, second line through the second opening, and a third line through the third opening are parallel to each other. The base front surface may include raised cushioning strips running a third direction, transverse to the first direction.

The upper case portion includes upper, first, and second sidewalls, and a seam edge extends from the first sidewall across a back of the upper case portion through to the second sidewall. The seam edge is generally transverse to the first line. The seam edge is generally transverse to the strips.

The back of the lower case portion can include a number of lighting indicators, connected to the circuitry; and a button, connected to the circuitry, where after pressing the button for a first time period (e.g., less than 3 seconds), the light indicators will specify a level of charge remaining for the battery, and after pressing the button for a second time period (e.g., 3 seconds or more), longer than the first time period, the circuit enters a sync mode.

There are a number of ways to exit the sync mode. After entering the sync mode, when the outer connector is not connected to another electronic device within a third time period (e.g., 30 seconds), longer than the second time period, the circuitry exits the sync mode. After entering the sync mode, when the button is pressed, the circuitry exits the sync mode. After entering sync mode, when the outer connector is disconnected from another electronic device, the circuitry exits the sync mode.

While in the sync mode, one of the lighting indicators flashes. At least one of the lighting indicators used to indicate a charge level of the battery is also used to indicate the circuitry is in the sync mode.

The lower case portion further includes a first camera opening on a base front surface, where the first camera opening is a closed polygon (e.g., circle, square, or hexagon) having a first area; and a second camera opening on a base back surface, where the second camera opening is a closed polygon having a second area, larger than the first area, and the battery is enclosed between the base front surface and base back surface.

A back of the lower case portion includes a number of lighting indicators (e.g., three, four, or five), connected to the circuitry, where a line extends between a first and second of the lighting indicators. A button is connected to the circuitry, and this button is positioned so the line (passing through the first and second of the lighting indicators) does not pass through the button.

A back of the lower case portion includes a number of lighting indicators, connected to the circuitry, where a line segment extends between a first and second of the lighting indicators. A button is connected to the circuitry and this button is positioned in a third direction (e.g., below) from the line segment, transverse to the first direction and is equidistant (e.g., centered between) to ends of the line segment.

After the upper and lower case portions are joined, a seam line divides the case so the lower case portion is from about 0.18 to about 0.38 of a length of the joined case. After the upper and lower case portions are joined, a seam line divides the case so for a front of the case, the lower case portion is about X of a length of the joined case and for a back of the case, the lower case portion is about Y of a length of the joined case, where X and Y are numbers and Y is greater than X. For example, X is about 0.23 and Y is about 0.27.

In an implementation, a method includes: providing a lower case portion of an electronic device case including a base front surface and base back surface; providing a first camera opening on the base front surface, where the first camera opening has a closed polygon shape; enclosing a battery between the base front surface and base back surface; providing electronic circuitry connected to the battery and an inner and outer connector; and providing an upper case portion for the electronic device case that slides onto the lower case portion, where the upper case portion comprises a seam edge that extends from a first front corner across a back of the upper case portion through to a second front corner.

The base back surface includes a base upper back surface and base lower back surface. The base back surface has a first side, a second side, and a first thickness between the first and second sides. The method further includes: enclosing the electronic circuitry between the base front surface and the base lower back surface; making a cavity in the base lower back surface, wherein the cavity extends from the second side toward, but not through to the first side, and a second thickness from an end of the cavity to the first side is thinner than the first thickness; and positioning a lighting source of the electronic circuitry facing toward the cavity, wherein when turned on, the lighting source emits visible light that passes through the second thickness, but not the first thickness, to the first side.

A second camera opening is provided on the base back surface, where the second camera opening has a closed polygon shape and a first area of the first camera opening is less than a second area of the second camera opening. The base back surface includes a sloped lens hood around the first camera opening, extending from the first camera opening to the second camera opening at least a thickness of the battery.

The method includes: providing a button in the base back surface, where the button is connected to the electronic circuitry and a surface of the button is flush with a surface of the base back surface; providing indicator lights in the base back surface, where the indicator lights are connected to the electronic circuitry; after holding the button for a first time period, using the indicator lights to show a charge level of the battery; and after holding the button for a second time period, longer than the first time period, entering a sync mode to establish a data path between the inner and outer connectors.

The method includes after entering the sync mode, pressing the button causes exiting the sync mode. The method includes after entering the sync mode, using at least one of the indicator lights to indicate the circuitry is in the sync mode.

In an implementation, a method includes providing a lower case portion. The lower case portion includes a front side, a back side, and a lower sidewall. The lower case has no indicator lights on a front side. The lower case has an inner connector having a first width (e.g., 22 millimeters) and an outer connector having a second width (e.g., 8 millimeters). The second width is less than the first width. The first width is from about 2 to about 2.75 times wider than the second width.

The lower case portion includes a number of indicator lights (e.g., five) on a back side. A button is centered (e.g., below a middle of the five indicator lights) on the back side. Holding the button for more than a time period (e.g., three seconds or more) indicates to the circuitry to enter a synchronization mode. The lower case portion has a battery and circuitry to charge the battery using power input through the outer connector. The battery charges a portable electronic device to be connected to the inner connector.

A first camera opening (e.g., a circle) on a base front surface of the lower case portion has a first diameter. A second camera opening (e.g., a circle) on a base back surface of the lower case portion has a second diameter greater than the first diameter. A first set of audio openings is positioned on the lower sidewall at a first side (e.g., left) of the inner connector. A second set of audio openings is positioned on the lower sidewall at a second side (e.g., right) of the inner connector A third set of audio openings on an exterior lower side of the lower case portion is at a second side of the outer connector. A first line passing through one of the first set of audio openings is parallel to a second line passing through one of the third set of audio openings.

The lower case portion has a first raised strip on the base front surface. The lower case portion has a second raised strip on the base front surface. The raised strips are made of the same material and provide some cushioning, compared to the base front surface.

In a specific implementation, when the phone is placed on the base front surface and connected to the inner connector, a top of the phone does not extend beyond an upper edge of the base front surface. A front opening of the assembled case is generally rectangular with rounded corners. The front opening has a first frame edge that extends in a vertical direction from a first seam line toward a first rounded corner at a bottom left of the lower case portion, through the first rounded corner to a second frame edge that extends in a horizontal direction toward a second rounded corner at a bottom right of the lower case portion, through the second rounded corner to a third frame edge, parallel to the first frame edge to a second seam line.

The first seam line is inline with the second seam line. The first seam line is transverse to the vertical direction. The first seam line is positioned at from about 0.15 to about 0.38 of a vertical length of the lower case portion. Further, when the upper case portion is on the lower case portion, the first seam line is positioned at about 0.23 of a length of a vertical length of the assembled case. When a portable electronic device is inserted in the inner connector, a lower edge of a screen is parallel to the first seam line.

When the upper case portion is on the lower case portion, there is a third seam line for a back of the case. The third seam line is positioned at a different ratio (e.g., 0.27 versus 0.23) of the vertical length of the assembled case.

On a left side, the upper case has a first slot opening. On a top side, the upper case has a circular opening and a second slot opening, smaller than the first slot opening. On a back, the upper case has a camera opening.

In an implementation, a back and side surface of the upper case portion is coated with a soft-touch coating. A front inside surface of the upper case portion is polished to a glossy finish. A front, back, and side surface of the lower case portion is coated with the soft-touch coating. The base front surface of the lower case portion is polished to a glossy finish.

FIGS. 41A-41C show a case that protects a portable electronic device 4101 (e.g., smartphone, music player, or camera) from damage and also has a built-in battery to extend the battery life of the portable electronic device. FIG. 41A shows an upper case portion 4104 of the case, FIG. 41B shows a lower portion 4108 of the case, and FIG. 41C shows a representative portable electronic device 4101. This figures show the case and electronic device in a portrait mode orientation. However, the orientation of the case may change (e.g., landscape mode orientation or upside-down orientation) or vary depending on the point of view or the orientation of the electronic device. So, the lower case portion may become the upper case portion, right-side case portion, or left-side case portion. The upper case portion may become the lower case portion, right-side case portion, or left-side case portion. Regardless of the orientation, the case has two portions, where one case portion encloses a built-in battery. The lower case portion may also be referred to as a first case portion and the upper case portion may be referred to as a second case portion.

Figure 42:
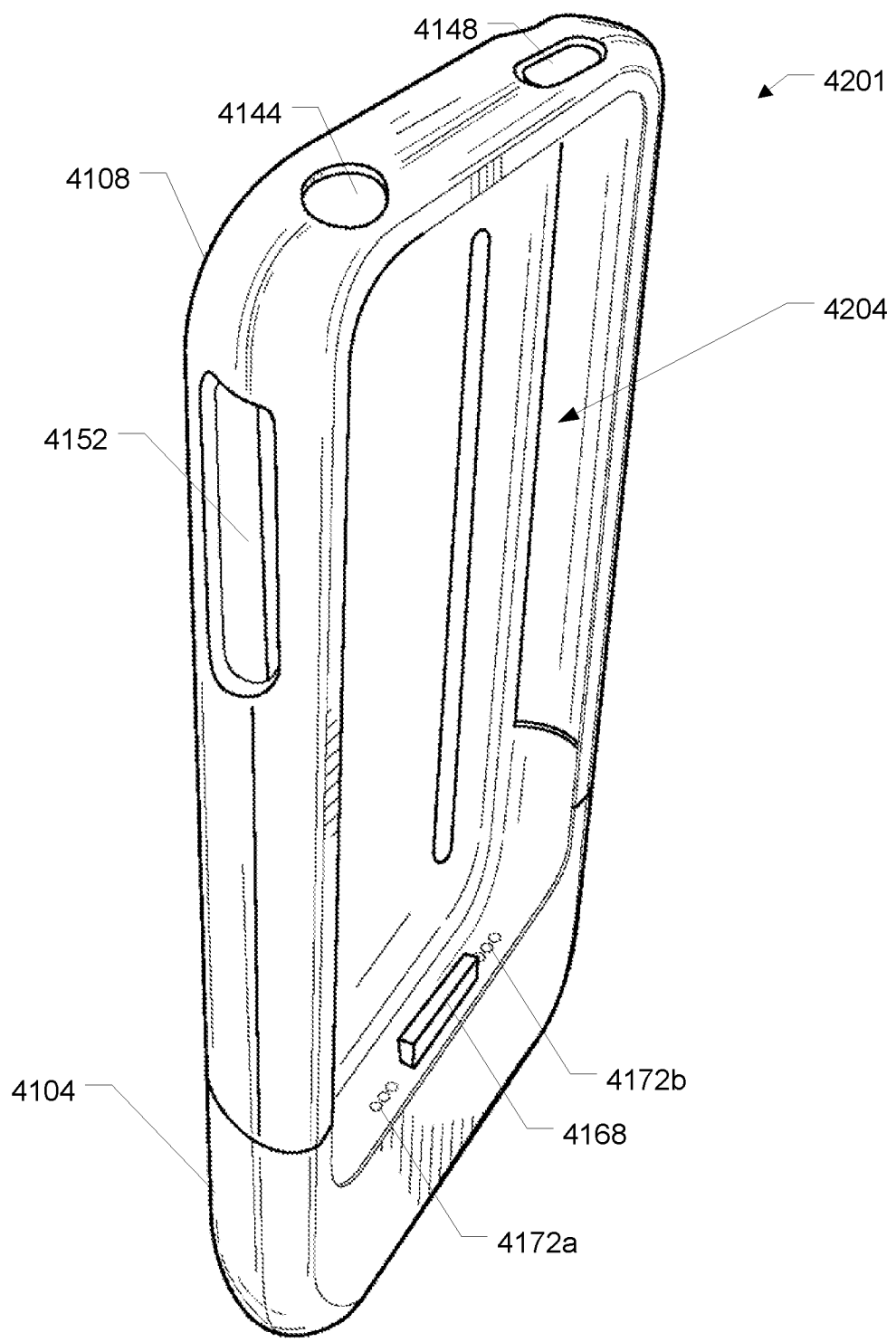
FIG. 42 shows the portable electronic device case, where the upper and lower case portions are assembled together. The portable electronic device is not shown in the case.

The portable electronic device fits into the lower case portion. The upper case portion slides over the portable electronic device and lower case portion to secure the portable electronic device in place. FIG. 42 shows an assembled case 4201 with upper and lower case portions joined together, but without the portable electronic device in the case.

The case protects the portable electronic device and has openings which allow a user to access the features of the device. Further, the case includes a battery, enclosed within the lower case portion, to supplement the battery of the portable electronic device, thus increasing running time for the portable electronic device. Features and aspects of this case may be applied to cases for various portable electronic devices and device types.

In FIG. 41C, the portable electronic device is a smartphone. For purposes of discussion, this patent describes the case as being for a smartphone. Some examples of smartphones include the Apple® iPhone, Blackberry® Storm, Blackberry® Pearl, Samsung® BlackJack, LG® Touch phones, and LG® Dare, and there are many others.

However, the case can be used with any type of battery-powered portable electronic device, where this device does not necessarily provide telephony functionality. For example, in other implementations, the case may be for a portable or handheld gaming device (e.g., Sony® PlayStation® Portable or PSP®, or Nintendo® DS™), portable or palm-sized computer (e.g., OQO computer or Intel® Atom™ netbook), personal digital assistant (PDA), pager, audio player, video player, media player (Apple® Touch), cassette player, compact disc (CD) player, digital video disc (DVD) player, camera, video recorder, digital recorder, voice recorder, music recorder, digital audio recorder, or nonvolatile memory storage (e.g., Flash or phase-change memory).

Trademarks are the property of their respective owners. Apple is a trademark of Apple Computer Incorporated. Blackberry is a trademark of Research in Motion Limited. Samsung is a trademark of Samsung Electronics Company Limited. LG is a trademark of LG Electronics, Incorporated. Sony is a trademark of Sony Corporation. PlayStation and PSP are trademarks of Sony Computer Entertainment Incorporated. Nintendo is a trademark of Nintendo Company, Limited. Intel and Atom are trademarks of Intel Corporation. OQO is a trademark of OQO Incorporated.

In FIG. 41C, the smartphone has a top side edge where there is a headset jack 4112 and a sleep/wake button 4116. On a left side edge, there is a ring/silent switch 4120 and volume buttons 4124. On a back of the device (not shown in FIG. 41C), there is a camera lens 4128 (indicated using broken lines).

On a bottom side edge of the device, there are speaker and microphone openings (not shown) and an electrical connector (not shown). Via the electrical connector, the phone can be charged or connected to another device, such as a computer or another smartphone, for synchronizing or transferring of files.

On a front of the device, there is a screen 4132, which may be a touch screen. Below the touch screen, there is a button 4136, and above the touch screen, a telephone receiver 4140 (which a user can hold to an ear to hear a telephone conversation).

While the device is in the case, the user will still be able to access the features of the device. Specifically, for example, for accessing headset jack 4112 and sleep/wake button 4116, upper case portion 4104 has on its top side (upper sidewall), a headset jack opening 4144 and a button opening 4148, respectively. For accessing ring/silent switch 4120 and volume buttons 4124, the upper case portion has on its left side (left sidewall), a side opening 4152. For camera lens 4128, lower case portion 4108 has a camera opening 4156 and upper case portion 4104 also has a corresponding camera opening (not shown in FIG. 41A). The camera opening in the upper case portion lines up with the camera openings in the lower case portion.

As shown in FIG. 42, when assembled together, the upper and lower portions of the case define an opening 4204 in the front, through which the user can view and access the touch screen, home button, and receiver. As shown in the figure, opening 4204 has a closed-polygon shape.

The closed-polygon shape can have any shape (e.g., square, trapezoid, pentagon, hexagon, octagon, star, circle, arch, or oval). In a specific implementation, the closed-polygon shape is a rectangle with rounded corners. This closed-polygon shape is formed by the merging of two open-polygon shapes. The upper case portion has a first open-polygon front opening; this shape may generally be described as an upside down U. The lower case portion has a second open-polygon front opening; this shape may generally be described as a U. To assemble the case together, the upper case portion is seated or fitted against the lower case portion. Then the upside-down U of the upper case portion joins with the U of the lower case portion to form the rectangular closed-polygon-shaped front opening shown in FIG. 42.

The lower case portion has rubber strips 4160a and 4160b on a base front surface 4164. The strips protect and cushion the phone in the case. When placed in the case, a back of the electronic device will be placed against base front surface 4164. The base surface has a top edge 4165. There is a lower sidewall 4166 that is connected to the base front surface at an end opposite of the top edge. The lower sidewall will be positioned against the bottom side edge of the electronic device.

On the lower sidewall is an inside or inner connector 4168, which is positioned and will connect to the electrical connector on the bottom side edge of the electronic device. To the left and right of the inner connector are left speaker openings 4172a and right speaker openings 4172b. Each of the speaker openings 4172a and 4172b may include one or more individual openings. A left speaker opening on the bottom side edge of the electronic device will be placed against left speaker openings 4172a. A right speaker opening on the bottom side edge of the electronic device will be placed against right speaker openings 4172b. The electronic device's microphone and speakers transmit sound through these speaker (or audio) openings. More details on the speaker or audio openings are below.

Figure 43:
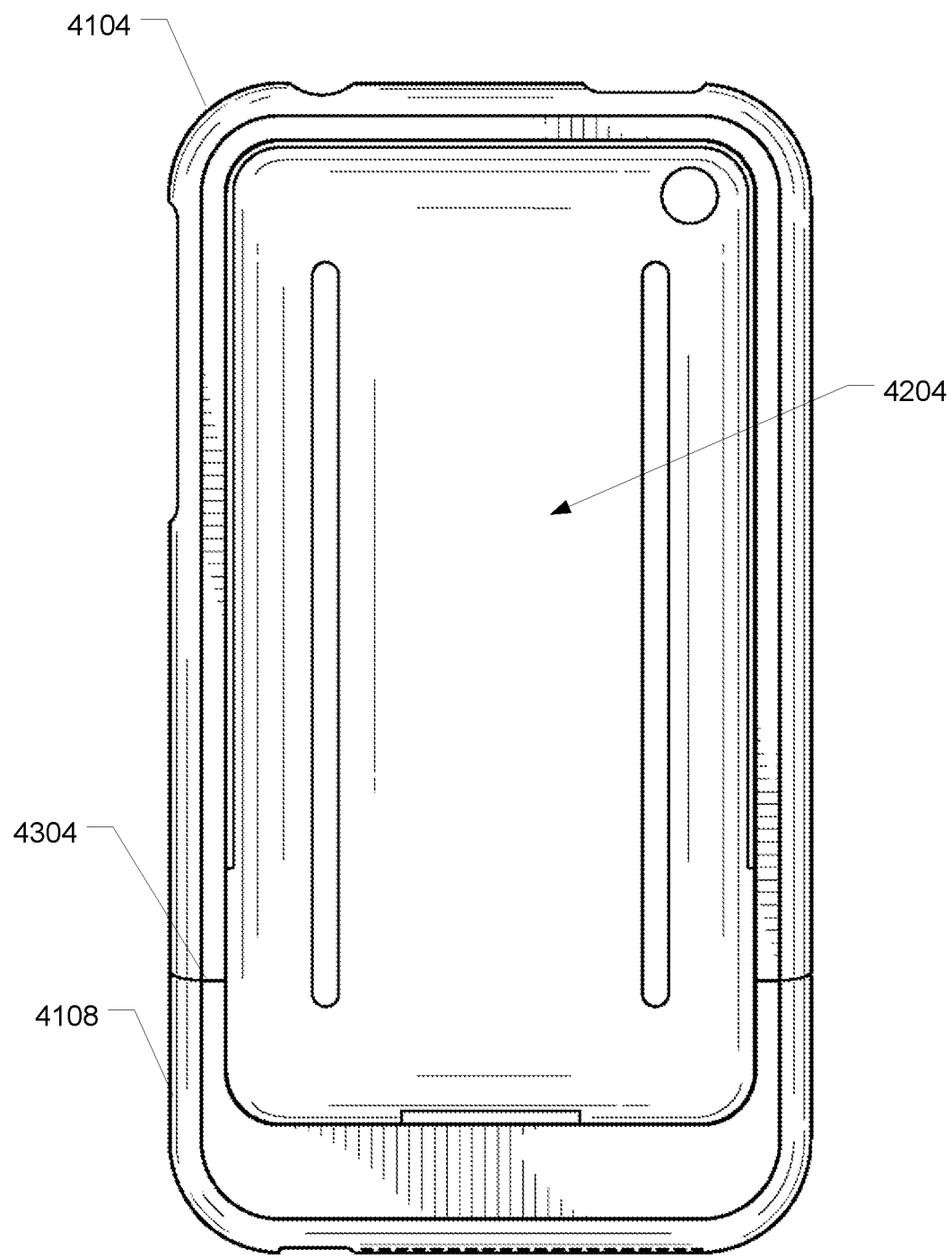
FIG. 43 shows a front view of the assembled case.

FIGS. 43-50 show various other views of the case. FIG. 43 shows a front view of the assembled case. Where upper 4104 and lower 4108 case portions meet, there is a seam line 4304. There are seam lines on either side (opposite sides) of front opening 4204.

Figure 44:
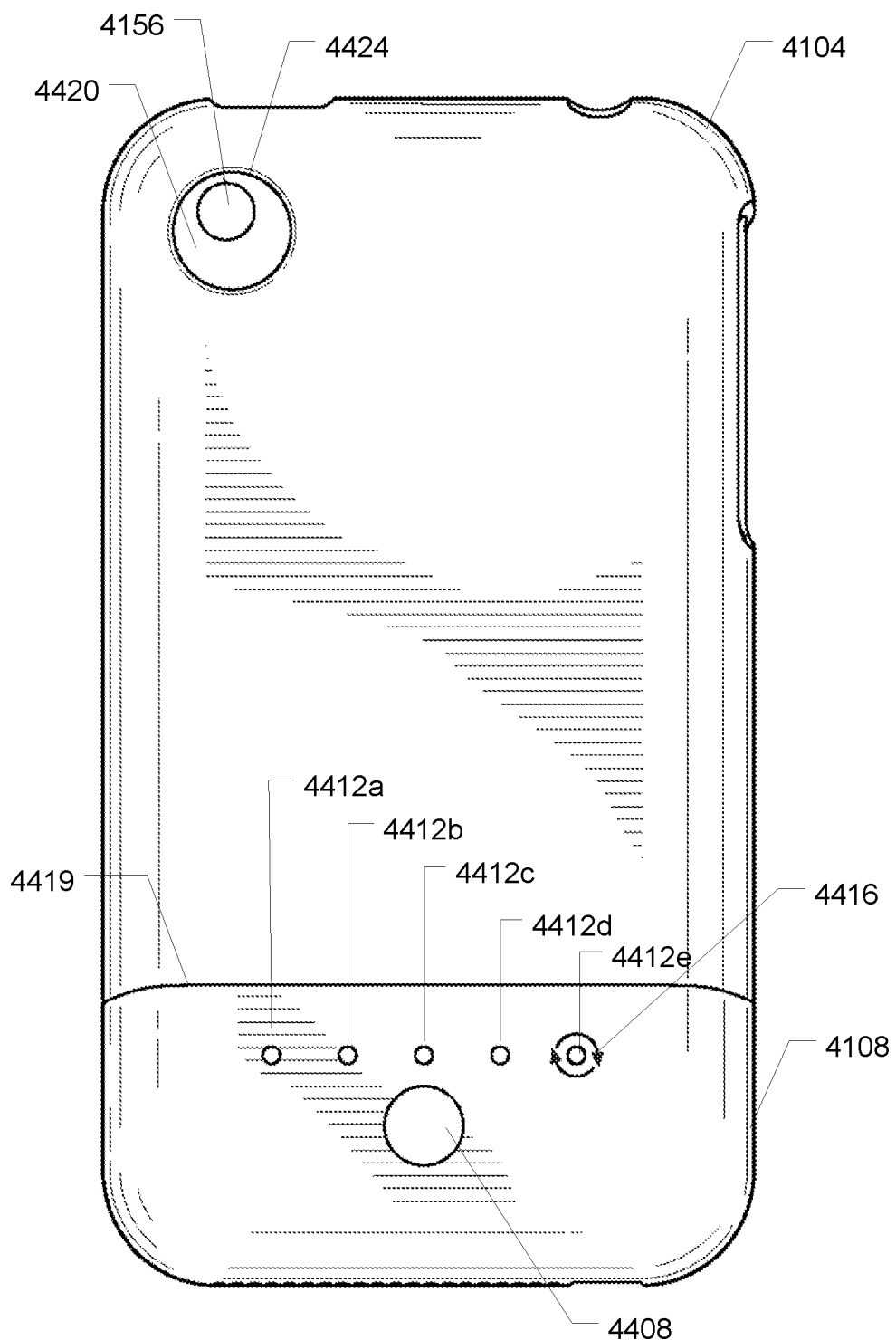
FIG. 44 shows a back view of the assembled case including a case button, indicator lights, a lens shield, and camera opening.

FIG. 44 shows a back view of the assembled case. For lower case portion 4108, there are a case button 4408 and indicator lights 4412a-e (e.g., light emitting diodes (LEDs) or other lighting sources). A synchronization (or sync) marking 4416 is around indicator light 4412e; this marking is optional. When the upper case portion is seated or fitted against the lower case portion, the upper and lower case portions meet at and form a seam line 4419 which extends across a back of the case.

The lower case portion includes a lens shield or lens hood 4420 (see also FIG. 52), which extends from camera opening 4156. Upper case portion 4104 also has a camera opening 4424 for the camera lens; camera opening 4424 is larger (i.e., larger diameter) than camera opening 4156. More details on the camera lens openings and lens shield are below.

Figure 45:
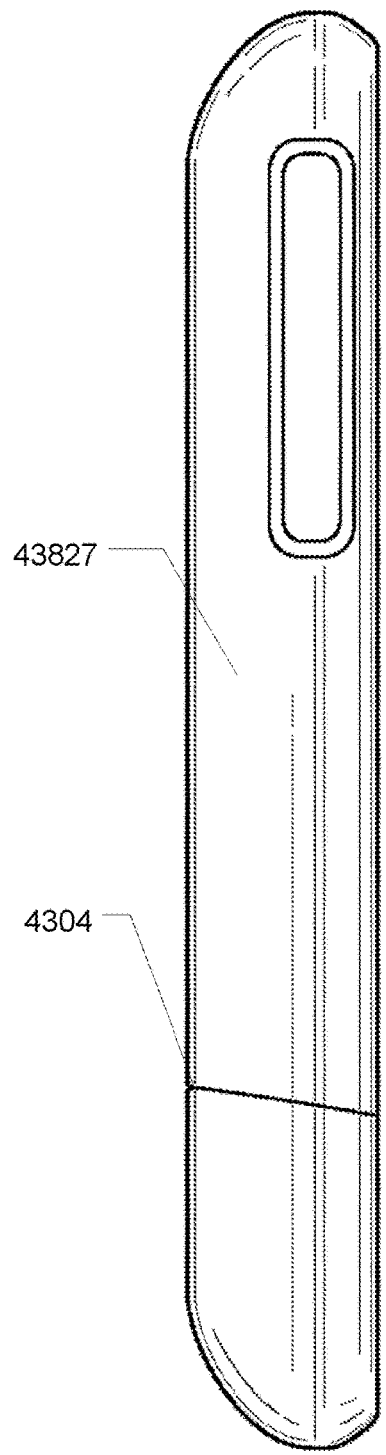
FIG. 45 shows a left side view of the assembled case.

FIG. 45 shows a left side view of the assembled case. Where the upper and lower case portions meet, there is a seam line that extends across the back and through the sides to the front. In a specific implementation, for the side of the case, seam line 4304 is angled slightly with respect to a horizontal line. For the front of the case, a distance (SM1) is from the seam line to the bottom of the case. For the back of the case, a distance (SM2) is from the seam line to the bottom of the case. The angled seam line on the side is due to distance SM2 being greater than distance SM1.

Figure 46:
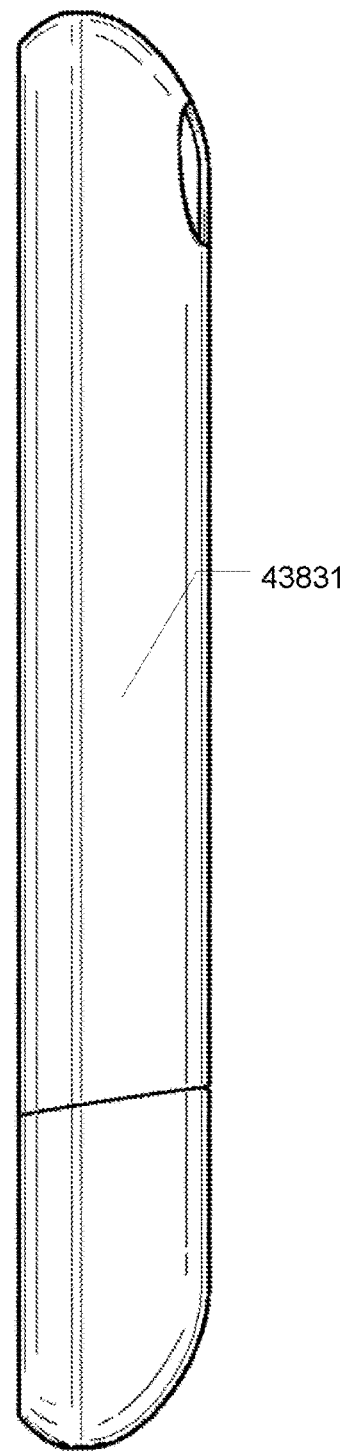
FIG. 46 shows a right side view of the assembled case.
Figure 47:
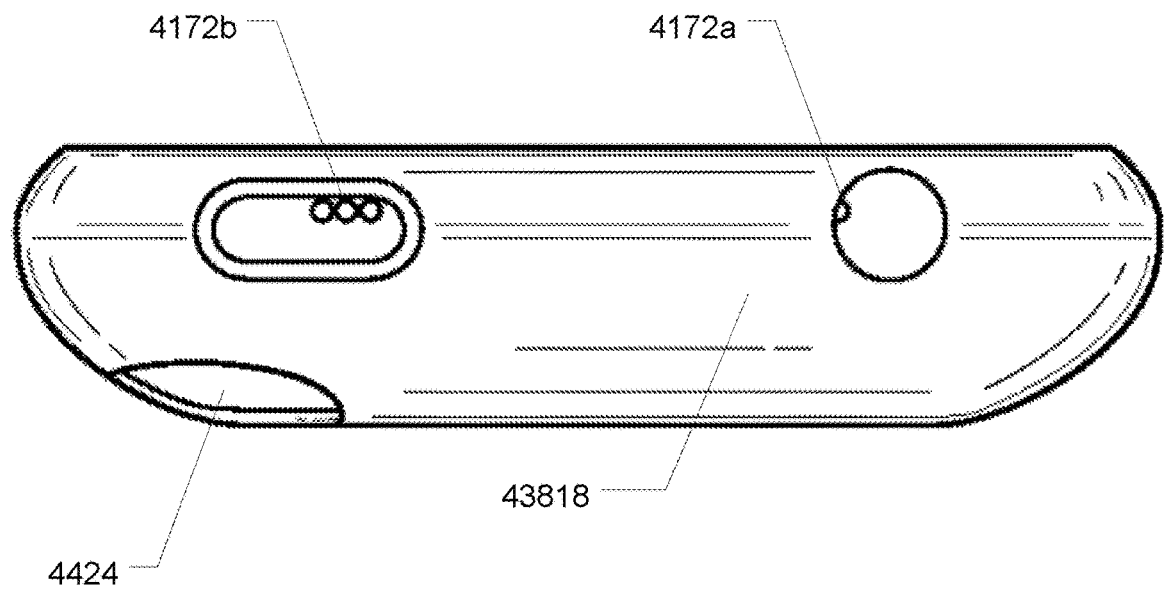
FIG. 47 shows a top side view of the upper case portion of the assembled case.

FIG. 46 shows a right side view of the assembled case. The seam line is also angled in this side view. FIG. 47 shows a top side view of the upper case portion of the assembled case. The speaker openings 4172a and 4172b are visible through the openings on the top side of the upper case portion. More details on camera opening 4424 are below.

Figure 48:
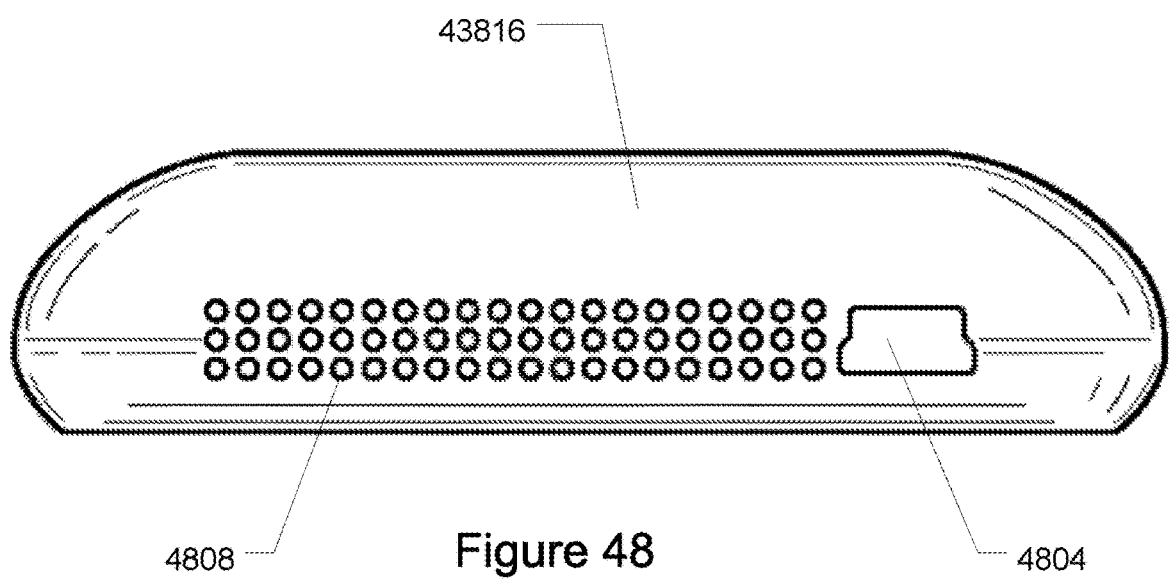
FIG. 48 shows a bottom side view of the lower case portion of the assembled case.

FIG. 48 shows a bottom side view of the lower case portion. The lower case portion has an outside or outer connector 4804 (e.g., a mini-B USB connector) and a grille or outside speaker opening 4808 that are positioned on an outside bottom side. The outer connector allows a user to connect the case and device via a cable (e.g., USB cable) to a power source or to synchronize with another electronic device. In the specific implementation in FIG. 48, the outer connector is positioned a bottom side edge of the lower case portion (or portion which encloses or conceals the battery). However, in other implementations, the outer connector may be positions at other locations. For example, the outer connector can be positioned on an outside right side edge of the lower case portion. The outer connector can be positioned on an outside left side edge of the lower case portion. The outer connector can be positioned on a back side (near or below the buttons and LEDs) of the lower case portion. The outer connector can be positioned on a front side (near or below the front screen opening) of the lower case portion. In alternative implementations, the outer connector may be position on the case portion which does not have enclose the battery (e.g., upper case portion); then the connector is connected to the battery via wires or other electrical connectors. The outer connector can be positioned on an outside top or upper side edge of the upper case portion. The outer connector can be positioned on an outside right side edge of the upper case portion. The outer connector can be positioned on an outside left side edge of the upper case portion. The outer connector can be positioned on a back side of the upper case portion. The outer connector can be positioned on a front side (near or above the front screen opening) of the upper case portion.

The outside speaker opening allows sound output (e.g., stereo sound output). Sound from the electronic device will travel through speaker openings 4172a and 4172b and output through openings 4808. Openings 4172a and 4172b are aligned with openings 4808, so a line passing through openings 4172a and 4172b will be parallel with lines passing through openings 4808. Note that openings 4808 are made up of individual circular openings that are each smaller than the opening for outer connector 4804. In other implementations, however, there can be any number of openings, larger or smaller than the openings shown, and each opening may have a different shape. More details on the outer connector and outside speaker opening are below.

FIG. 49 shows a front view of the upper case portion. The upper case portion includes a left sidewall 4904, a right sidewall 4908 (opposite the left side wall), an upper sidewall 4912, and an upper interior surface 4916 which connects to the left, right, and upper sidewalls. Generally, the upper interior surface is approximately perpendicular to the sidewalls. Sidewalls 4904, 4908, and 4912 generally form a three-sided rectangular frame with rounded corners (e.g., upside down U). The upper case portion also has an open side end 4919 (which would be the fourth side of the rectangular frame) that is opposite of upper sidewall 4912.

FIG. 50 shows a top view of the lower case portion. The lower case portion includes front base surface 4164 with strips 4160a and 4160b that run in a vertical direction (when viewing the case in a portrait orientation) on its surface. The electronic device (e.g., phone) will be placed on front base surface 4164 and inserted (e.g., by sliding) into inner connector 4168, which holds the phone to the lower case portion. There are a left insert 41004a and a right insert 41004b which curve upward at a lower portion of the base. These inserts extend from a lower sidewall 41006, which is generally shaped like a three-sided rectangular frame with rounded corners (e.g., U).

After the electronic device is placed on the front base surface, to assemble the case, a person takes the upper case portion and slides it (through open side end 4919 of the upper case portion) over the electronic device onto the lower case portion. The upper case portion slides onto the lower case portion through the open side end in a direction 41013 (i.e., vertical direction) along the base surface from the top edge to the lower sidewall.

In an implementation, the material of the case is a rigid hard plastic. Both upper and lower case portions are made of the same material. The upper case portion is formed of a shape to fit over the phone and lower case portions without need to stretch the upper case portion over the lower case portion. The case portions made of a relatively rigid material cannot be stretched as much as, for example, gel, silicone, or rubber, without cracking or breaking. More details on the material of the case are below.

The base front surface generally has a contour that matches or conforms to the back of the phone or other device which will lie on the base front surface. For example, if the phone has a convex curved back, then the base front surface will have a concave curved surface. The base front surface gives good support for the electronic device. A length of the base front surface is such that when an electronic device is placed on the base surface, the top edge base front surface is roughly aligned (e.g., same length, slightly longer, or slightly shorter) with a top side edge of the electronic device.

Strips 4160a and 4160b extend in the vertical direction along base front surface 4164 of the lower case portion. Strips 4160a and 4160b are typically a different material than the base front surface material and rise slightly above the base front surface. These strips can be made of a material that has cushioning properties such as rubber, vinyl, polymer, plastic, foam (e.g., material with bubbles), or silicone. Depending on the material used, the strips may also be slightly tacky. These strips help cushion the electronic device and prevent it from becoming scratched or marred, especially when inserting the device into the lower case portion. The strips also help to gently grip the electronic device so that it does not inadvertently slide or become as easily dislodged from the lower case portion.

The figures show a specific arrangement and number of strips, but in other implementations, there can be any number of strips in any arrangement. For example, there can be three, four, or more strips running in the lengthwise direction. Or the strips can run diagonally or horizontally on the base front surface. Further, in an implementation, the strips can be omitted entirely.

Like a sleeve, the upper case portion slides over and onto the left and right inserts (41004*a* and 41004*b*) of the lower case portion until being stopped by a raised lip 41008 of the lower case portion. This raised lip extends from the left insert along the back (see also FIG. 52) to the right insert of the lower case portion. Where the upper and lower case portions meet, the exterior surfaces become flush with each other.

When the upper case portion is seated against the lower case portion, on a back side of the case, the upper case portion overlaps at least one portion of the lower case portion to hold the upper case to the lower case portion. The upper case portion overlaps inserts 41004*a* and 41004*b* and a back base surface 41204 (FIG. 52) of the lower case portion.

The upper case portion generally holds onto the left and right inserts of the lower case portion through friction. Further, a distance from an outer surface of the left insert to an outer surface of the right insert can be typically slightly greater than an inner width of the upper case portion (i.e., into which the inserts will fit). This allows the upper case portion to hold onto the left and right inserts by compression.

Once joined, sidewalls 4904, 4908, 4912, and 41006 for the upper and lower case portions form front opening 4204, which is generally a rectangular frame with rounded corners. The upper case portion's camera opening 4424 aligns with the lower case portion's camera openings 4156 and 41208. The camera lens of the phone will have an unobstructed view through the camera openings of the lower and upper case portions.

Figure 52:
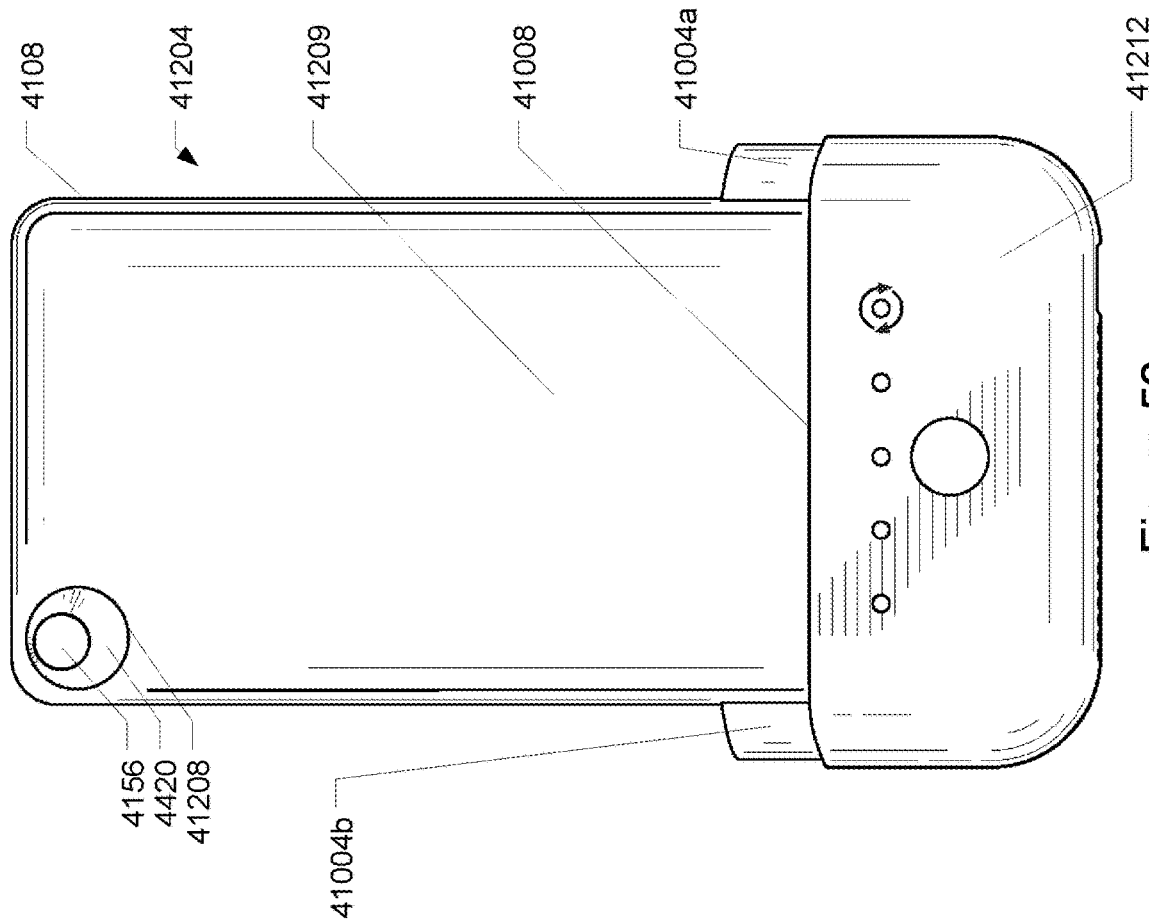
FIG. 52 shows a back view of the lower case portion.
Figure 51:
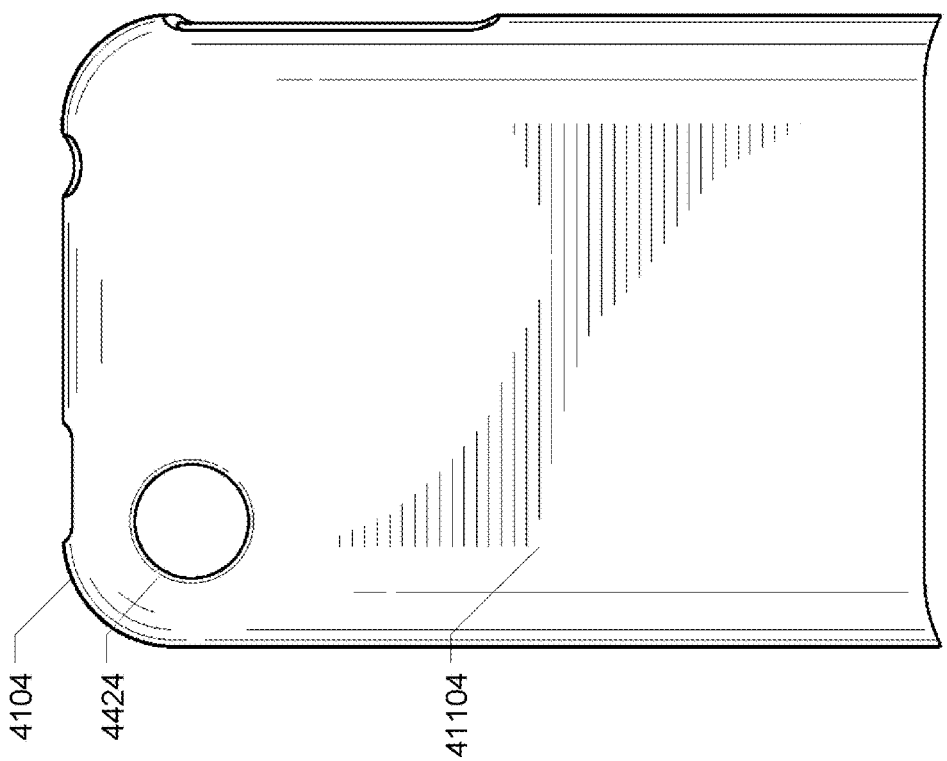
FIG. 51 shows a back view of the upper case portion

FIG. 51 shows a back view of the upper case portion. There is an upper exterior surface 41104, which is the opposite side of upper interior surface 4916. FIG. 52 shows a back view of the lower case portion. Lens shield 4420 extends from camera opening 4156 at base front surface 4164 to opening 41208 at a base back surface 41204. Camera opening 4156 is smaller (i.e., smaller diameter) than camera opening 41208. Note that if the base surface is sufficiently shorter than the electronic device, camera opening 4156, lens shield 4420, and camera opening 41208 may be omitted or partially omitted from the lower case portion.

In a specific implementation, the base back surface is a single piece (e.g., plastic) that has a base upper back surface 41209 and a base lower back surface 41212. The base upper back surface and base lower back surface can be different sections of the base back surface. In another implementation, base upper back surface 41209 and base lower back surface 41212 are individual pieces (e.g., two plastic pieces) that make up the base back surface (e.g., see FIG. 78).

Figure 57:
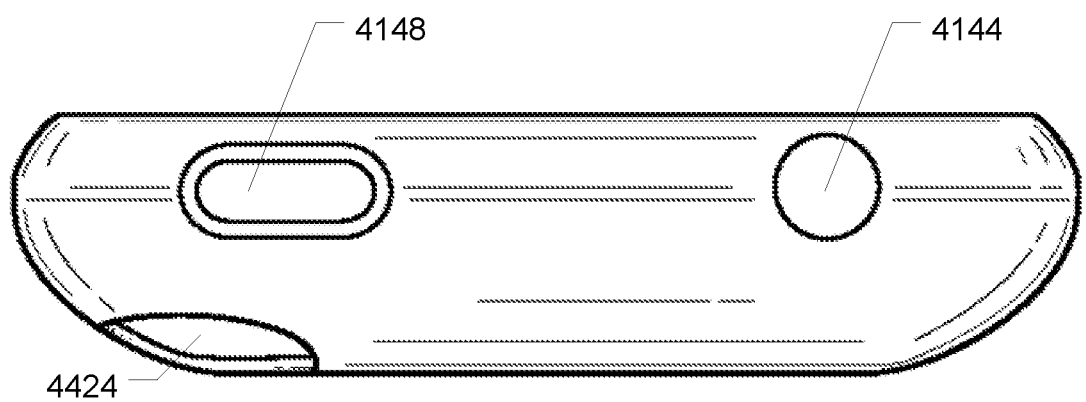
FIG. 57 shows a top side view of the upper case portion only.
Figure 58:
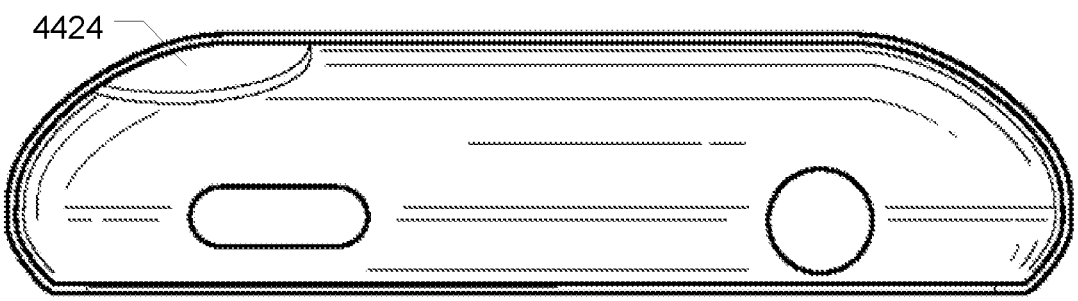
FIG. 58 shows a bottom side view of the upper case portion only.
Figure 59:
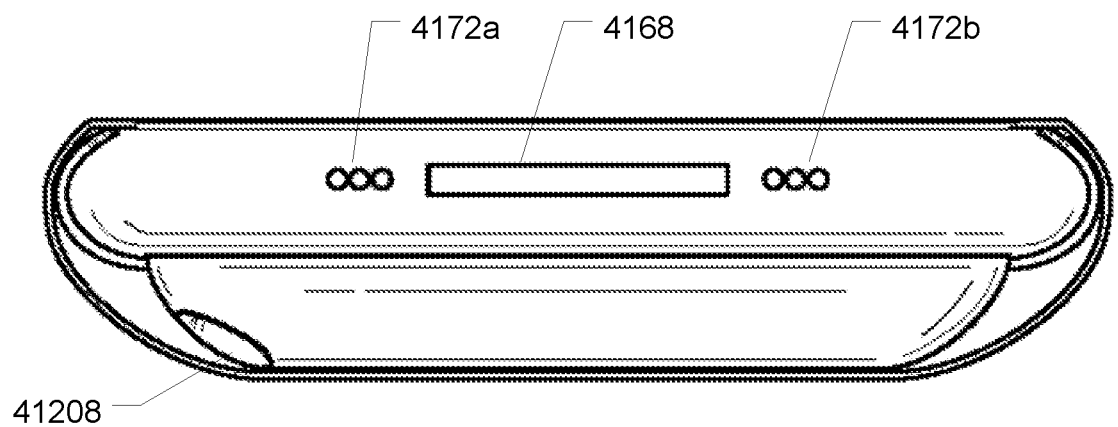
FIG. 59 shows a top side view of the lower case portion only.

FIG. 53 shows a left side view of the upper case portion.
FIG. 54 shows a left side view of the lower case portion.
FIG. 55 shows a right side view of the upper case portion.
FIG. 56 shows a right side view of the lower case portion.
FIG. 57 shows a top side view of the upper case portion (case not assembled), including headset jack opening 4144, button opening 4148, and camera opening 4424. FIG. 58 shows a bottom side view of the upper case portion. FIG. 59 shows a top side view of the lower case portion, showing inner connector 4168, left speaker opening 4172*a*, right speaker opening 4172*b*, and camera opening 41208.

The case shown has specific openings sized, shaped, and positioned at particular locations. These openings are customized for smartphone 4101 as described above and shown in FIG. 41C. It should be appreciated that there may be any number of openings in the upper and lower portions of the case to allow features of a portable electronic device to be accessible to a user. The openings may have any size, any shape, any combination of sizes, or any combination of shapes. There can be more, fewer, or different openings from those shown for the case in the figures. The openings can be positioned at different locations than that shown.

Figure 60:
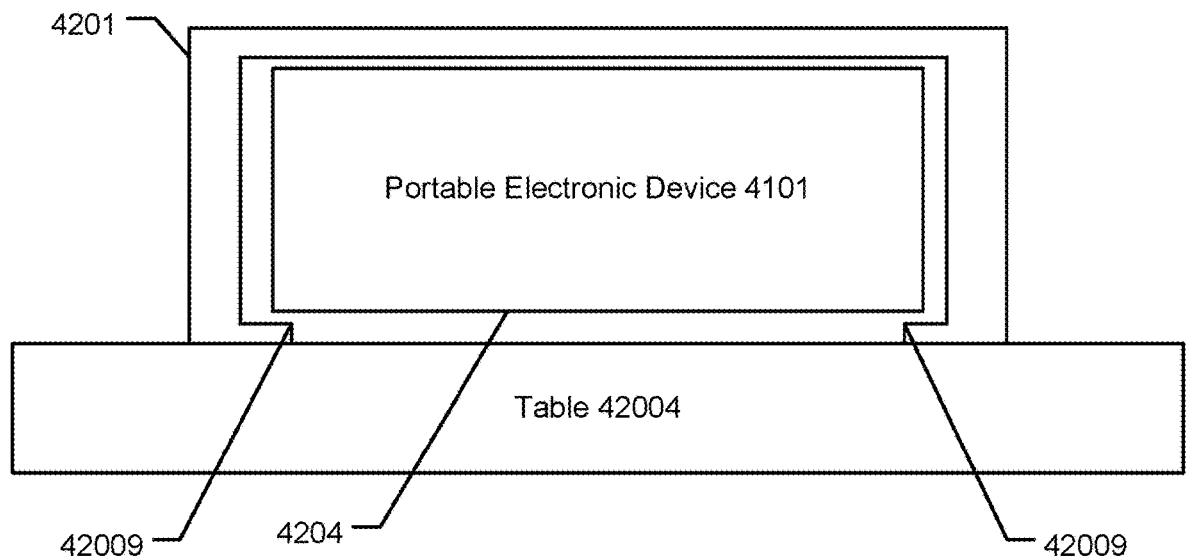
FIG. 60 shows a cross section of the case holding a phone when placed face down on a flat surface.

FIG. 60 shows a cross section of a case with a phone, when placed face down on a table 42004 or other flat or relatively flat surface. For example, the case with phone may be placed on a countertop, vanity, hot tub edge, window sill, chair, sofa, or floor. The front of the case has front opening 4204 (see FIG. 42) and along a border of this opening are frame edges 42009. These frame edges hold the phone in the case and also raise the phone slightly off the surface of the table.

This feature helps protect the front face of the phone from damage (e.g., scratching) since the front face does not touch the surface when in the face-down position. Thus, for example, the user can rub the face-down case and phone on the surface (as if sanding the surface using a sanding block), and the phone's front face and screen will not be damaged.

In a specific embodiment, the frame edges of the case form a plane. This plane is generally, depending on a flatness of the table surface, approximately planar with a plane of the table surface. The frame edges raise the phone's screen from about 0.25 millimeters to about 2.5 millimeters above the plane of the frame edges. For example, a distance from the phone's screen to the table's surface can be 0.5, 0.8, 1, 1.2, or 1.5 millimeters. In a specific implementation, the phone's screen is coplanar to the table and a distance from the table to the screen is approximately 1 millimeter. This distance will vary depending on the flatness of the surfaces.

Also, generally, front opening 4204 is smaller than the phone's front face. In other words, for example, a length of the front opening is less than a length of the phone's front face. A width of the front opening is less than a width of the phone's front face. In a specific implementation, the front opening is generally rectangular and has a length of about 109.5 millimeters and a width of about 55 millimeters. The corners of the front opening can also be rounded (or square in other implementations).

Figure 61:
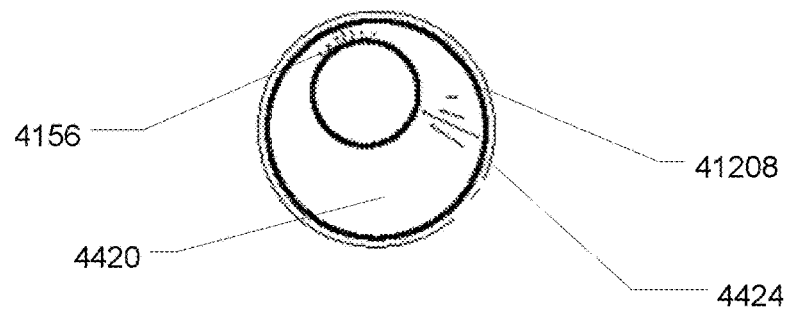
FIG. 61 shows a close-up top view of the built-in lens hood and the camera openings of the upper and lower case portions.
Figure 63:
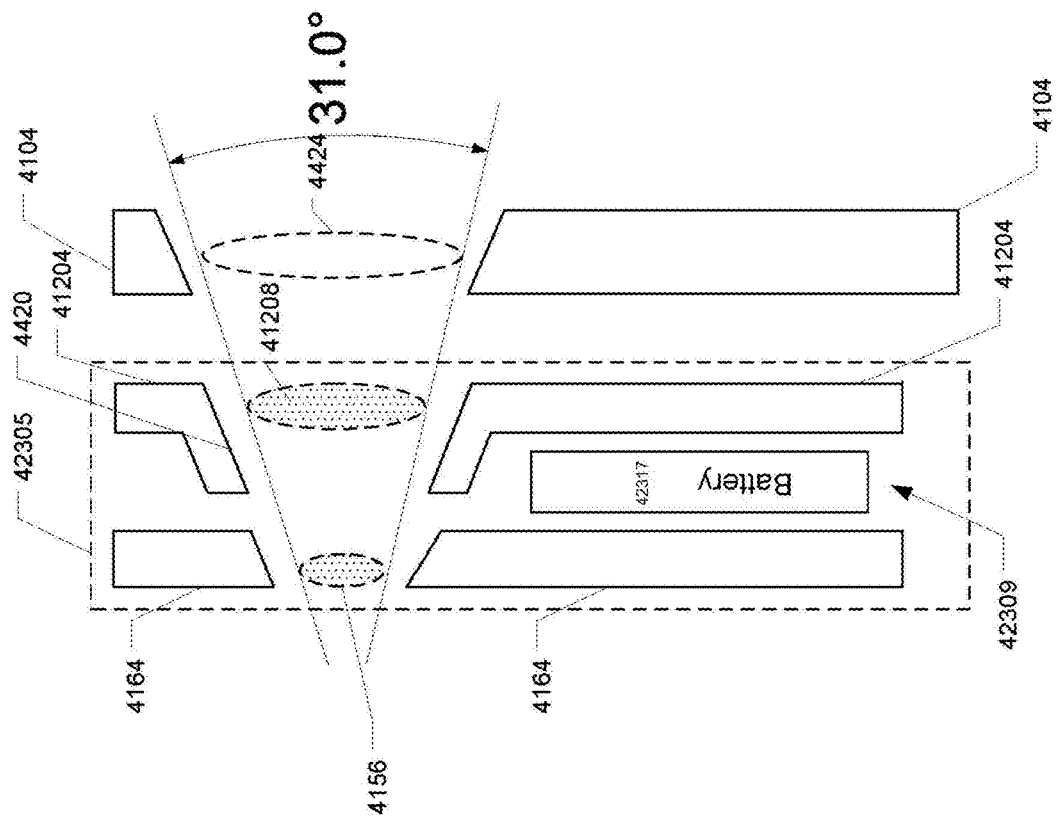
FIG. 63 shows a cross section of the lens hood between the camera openings of the upper and lower case portions.
Figure 62:
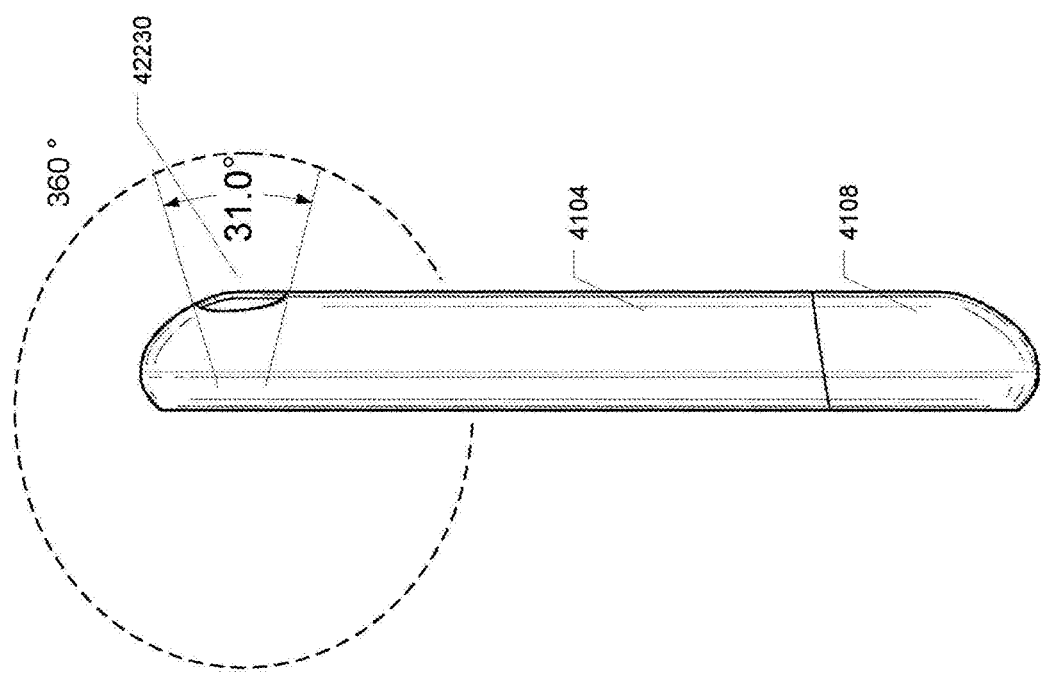
FIG. 62 shows a right side view of the assembled case including the camera opening.

FIG. 61 shows a close-up top view of built-in lens hood 4420 and the camera openings of the upper and lower case portions. FIG. 62 shows a side view of a camera opening 42230 for the assembled case. FIG. 63 shows a cross section of the lens hood between the camera openings of the upper and lower case portions.

Within box 42305 is the lower case portion which includes base front surface 4164 and base back surface 41204. Base front surface 4164 (see also FIG. 41) has camera opening 4156. Base back surface 41204 has camera opening 41208. Also, the base front surface and base back surface form an enclosure 42309 between them, within which a battery 42317 for the case is housed. More details on the battery are below.

Base back surface 41204 has lens hood 4420 which extends from camera opening 41208 toward base front surface 4164. Base front surface 4164 joins with base back surface 41204, and camera opening 4156 aligns with lens hood 4420. When the case is assembled together, camera opening 4424 of upper case portion 4104 aligns with the camera openings in the lower case portion.

In a specific implementation, the lens hood has about a 31 degree field of view. In other implementations, however, the field of view can be any desired number of degrees, less than or greater than 31 degrees. The angle of view provided by the case will depend on the field of view of the camera of the phone and will generally be at least as wide as the camera's field of view, so that the lens hood will not appear in the photos taken by the camera. In an implementation, the camera has a field of view of about 30-32 degrees, and the corresponding camera opening in the case is at least about 30-32 degrees or wider. For example, the angle of view of the camera opening can range from about 25-60 degrees.

In a specific implementation, the lens hood for the lower case portion has a length of about 3.7 millimeters from opening 4156 to opening 41208. However, the length of the lens hood can be any desired length and vary on a number of factors such as a thickness of the battery. For example, in other implementations, the hood length can vary from about 2.8 millimeters to about 5 millimeters. The length can be less than 2.8 millimeters (e.g., for a thin battery) or greater than 4.5 millimeters (e.g., for a jumbo battery). Generally, the thicker battery 42317 is, the longer the lens hood. A thicker battery (for the same two-dimensional area) also usually means greater battery capacity.

The case has the camera openings to allow a user to take pictures with the phone's camera without removing the phone from the case. When the phone is placed in the case, the phone's camera lens aligns behind the lower case portion's camera openings 4156 and 41208, and the upper case portion's camera opening 4424 so that the camera lens' view is unobstructed. A picture taken with the phone in the case will not capture the sides or edges of the camera openings.

The built-in lens hood of the case is a feature that improves the picture taking of the camera. Without a lens hood, sun or other light can more easily strike the camera lens and cause unwanted flaring, glare, uneven lighting, and shadows in the photos. The lens hood of this case helps prevent such undesired effects.

The lens hood also protects the lens of the camera. The lens hood protrudes from the camera lens a certain distance, preventing inadvertent touches and scratches to the lens. Without a lens hood, the camera lens is more vulnerable to accidental contact (e.g., bumping against a surface), potentially resulting in damage to the camera lens. The lens hood also helps to shelter the camera lens from dust, rain, and other elements. Without a lens hood, for example, rain drops can more easily hit the camera lens. The lens hood of this case helps prevent such damage.

The area of camera opening 41208 is greater than the area of camera opening 4156. A lens hood surface between the two camera openings is conical or frustoconical. The greater the size of camera opening 41208 is as compared to camera opening 4156 helps to increase the peripheral field that can be captured by the camera and helps to ensure that the camera does not capture the sides or edges of camera opening 41208 when taking pictures. The area of camera opening 4424 is greater than the area of camera opening 41208.

It is desirable to have the diameter of the upper case portion camera opening larger than the camera openings of the lower case portions. Similarly, it is desirable to have the camera opening in the back of the lower case portion larger than the camera opening in the front of the lower case portion.

In a specific embodiment, camera openings 4156, 4424, and 41208 are circular. However in other implementations, the camera openings can be any shape or closed polygon (e.g., not a semicircle or arc), such as a triangle, square, rectangle, trapezoid, or other. Generally, openings 4156, 4424, and 41208 will have a similar shape and openings closer to the camera lens will be smaller than those further away. Generally, a cross-sectional area of a closed-polygon opening 4156 will be less than a cross-sectional area of a closed-polygon opening 41208, which will be less than a cross-sectional area of a closed-polygon opening 4424.

For a circular camera opening, in a specific embodiment, the inside diameter of camera opening 4156 is approximately 6 millimeters, the diameter of camera opening 41208 is approximately 11-12 millimeters, and the diameter of camera opening 4424 is approximately 12.2 millimeters. In other implementations, the diameters of the openings can have any desired size or shape. For example, opening 4156 can range from about 2 millimeters to about 12 millimeters. Opening 41208 can range from about 4 millimeters to about 24 millimeters. Opening 4424 can range from about 5 millimeters to about 25 millimeters. A ratio of opening 41208 to opening 4156 is from about 1.7:1 to about 2.25:1. Generally, the openings are larger than the camera lens and sufficiently large so that the case does not appear in photographs.

Figure 64:
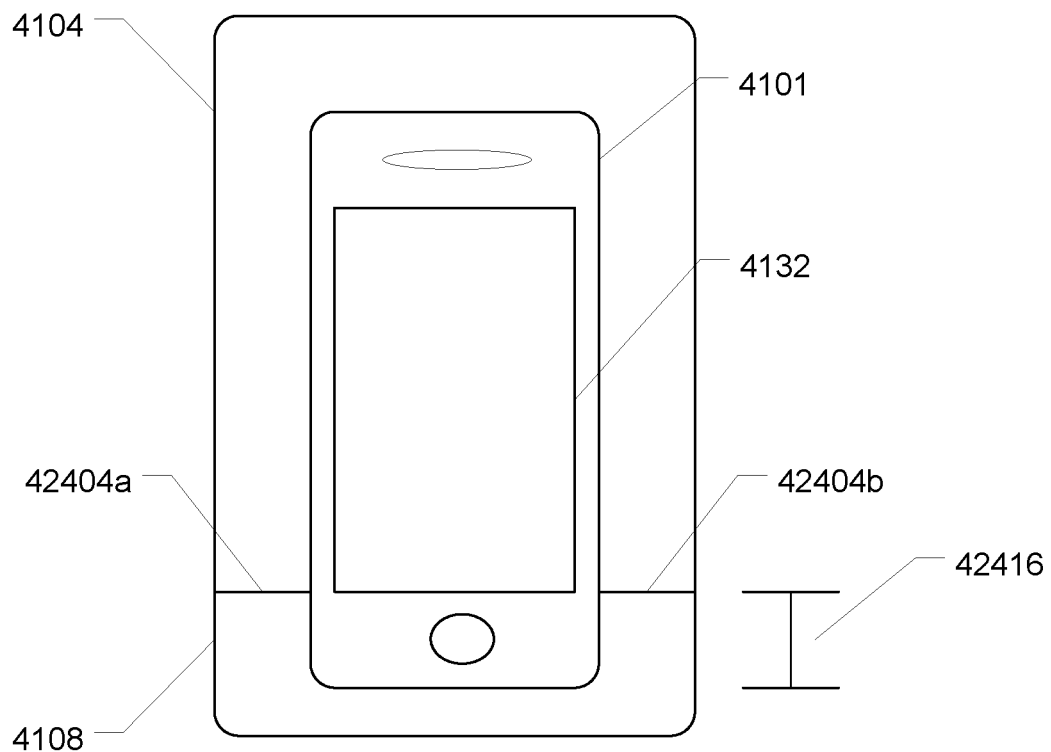
FIG. 64 shows a diagram of the front of the assembled case with a portable electronic device in the case. There is a seam line where the upper and lower case portions meet.

FIG. 64 shows the front of a case with an electronic device in the case. As described above, the upper case portion slides over the lower case portion. Where the upper and lower case portions meet, there are seam lines 42404*a* and 42404*b* in the front of the case (see also FIG. 43). The seam line (from 42404*a* to 42404*b*) runs around the entire case (e.g., across the back of the case). FIG. 44 shows the seam line for the back, and FIGS. 45 and 46 show the seam lines for the sides. At the seam, the surfaces of the lower and upper case portions are relatively flush with each other. The seam line remains visible and can be felt tactilely.

The seam line for the case is positioned to ensure the upper and lower case portions are securely attached to each other. In a specific implementation, seam lines 42404*a* and 42404*b* are positioned so that they align with a bottom edge of screen 4132 of the phone. As shown in FIG. 64, with the phone in the case, the bottom edge of touch screen 4132 is in-line with lines 42404*a* and 42404*b*. In other implementations, the seam lines can be at other positions. For example, the seam line can be aligned with an upper edge of screen 4132, or anywhere between the upper and lower edges of the screen.

The upper case portion securely engages (e.g., by overlapping) to the phone and lower case portion, so the upper case portion will not inadvertently slide off or otherwise detach. Also, in an implementation, when the user grips the phone in a portrait orientation, part of the hand (e.g., thumb and forefinger) is holding onto the upper case portion, while the palm of the hand is pushing against the lower case portion (urging the lower case portion toward the upper case portion).

Further, aligning seam lines 42404*a* and 42404*b* with the bottom edge of the touch screen provides for a symmetrical arrangement and appearance of the visual elements of the phone and case. This enhances the smartphone experience for the user, allowing the user to easily locate the display both visually and tactilely (because the user can feel for the seam).

In an implementation, for the front of the case (see FIG. 43), the seam line is at about 30 millimeters from a bottom edge of the case. A case length is about 130 millimeters. This seam line divides the case at about 0.23 of the whole. In other implementations, the seam line can be at other positions (e.g., ranging from about 15 millimeters to about 50 millimeters) and have other ratios (e.g., ranging from 0.10 to 0.50 of the whole).

In an implementation, for the back of the case (see FIG. 44), the seam line is at about 35 millimeters from a bottom edge of the case. A case length is about 130 millimeters. This seam line divides the case at about 0.27 of the whole. In other implementations, the seam line can be at other positions (e.g., ranging from about 15 millimeters to about 50 millimeters) and have other ratios (e.g., ranging from 0.10 to 0.50 of the whole).

In a specific implementation, seam lines 42404a and 42404b in the front of the case are about X of a length of the joined case, and a seam line for the back of the case is about Y of a length of the joined case. X and Y are numbers and Y is greater than X.

The seam line for the front and back differs because the seam line is angled on the sides of the case (see FIGS. 45 and 46). In other implementations, the seam line can be angled even more on the sides so that a difference between the ratios in the front and back is greater. The seam line can be angled less on the sides so that a difference between the ratios in the front and back is less or 0, or the ratio is larger in front and less in back.

Further, a distance 42416 between a bottom edge of front opening 4204 and the seam line is about 16 millimeters. A length of front opening 4204 is about 109.5 millimeters. Therefore, the seam line divides the front opening at about 0.146 of the whole. In other implementations, distance 42416 can vary, depending on for example the screen size, in a range from about 8 millimeters to about 32 millimeters. The seam line will divide the opening in a range, for example, from about 0.10 to about 0.50 of the whole.

Figure 65:
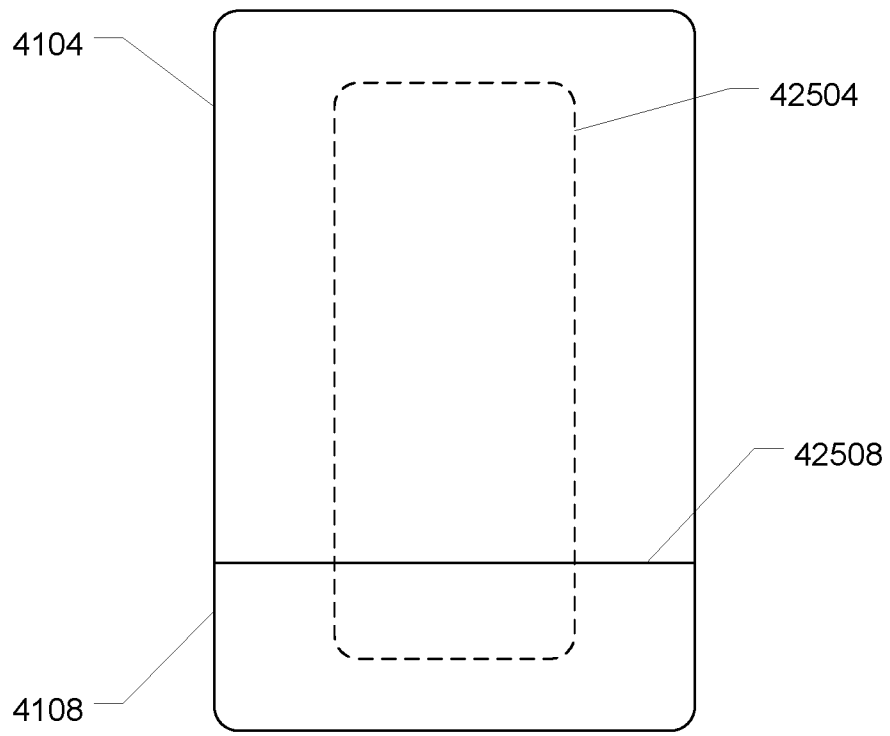
FIG. 65 shows a back view of the assembled case where a region of the back surface is relatively flat.

FIG. 65 shows a back view of the assembled case where a region of the back surface, indicated by box 42504, is relatively flat. The flat portion of the back surface ensures the electronic device and case will be stable (e.g., not rock back and forth) when the case is placed on its back on a table. See also FIGS. 45-48 which show various views of the case's flat back surface. Even if the electronic device does not have a flat back, the flat portion of the case ensures the electronic device will be stable when placed on a table.

As shown in the figure, both the upper and lower case portions have sections which are flat. Where the upper and lower case portions meet, a seam line 42508 divides the upper and lower case portions. As shown, the flat case section of the lower case portion is smaller in terms of area than the flat section of the upper case portion. The seam where the upper and lower case portions meet is flush, so the seam does not cause the case to be unstable.

The flat back surface ensures stability when the case is placed on its back, regardless of how the back of the phone is shaped. This feature creates a steady and stable surface and ensures that the electronic device will not slide or wobble as a result of being placed, for instance, on a table. For example, an electronic device may be curved in all directions (e.g., no flat surfaces at all) or have a design where the back will not be stable when placed on a table. The design may have notches, indentations, or other structures (possibly ornamental) that cause the phone to not lie stably on its back. Despite this, when the phone is in the case, because of the flat back, the case will rest securely on its back.

As shown in FIG. 65, rectangular flat surface 42504 is centered in back of the assembled case. That is, the distance surrounding the flat back surface is equal at opposite sides. In other implementations, however, the flat back surface may be located anywhere on the back of the case portions. Further, the flat back surface may be of any size, any shape, any combination of sizes, or any combination of shapes. For example, the flat back surface may have a circular or oval shape. The flat region may be rectangular with rounded corners.

The flat back surface is typically sufficiently sized to make the case stable when placed on its back. In an implementation, the size of the flat back surface can vary and the proportion of the area (42504) that is flat to the area that is not flat (case back outside box 42504) can vary. In another implementation, the flat back surface area is larger than the electronic device the case is holding. The flat back surface area can be larger than a flat back surface area provided by the electronic device itself.

In a specific implementation, dimensions for flat surface section 42504 are about 100 millimeters by about 40 millimeters. Dimensions for the case are about 130 millimeters by about 66.2 millimeters. The area ratio between the flat surface section 42504 and the total case dimensions is about 0.465 (i.e., 4000 square millimeters/8606 square millimeters). However, in other implementations, the ratio can be in the range from about 0.333 to about 0.6.

For the centered square section, a distance between a bottom edge of the lower case portion and a bottom edge of the flat back surface is about 13 millimeters. Likewise, a distance between a top edge of the upper case portion and a top edge of the flat back surface is about 13 millimeters. Further, a distance between a left edge of the assembled case and a left edge of the flat back surface is about 15 millimeters. Likewise, a distance between a right edge of the assembled case and a right edge of the flat back surface is about 15 millimeters.

Figure 66:
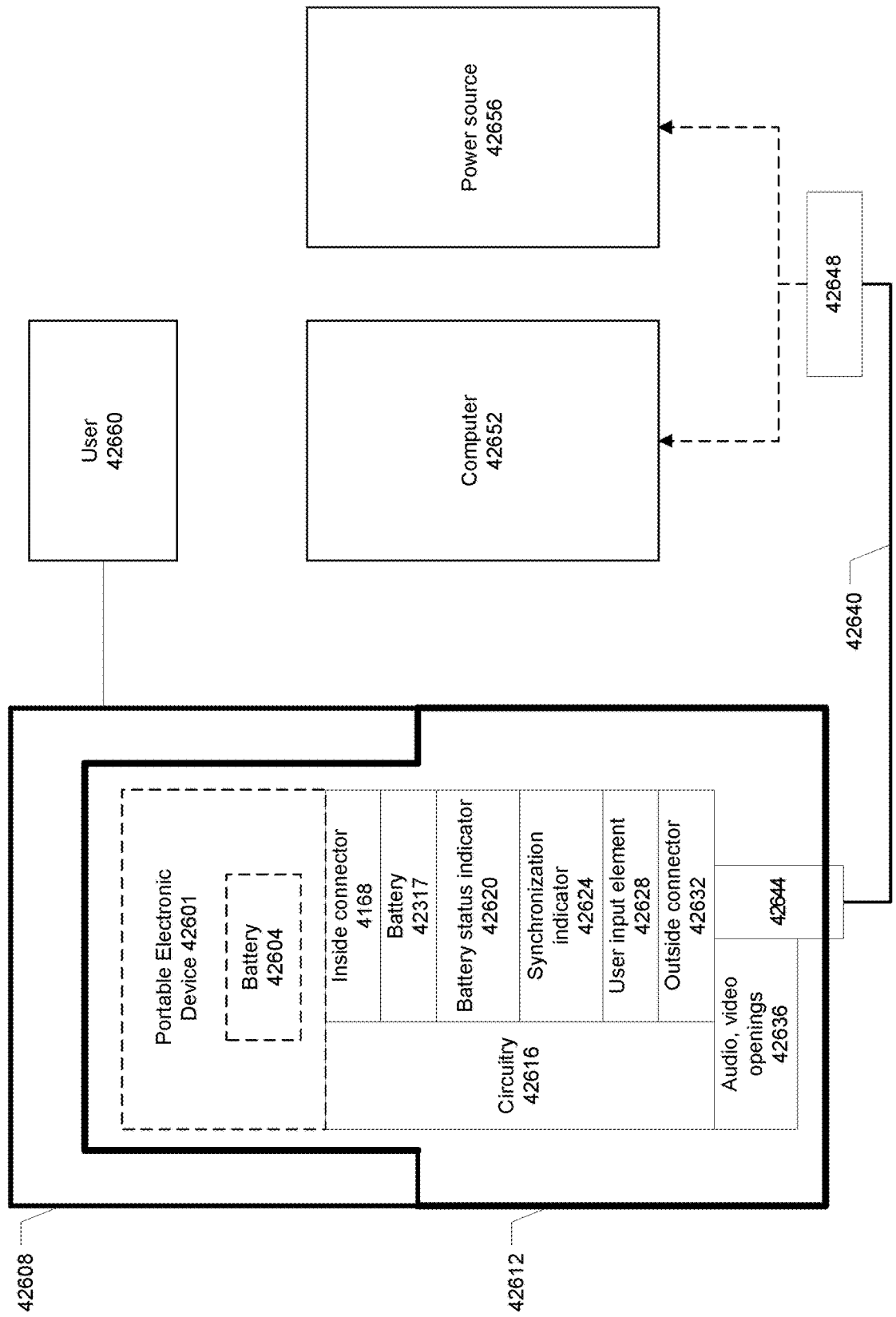
FIG. 66 shows a functional block diagram of the portable electronic device case with a battery that extends the battery life of the portable electronic device.

FIG. 66 shows a functional block diagram of a case for holding a portable electronic device 42601 having a battery 42604. As discussed above, the case has an upper case portion 42608 and a lower case portion 42612. The electronic device is inserted into the lower case portion and is connected to inner connector 4168, and the upper case portion slides over the electronic device and a portion of the lower case portion.

The lower case portion includes a circuitry 42616 which is connected to inner connector 4168, a case battery 42317, a battery status indicator 42620, a synchronization indicator 42624, a user input element 42628, an outer connector 42632, and audio-video (AV) openings 42636. A cable 42640 having connectors 42644 and 42648 may be used to connect the case to a computer 42652, a power source 42656, or both.

As a specific example, this application discusses the portable electronic device as being a smartphone. However, as already discussed above, it should be understood that this is merely for discussion, and that the portable electronic device can be any device type and may be a device other than a telephony device.

In addition to making and receiving telephone calls, many modern smartphones and other portable electronic devices include a multitude of other features. These features include data storage, music playing, picture taking, video recording, and games. Further, these devices include vivid color displays, cameras, speakers, speakerphone, nonvolatile storage, touchscreens, and others. Such features use power. And the more such features are used, the shorter the battery life.

Many users depend on their smartphones to coordinate their schedules, check and read e-mail, send e-mail, browse Web pages, talk to their loved ones and family (e.g., calling mom on Mother's Day), talk to business associates, record video, upload a video onto a social networking Web site, map their locations, navigate using GPS and voice guidance of the phone, edit documents, and much more. Therefore, it is important that a smartphone has sufficient power capacity to last through the day until the smartphone can be recharged.

While smartphone capabilities have increased dramatically in recent years, batteries have not kept pace. Furthermore, since smartphones are used for so many different things, it can be catastrophic if the smartphone runs out of power. Compounding the problem is that many of today's smartphones have integrated or proprietary batteries that cannot be easily replaced. Moreover, even if the batteries are designed to be replaced by the user, it is cumbersome to carry around extra batteries.

The case, with its built-in battery (i.e., battery 42317), alleviates this problem by providing additional power to the phone. Various implementations of the case double, triple, or quadruple the battery life of the phone or the amount of time that the user can use the phone.

The case has numerous modes of operation. FIGS. 67 and 68 show tables listing the various modes. For the case to provide extended battery life, the user charges the case battery. To do so, the user connects a power source via a cable (e.g., USB cable) to the case's outer connector (e.g., mini-B USB connector). Upon connecting the cable, the case will be in a power-up mode (described in FIG. 67) during which at least one of the indicator lights (e.g., LEDs) of the case lights momentarily. To enter this mode, the phone does not need to be in the case; but if the phone is in the case, the user will be able to use the phone normally. This may be referred to as a normal operating mode for the phone.

When entering the power-up mode, the indicator lights turn on in order to indicate to the user that the case has been powered up. Power-up may be indicated to the user using any visual (or audible) indication. In a specific implementation, for example, one of the LEDs turns on for a short time and then turns off. In another implementation, each of the LEDs may turn on and off in sequence. In another implementation, at least one LED turns on and stays on while the case is connected to a charging source. In this implementation, the number of lights turned on is proportional to the battery life and the number of lights increases as the battery life increases.

Figure 69:
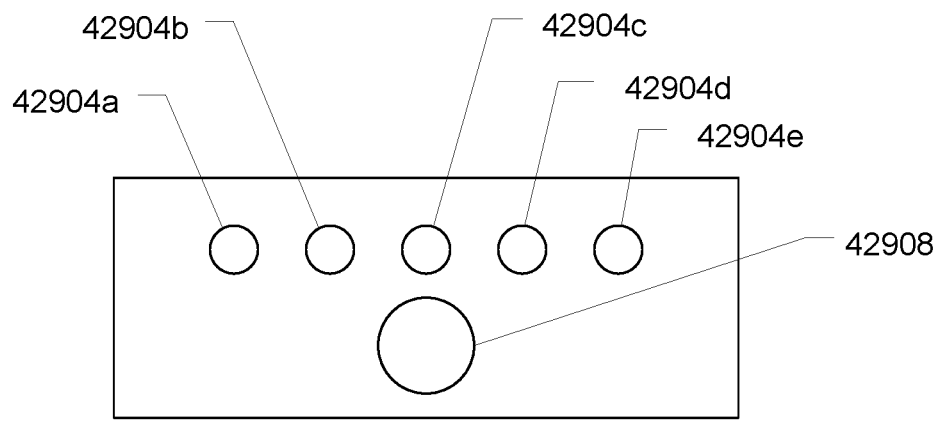
FIG. 69 shows an arrangement of indicator lights and a case button below the indicator lights.

FIG. 69 shows a specific arrangement of indicator lights 42904*a-e* (e.g., LEDs, laser diodes, light bulbs, neon bulbs, or other lighting) for the case, where a case button 2908 is centered below the indicator lights. In this specific arrangement, a line extending between indicator light 42904*a* and 42904*b* does not pass through case button 42908. In a specific implementation, the indicator lights are positioned horizontally on the back of the lower case portion and a line segment extends from indicator lights 42904*a-e*. The case button is positioned transverse to the line segment and equidistance to ends of the line segment.

The indicator lights and case button have a circular shape. In an implementation, the indicator light cover and case button are flush with the case surface. Generally, the case button is located near the indictor lights. However, in other implementations, the case button can have any shape (e.g., square, rectangle, triangle, and oval) and may be located anywhere on the case. There can be any number of case buttons (e.g., one, two, three, or four or more).

Further, although the indicator lights are positioned horizontally on the back of the lower case portion (see FIGS. 44 and 52), in other implementations the indicator lights can be in a different location or be arranged differently (e.g., off-center or vertically arranged). Also, there may be any number of lights (e.g., 0, 1, 2, 3, 4, 5, 6, 7, or more than 8) and the openings for the indicator lights may have any shape (e.g., circle, square, rectangle, or triangle).

Figure 70:
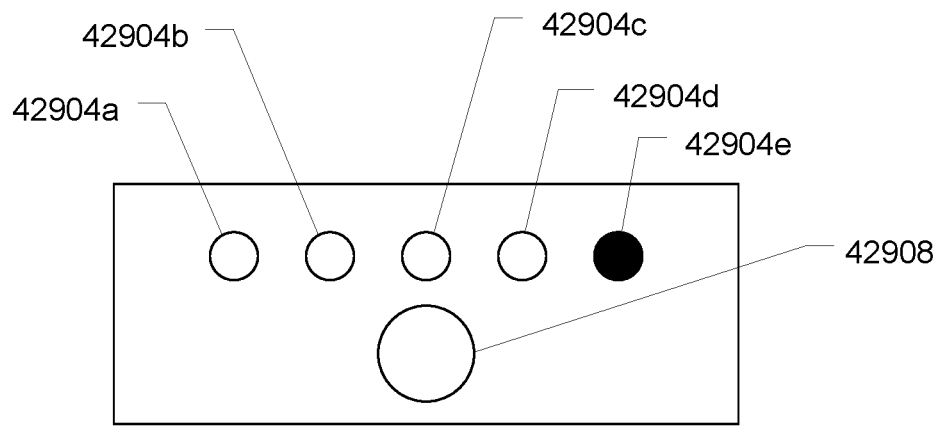

In a specific implementation of the power-up mode, as shown in FIG. 70, the right-most indicator light (42904*e*) turns on momentarily and then turns off (e.g., flashes or blinks) to indicate that the case is connected to a power source.

The power source may be a power socket, power receptacle, or power outlet in the user's home or office. As another example, the cable may be connected to a cigarette lighter socket in the user's car or boat. This allows, for example, the user to charge the case battery while driving. The cable can be connected to a computer's USB port or any other power source.

From the power-up mode, the case can enter the charge case battery mode. FIG. 67 describes the charge case battery mode. Power from the cable connected to the case outer connector will charge the case battery. Circuitry (described below) in the case will control charging of the battery until it is fully charged.

While in the charge case battery mode, the user can press the case button and determine the battery life remaining in the case battery by reading the fuel gauge. Upon pressing the case button, the case will be in a fuel gauge mode as described in FIG. 67. If the case battery is charged, an appropriate number of indicator lights will light to indicate a charge level of the case battery. To enter this mode, the phone does not need to be in the case; but if the phone is in the case, the phone will be in normal operating mode.

While in fuel gauge mode, the case battery life may be indicated to the user using any visual (or audible) indication. In a specific implementation, the indicator lights turn on from left to right and each indicator light that turns on indicates an additional level of charge for the case battery. In this specific implementation, the number of LEDs lighting up is proportional to the case battery life. In another specific implementation, the indicator lights turn on from right to left and each indicator light that turns on indicates an additional level of charge for the case battery.

In a specific implementation, the lighting indicators emit a blue or bluish light (e.g., blue LED). However, in other implementations, the lighting indicators can emit any color or wavelength of light as desired. For example, the color can be red, green, yellow, white, or purple, or any combination of these. Also, two different indicator lights of the same case can emit two different colors. The color of the light may be a result of the LED color itself or a cover over the LED light (e.g., white LED light is covered by a bluish lighting cover).

Figure 71:
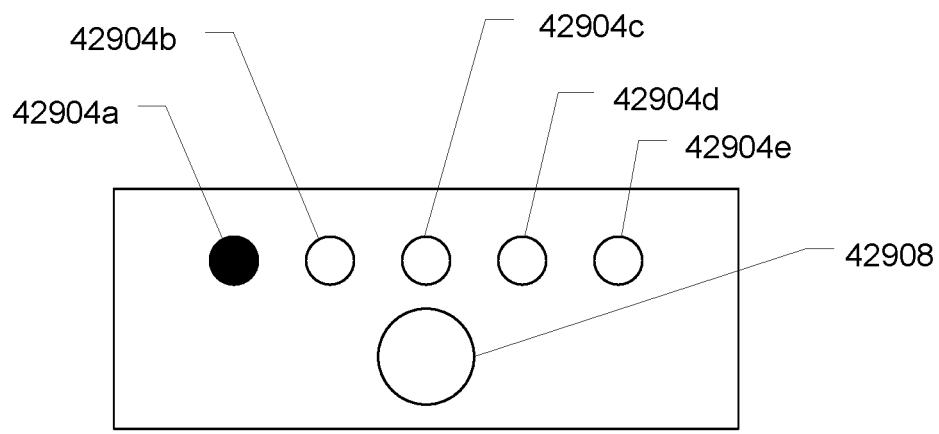

FIG. 69 shows a specific implementation where no indicator lights turn on, indicating the case battery is discharged or has a very low level of charge. FIG. 61 shows the leftmost indicator light (42904*a*) turning on, indicating that the case has a minimal charge. More indicator lights turn on in FIG. 61 than in FIG. 69, indicating that the case battery in FIG. 71 has a higher level of charge than the case battery in FIG. 69.

Figure 72:
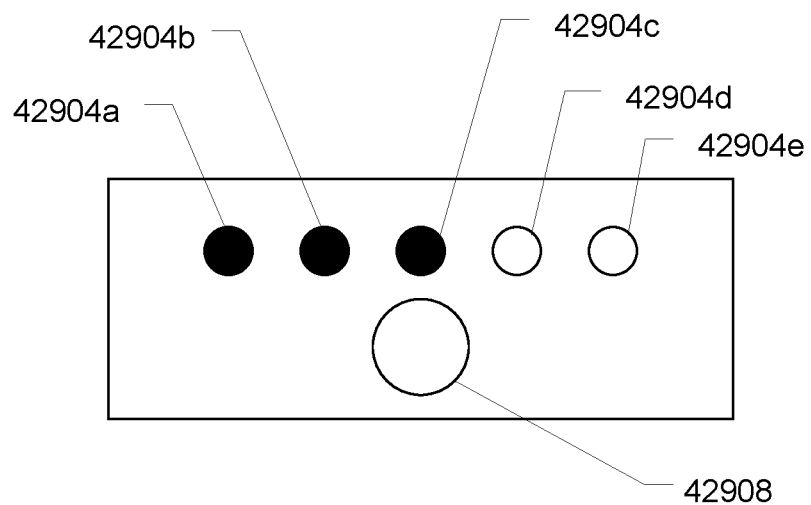
Figure 73:
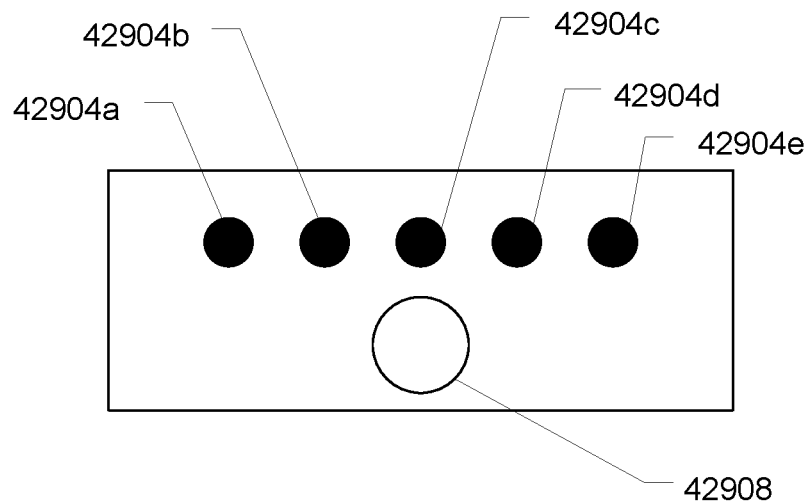

FIG. 72 shows three indicator lights (42904*a-c*) turning on to indicate an approximately half-charged battery. A greater number of lights turn on in FIG. 72 than in FIGS. 69 and 71, indicating that the case battery in FIG. 72 has a higher level of charge than the case battery in FIGS. 69 and 71. FIG. 73 shows a specific implementation of five indicator lights (42904a-e) turning on to indicate a fully charged battery. A greater number of indicator lights turn on in FIG. 73 than in FIG. 72, indicating that the case battery in FIG. 73 has a higher level of charge (e.g., more juice) than the case battery in FIG. 72.

While charging the case battery in the charge case battery mode, the phone does not need to be in the case. If the phone is in the case, the case will also be in the charge phone battery mode listed in FIG. 67. When the phone battery becomes discharged, the case battery will, via inner connector 4168, charge and top off the phone's battery as needed. The case will continue to charge the phone battery as needed until the case battery becomes completely discharged.

If the outer connector is not connected to power, the case can be in the charge phone battery mode as long as there is charge in the case battery, but the case will no longer be in the charge case battery mode.

When the user connects a power source via a cable (e.g., USB cable) to the case's outer connector, the case will be placed in charge phone battery mode. The case will continue to charge and top off the phone battery as needed. Also see discussion regarding sleep mode below.

The phone may indicate to the user that the phone is charging. In a specific implementation, the phone's screen displays an icon (e.g., lightning bolt) to indicate that the phone is charging. When the phone becomes fully charged, the phone's screen informs the user (e.g., icon changes from a lightning bolt to a plug symbol).

As discussed, the case also has a battery gauge such as shown in FIG. 69. While in the charge phone battery mode, the user can press the case button and determine the case battery life remaining by reading the fuel gauge. Upon pressing the case button, the case will simultaneously be in the fuel gauge mode. The fuel gauge mode is described in FIG. 67 and above.

If the case is not connected to a power source and the case battery is at a charge level below a certain threshold (i.e., a sleep mode level of charge), the case will enter a sleep mode. For example, when the case battery is completely discharged, the case will be in sleep mode.

The sleep mode is described in FIG. 67. While in the sleep mode, the case becomes inactive (e.g., the case button and case indicator lights are not functional) and the user will be unable to get a battery reading. The sleep mode will not affect the phone. The phone will be in normal operating mode as long as the phone has sufficient charge. The case will not draw any power from the phone.

In an implementation of the sleep mode, the user connects power to the outer connector of the case in order to charge the case battery. The case battery will be charged for some amount of time before charging of the phone battery begins. For example, this amount of time may be about five minutes, but the exact amount of time (e.g., two, three, six, or more minutes) will depend on a number of factors including the charging current and the level of charge remaining in the battery. The amount of time will vary depending on how long it will take for the case battery to be charged to a level above the sleep mode level of charge.

When the case battery has been charged above the sleep mode level of charge, the case exits sleep mode and enters power-up mode. The case battery will be used to charge the phone battery, as needed. The case button and case indicator lights will work. When the user presses the case button, the user will get a battery reading from the fuel gauge.

Note that if the phone battery is completely discharged, similar to the situation with the sleep mode discussed in this implementation, the phone battery may need to be charged to some level before becoming active and operate normally. For example, this amount of time may be about five minutes, but will vary depending on the charging current and level of charge of the phone battery.

In another implementation of the sleep mode, when the user connects a power source via a cable (e.g., USB cable) to the case's outer connector, the case will immediately charge the phone battery and the case battery. Both the phone and case batteries will be charged in parallel. The power from the USB cable is used to charge the phone battery even if the case battery does not have a minimum level of charge.

In an implementation, the case has an extended sleep mode, which is not the same as the sleep mode described above. The extended sleep mode is described in FIG. 68. The case enters the extended sleep mode when no phone is connected to the case and power is not connected to the outside connector of the case. When in the extended sleep mode, circuitry of the case will use less power so the case will retain its battery power for relatively longer periods of time. For example, for the extended sleep mode, some inactive circuits or portions of the circuit will be turned off so they do not draw power.

The extended sleep mode extends the case battery life. In a specific implementation, the case will retain charge seven weeks or more (when starting with a fully charged case battery). However, in various implementations, the battery life during extended sleep mode can vary and may be one week, ten days, two weeks, three weeks, six weeks, less than one week, or more than seven weeks.

When the case is in the extended sleep mode, the user can exit the extended sleep mode by any one of three ways. An implementation of a case of the invention can have any one of or a combination of the following three ways to exit the extended sleep mode.

1. Connecting a phone to the case. Then, the case will return to the charge phone battery mode.

2. Pressing the case button. Then the case will go to the fuel gauge mode, and the case will display the status of the case battery. After a period of time after the button press, the case can reenter the extended sleep mode.

3. Connecting the case via the cable to a power source. Then the case will go to the charge case battery mode.

To charge the phone battery, the user will insert the phone into the case. When the phone is initially inserted into the case and the case battery and phone battery are charged, the case enters initial phone connect mode (described in FIG. 68) during which the circuitry in the case authenticates with the phone.

In a specific embodiment, the case circuitry includes an authentication chip which allows the case to communicate with the phone. If the case does not have this authentication chip, the case is not authenticated.

In another specific embodiment, the case circuitry implements a handshaking protocol by sending a self-identification signal to the phone. If the phone recognizes the signal, the phone can accept the signal and authenticate the case. If the phone does not recognize the signal, the case is not authenticated.

In another embodiment, the authentication process uses certificates, which get exchanged with the electronic device and opens up communication channels once these certificates have been exchanged and authenticated.

Upon putting the phone in the case, if the case authenticates with the phone, the phone will display its normal screen and no warning messages regarding the case will appear on the phone screen.

In a specific implementation, if the phone does not authenticate the case, it cannot be presented as a valid accessory and the phone screen displays a warning message. This warning message may be referred to as a "nag message," informing the user that the case is not a valid accessory or has not been approved by the manufacturer of the phone. In a specific implementation, the warning message is "This accessory is not designed for this phone. This accessory might cause interference, do you wish to enable airplane mode?" and will appear on the phone's screen.

In some embodiments, regardless of the authentication results, after the warning message is displayed, the phone will enter a normal operating mode and the user can continue using the phone normally. The case battery will provide extended battery life for the phone.

While the phone is in the case (e.g., in the charge phone battery mode), the user can synchronize the phone with a second electronic device. To do so, the user pushes and holds the case button for about three seconds. The case will enter a synchronization or sync mode described in FIG. 68. The period of time for which the user holds the case button for to enter the sync mode can be set to any value, such as in a range from two to fifteen seconds; the longer the time period, the less likely the user can accidentally enter the sync mode.

In a specific implementation, the second electronic device is a computer. While in the sync mode, the case is ready for the phone to synchronize with the computer. If the case is connected to a computer via the cable (e.g., USB cable), the user can synchronize data between the phone and the computer, send data from the phone to the computer, send data from the computer to the phone, or any combination of these. Synchronization includes synchronizing calendar information, contact information (e.g., names, addresses, phone numbers), music files, video files, and e-mail between the phone and the computer.

While the case is in the sync mode, the phone is also in a sync mode when the phone is ready to transfer or receive data from the computer. In a specific embodiment, the user can determine the status of the phone by looking at its screen. In a specific implementation, to indicate the phone is in the sync mode, the phone's screen may display a sync status symbol or a not charging symbol, or both.

In another implementation, the second electronic device may be an electronic device (e.g., mobile phone, PDA, smartphone, pager, audio player, media player, portable media player, game console, server), software (e.g., iTunes or Windows Media Player), or a service (e.g., iTunes Store, Urge, or Rhapsody).

The case does not need to be connected to a computer to enter the sync mode. If the user connects the case via the cable to a computer within about 30 seconds, then the user will be able to synchronize the phone with the computer. If the user does not connect the cable to a computer within 30 seconds, however, the case will automatically exit the sync mode (e.g., returning to the charge phone battery mode). An automatic time out of 30 seconds for the synchronization mode is provided as an example, and the time out value can vary from about 3 seconds to about 3 minutes. For example, the time out value can be 15, 40, 50, 60, 180, or 360 seconds.

In a specific implementation, upon entering the sync mode, the case exits other modes. For example, if the case is in the charge case battery mode, the case will exit this mode upon entering the sync mode and the case battery will stop charging. Similarly, if the case is in the charge phone battery mode, the case will exit this mode upon entering the sync mode and the case will stop charging the phone battery.

The sync mode may be indicated to the user using any visual (or audible) indication. A synchronization indicator indicates to the user that the phone is ready to be synchronized with the computer. The synchronization indicator may also indicate when the phone is not ready to be synchronized, whether or not the synchronization is complete, whether or not there was an error in synchronization, and so forth.

Synchronization can be indicated via the indicator lights. For example, a lighting of an LED will indicate to the user that the case is in the sync mode. In a specific embodiment, for example, one of the LEDs blinks continuously. In other embodiments, a different number of LEDs blink continuously or a number of LEDs blink twice and turn off. In a specific embodiment of the sync mode, as shown in FIG. 70, LED 42904*e* will blink continuously to indicate to the user that the phone is ready to synchronize with another device.

The case may be unable to enter the sync mode under certain circumstances. For example, when the case is in the sleep mode, the case button and indicator lights do not work. The phone cannot synchronize with another electronic device because the case requires a minimal amount of power for its electronic board to support the synching mechanism. So, if the user pushes and holds the case button for three seconds, this will have no effect on the case and the case will not enter the sync mode.

When the case is in the sync mode, the user can exit the sync mode (described in FIG. 68) by any one of three ways. An implementation of a case of the invention can have any one of or a combination of the following three ways to exit the sync mode.

1. Not connecting the case via the cable to the computer within thirty seconds (or other time out value). After thirty seconds elapses, the case will return to the charge phone battery mode.

2. Disconnecting the cable from the case or the computer. Since the case is no longer connected to the computer, the phone can no longer synchronize with the computer. The case will return to the charge phone battery mode.

3. Pressing the case button. Then the case will go to the fuel gauge mode, and the case will display the status of the case battery. Then, the case will return to the charge phone battery mode.

In a specific implementation, for example, the user can only exit the sync mode using the first two options and not the third option. So, once the case is in the sync mode, the user cannot exit the sync mode by pressing the case button. This prevents the user from inadvertently exiting the sync mode by intentionally or unintentionally pressing the case button.

When the case exits the sync mode, the indicator lights will turn off (or turn on) to indicate that the case is no longer in the sync mode. For example, when indicator light 42904*e* blinks continuously to indicate the sync mode, this indicator light turns off to indicate the case is no longer in the sync mode.

When the case exits the sync mode, the phone will also exit the sync mode and no longer transfer data to and from the computer. Upon exiting the sync mode, the phone will enter the normal operating mode and the user can use the phone normally (e.g., make a phone call to Claudia Schiffer, send a text message to Beyonce, play a Nena song, play computer baseball with Tim Lincecum, or call Jenny at 867-5309).

Referring back to FIG. 66, the case battery is typically a rechargeable type. In a specific embodiment, the case battery is a rechargeable lithium-ion polymer battery. This battery can be charged, used, and recharged many times (e.g., about 500 times). Other rechargeable battery types may be used. For example, some other rechargeable type batteries include nickel cadmium (NiCd), nickel metal hydride (NiMH), lithium ion, lithium polymer, lead acid, and other rechargeable battery chemistries.

In an implementation, the case battery is integrated with the case and the battery is not replaceable by the user. One benefit of this design is that it allows for a smaller and more compact case as compared to a case with a replaceable battery because there is no additional interface (e.g., battery cover) that interferes with the profile of the case.

In another implementation, the battery is replaceable by the user. For example, the battery may be a rechargeable type such that after the battery has been drained and recharged after a threshold number of cycles, the battery is replaceable by the user. As another example, the battery may be a disposable battery (e.g., N, AA, AAA, or C cell battery) such that after the battery is drained, the user removes the drained battery from the case, and installs a new battery.

The user input element (e.g., case button) allows a user to communicate with the case. In a specific embodiment, the user input element is a button that the user can push. Pushing the button displays the battery status indicator, the synchronization indicator, or both. In a specific embodiment, at least one LED functions as a battery status indicator and as a synchronization indicator. In this specific embodiment, pushing the button for a first threshold time period lights a first LED in a first mode. In the first mode, the LED is solid and indicates a battery status. Pushing the button for a second threshold time period (e.g., 2, 3, 4, 5, 6, 7, or 8 seconds), greater than the first threshold time period, lights the first LED in a second mode, different from the first mode. In the second mode, the LED is blinking and indicates a synchronization status.

The modes associated with a pattern may vary. For example, to indicate a battery status, an LED may blink twice or all the LEDs may flash one after the other from left to right. Also, a blinking LED in a first pattern may indicate that the phone is ready to be synchronized. A blinking LED in a second pattern, different from the first pattern, may indicate that synchronization is complete.

Further, the blinks may be in any pattern. Some examples of patterns include a long blink, followed by a short blink; two long blinks followed by three short blinks; one short blink, followed by two long blinks. In a specific implementation, all the LEDs blink twice to indicate there is a problem with recharging the battery.

It should be appreciated that there may be any number of user input elements or buttons. It should also be appreciated that the user input elements may not necessarily be a button. For example, the user input element may be a microphone to accept a voice command from the user. As another example, the user input element may be a touch screen or a sliding switch that the user slides back and forth.

The audio-video (A/V) openings include one or more holes or openings in the lower case portion, the upper case portion, or both. These openings direct audio information, video information, or both from the phone to the user. These openings also allow the phone to receive audio information, video information, or both.

The cable may be any type of cable having any number of wires that can electronically connect the case to the computer or power source. In a specific embodiment, the cable is a USB cable (e.g., USB 2.0 cable) where connector 42644 is a USB mini-A plug (or male connector) and connector 42648 is a USB type-B plug (or male connector). The cable allows battery 42317, battery 42604, or both to be charged by the computer, power source, or both. The cable also allows the portable electronic device and the computer (or other device) to be synchronized.

In another embodiment, connector 42648 is plugged into an automotive cigarette lighter plug (e.g., 12 volt automotive lighter plug, 6 volt automotive lighter plug), a type A flat blade electrical plug, or a type B flat blade with round grounding pin plug. However, different parts of the world use different types of electrical plugs. For example, a type C plug is common in Europe. The U.S. Department of Commerce, International Trade Administration publication Electric Current Abroad, 1998 edition, reprinted 2002, which is incorporated by reference, describes different types of electrical plugs used in different parts of the world, which are suitable for use as connector 42648 of the present invention.

The length of the cable ranges from about 0.3 meters to about 5 meters. The cable may also be less than 0.3 meters or more than 4.9 meters. The variations in cable length reflect the many different preferences that users may have. For example, some users may desire a longer cable so that they can place the case further away from the second electronic device. Other users may desire a shorter cable to lessen the likelihood that the cable will become tangled.

The cable, however, is optional and is not included in some implementations of the invention. In this specific embodiment, the outer connector includes wireless capabilities. For example, the outer connector may be a wireless transceiver, a wireless receiver, or a wireless transmitter. This allows the case and computer or power source to communicate wirelessly. Such wireless communication may be accomplished using any wireless technology (e.g., infrared, Wi-Fi, Bluetooth, radio frequency, microwave, 802.11, 802.11a, 802.11b, 802.11g, 802.11-2007, and 802.11n, or wireless USB). Such wireless features may also allow batteries 42317, 42604, or both to be wirelessly charged (e.g., resonance charging).

Figure 74:
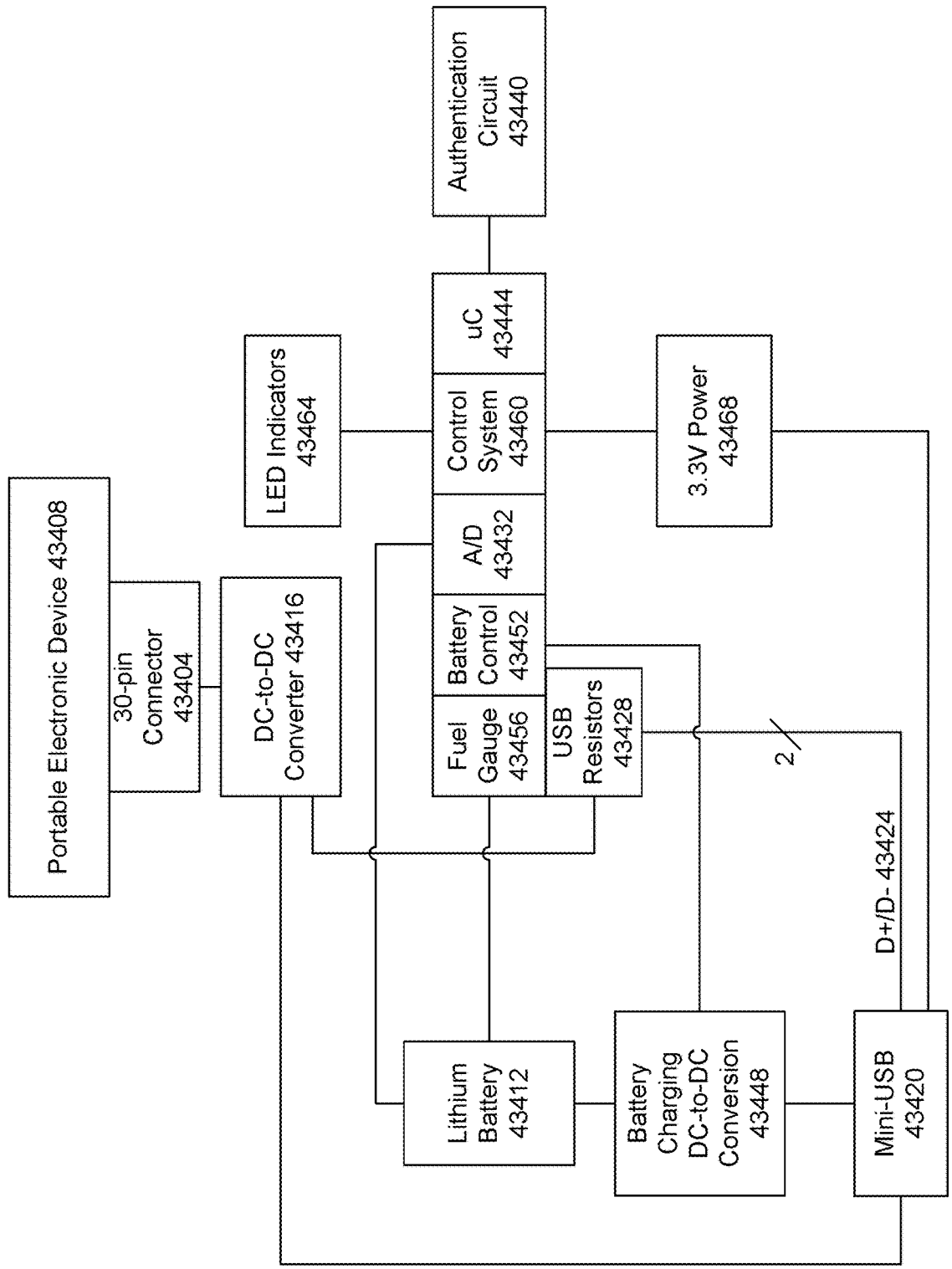
FIG. 74 shows a circuit block diagram for electronic circuitry of the portable electronic device case.

FIG. 74 shows a circuit block diagram for the case. This diagram shows more details of circuitry 42616 and components of lower case portion 42612. The circuit blocks in this figure implement the functionality and modes of the case described above.

The case has a connector 43404 for connecting to a portable electronic device 43408 which the case is designed for. In a specific implementation, the portable electronic device is a smartphone having a 30-pin connector. So, the case has a corresponding 30-pin inner connector that fits into the phone's connector. For example, the case includes a male inner connector that fits into the phone's female connector. In other implementations, however, the case's inner connector can have any number or combination of pins and shapes in order to interface with the portable electronic device that the case is designed for.

Through connector 43404, the case circuitry interfaces with the phone, such as for charging the phone's battery and synchronizing. To charge the phone battery, power from a lithium battery 43412 is passed through a DC-to-DC converter block 43416 and connector 43404 to the phone. To synchronize data, input-output (I/O) via a mini-USB connector 43420 is passed through wires 43424 (i.e., differential D+ and D− signals) through USB resistors 43428, converter 43416, connector 43404 to the phone.

An implementation of the case uses a mini-USB connector (e.g., USB mini-B). However other connectors may be used such as USB type A, type B, mini-A, micro-AB, or micro-B. Also, other types of connectors such as FireWire (i.e., an IEEE 1394 interface, i.LINK, or Lynx), eSATA, or a proprietary connector may be used instead or in addition.

Through an analog-to-digital (A/D) converter circuit 43432, analog data can be converted to digital data for the phone. Digital data from the phone can be converted into analog form for further processing, or vice versa. For example, A/D converter circuit 43432 is connected to battery 43412 and is used to collect analog measurement information (e.g., voltage level) about the battery. This information is converted to digital form by the A/D converter and used in the fuel gauge algorithms (see discussion on fuel gauge mode above) to determine and indicate the charge level of the battery.

In a specific implementation, when an electronic device is connected to the case, the electronic device looks for an authentication or handshaking signal (e.g., sending of an authentication code). If the device does not receive an proper authentication, the device may display a message (e.g., nag message) that the case is not an authorized peripheral for the device or the device can simply not allow the case circuitry to interface with the phone (e.g., not allow charging or synchronization).

An authentication circuit 43440 can be included in the circuitry to provide proper authentication to the electronic device. This authentication circuit can connect to the other circuitry of the case through a microcontroller (uC) 43444 interface. In a specific implementation, microcontroller 43444 is the ATMega32 from Atmel.

When the authentication circuit is present, the user, for example, will not see a nag message on the phone. In an implementation, when the authentication circuit is not present, the user will see a nag message, but afterwards, the case will still function (e.g., provide the functionality described in the tables in FIGS. 67 and 68) with the device.

The case has lithium-ion polymer battery 43412 to provide extra charge and capacity for the phone. See above discussion for more detail on the functionality. In an implementation, case battery 43412 has a nominal capacity of 1390 milliamp-hours. The capacity can range from about 1330 milliamp-hours to about 1490 milliamp-hours. In comparison, the electronic device's battery capacity is approximately 1150 milliamp-hours. So, with the addition of case battery 43412, the device's battery life will approximately double.

In a specific implementation, the case battery has a length of about 74 millimeters, a width of about 41 millimeters, and a thickness of about 4.2 millimeters (after swelling). A weight of the battery is about 28 grams. A discharging operating temperature for the battery is about −20 degrees Celsius to about 60 degrees Celsius. The battery can be recharged using a standard charging current (665 milliamps at 4.2 volts) in about 2.5 hours or a rapid charging current (1330 milliamps at 4.2 volts) in about 1.5 hours. The battery provides an output voltage of about 3.7 volts.

The case includes circuitry for charging case battery 43412. Power is supplied through USB connector 43420 to a battery charging circuit 43448, which is connected to the battery. The battery charging circuit supplies the voltages and currents to the battery for charging, and can detect when the battery is fully charged (at which point circuit 43448 stops charging the battery). The charging circuit can also include a DC-to-DC converter to convert the voltage received at the USB connector (e.g., 5 volts) to the voltage used to charge the battery (e.g., 4.2 volts). Battery charging circuit 43448 may be implemented using an integrated circuit manufactured, for example, by Linear Technology Corporation, Maxim Integrated Products, Incorporated, or National Semiconductor Corporation.

A battery control circuit 43452 is connected to battery charging circuit 43448 to control its operation. For example, the battery control circuit can direct the charging circuit to charge the battery or stop charging the battery, such as when the user wants to enter the synchronization mode.

Via DC-to-DC converter 43416, case battery 43412 is used to charge the battery of the electronic device. Converter 43416 is used to convert the output voltage of the battery (e.g., 3.7 volts) to the voltage level used by the phone (e.g., 3.3 volts or 5 volts). In a specific implementation, the phone uses 5 volts and converter 43416 converts the output voltage of the battery to 5 volts.

A fuel gauge circuit 43456 is connected to case battery 43412, which will determine a charge level of the battery. The determined charge level is passed to a control system circuit 43460, which appropriately lights LED indicators 43464 to show the user the charge level. In an implementation, the control system uses a 3.3 volt level, and there is a 3.3 volt power converter circuit 43468 that takes power (e.g., 5 volts) from the USB and converts it to the desired level.

Control system circuit 43460 controls the case's overall operational modes as described above. For example, the control system controls the battery charging, battery level, authentication, and synchronization operations. The control system can be implemented using a microcontroller and firmware. The firmware may be encrypted. The microcontroller will decrypt the firmware before utilizing it.

Some examples of microcontrollers include processors from Intel Corporation, International Business Machines Corporation, MIPS Technology Incorporated, ARM Limited, and Atmel Corporation. For example, Atmel manufactures the AVR® 8-bit microcontroller products, which is described in data sheets and other product literature published by Atmel, which is incorporated by reference along with all other references cited in this application. Such a controller can be used to control operation of the case.

The figure shows a functional block diagram that can be implemented using any number of integrated circuits and any number of circuit boards. For example, battery charging circuit 3448 can be one integrated circuit. Authentication circuit 43440 can be another integrated circuit. The fuel gauge, battery control, A/D, control system, and UC can be implemented using a single integrated circuit. The integrated circuit or chips can be placed on one or more printed circuit boards (PCBs) connected by wiring. The architecture may depend on many factors, such as the cost, availability, and time to market.

Figure 75:
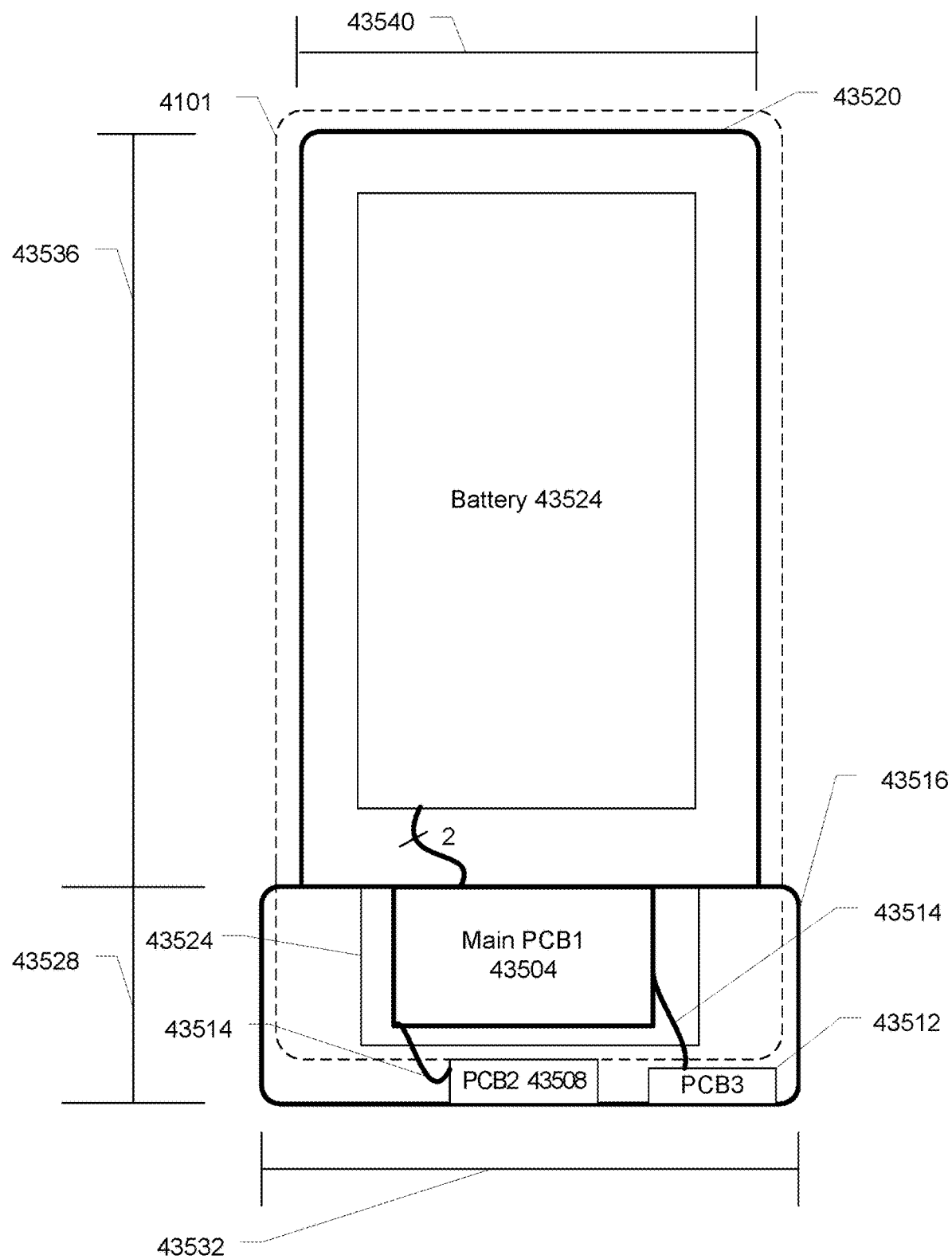
FIG. 75 shows a layout view of the components for the lower case portion, as viewed from a back side of the lower case portion.

FIG. 75 shows a layout view of the components for the lower case portion, as viewed from a back of the lower case portion. There are three PCBs, PCB1 43504, PCB2 43508, and PCB3 43512. PCB1 43504 is the main PCB, which contains the controller, firmware, authentication chip, battery charging circuit, and LEDs. PCB2 43508 contains the case connector (e.g., 30 pin connector). PCB3 43512 contains the USB connector. PCB1 43504 connects to PCB2 43508 through a cable 43514. PCB1 43504 connects to PCB3 43512 through a cable 43514.

In a specific implementation, cables 43514 are flexible printed circuit (FlexPC) cables. In another implementation, cables 43514 are not flexible printed circuit cables, but other connections or cabling such as ribbon cables or wires.

A first section 43516 of the lower case portion holds the PCBs, while a second section 3520 holds a case battery 43524. The case battery is connected to PCB1 43504. In an implementation, the battery has plus (e.g., red) and minus (e.g., black) wires that are connected to the appropriate points of PCB1 43504. Below the battery, on the other side of the lower case portion, is the portable electronic device 4101 (indicated with broken lines). Note that the portable electronic device extends below PCB1 43504.

Figure 76:
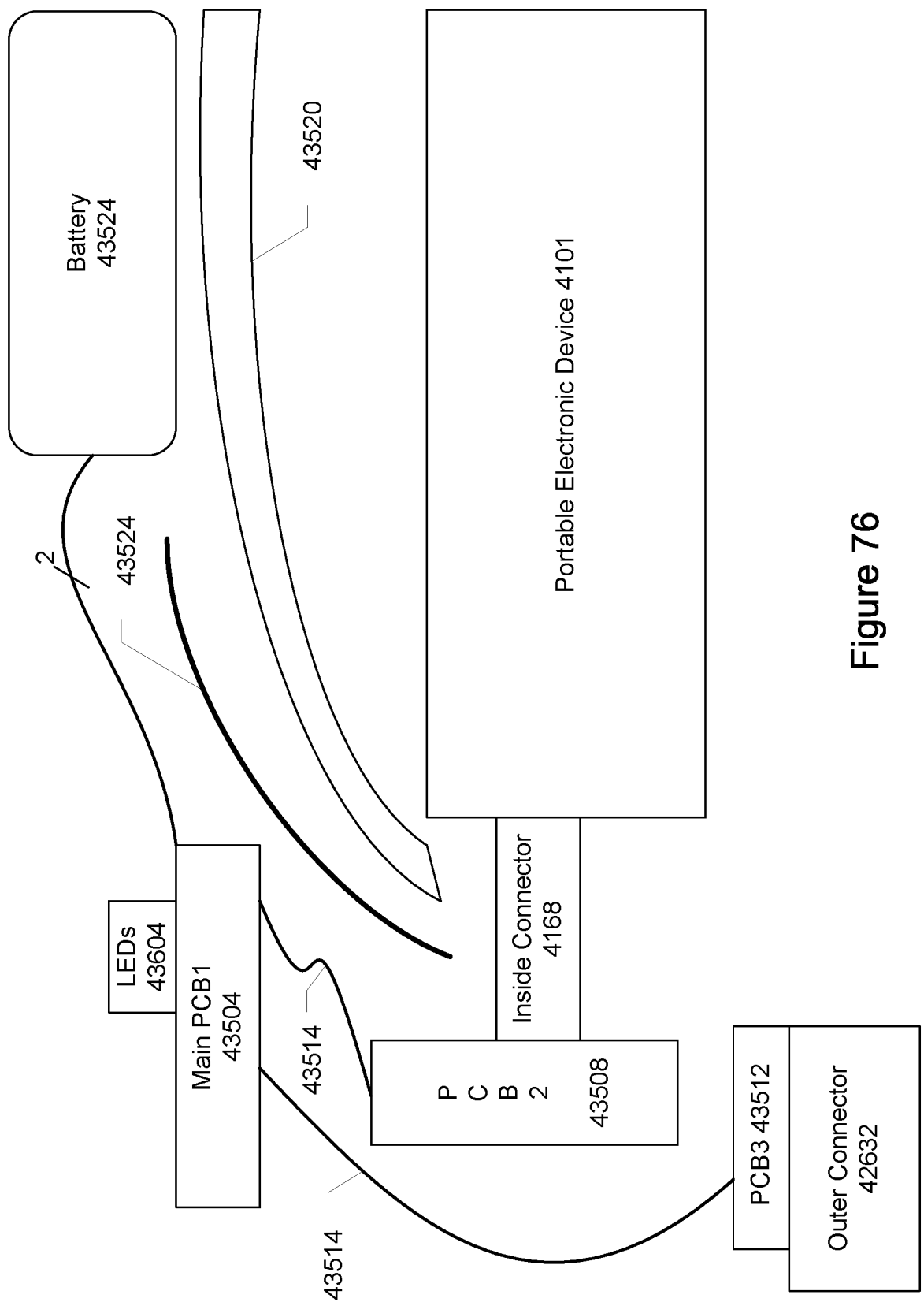
FIG. 76 shows a cross section of a portion of the lower case portion.

Beneath PCB1 43504 is a shield 43524. FIG. 76 shows a cross section of first section 3516. As shown, the shield is between PCB1 43504 and the portable electronic device. In particular, the shield is between the case circuitry and the base front surface. This copper shield serves to protect the portable electronic device from any electrical or radio interference (RF) generated by PCB1 43504, and vice versa. When there is less interference or noise interfering with the portable electronic device's operation, the portable electronic device will have better operating characteristics. For example, a phone will have better reception and transmission (e.g., less drop outs and voice conversations will be clearer).

In a specific implementation, shield 43524 is made of copper, but in other implementations, this shield can be made of any conductive materials such as aluminum, platinum, gold, or silver.

In a specific implementation, a length 43528 and width 43532 of the first section is about 35 and 63 millimeters. An area of the first section is about 2205 square millimeters. A length 43536 and width 43540 of the second section is about 87 and 54 millimeters. An area of the second section is about 4698 square millimeters. A ratio of the first section to the second section is about 0.469 (i.e., 2205 square millimeters/ 4698 square millimeters). In other implementations, however, the ratio can be in the range from about 0.333 to about 0.6. Generally, the greater the ratio, the battery will be larger and can provide longer battery life.

As shown in FIG. 76, PCB1 43504 is placed in a first orientation (e.g., horizontal), while PCB2 43508 is positioned in a second orientation, which is transverse (e.g., vertical) to PCB1 43504. PCB3 43512 is also positioned in the first orientation.

PCB2 43508 has the internal case connector 4168 (e.g., 30-pin connector), which is connected to the portable electronic device. PCB3 43512 has the USB or an outer connector 42632.

Portable electronic device 4101 is connected to inner connector 4168, which is connected to the PCB2. The case also has outer connector 42632 to allow connections to a power source or computer. The outer connector is connected to the PCB3. Both the PCB2 and PCB3 are connected to the main PCB1 through cables 43514. The main PCB1 also includes LEDs 43604.

The PCBs and shield are attached to base lower back 43704 of the lower case portion. The lower case portion also includes a base front back 43708 which covers the PCBs and shields. The base lower back and base front back form a space which encases the PCBs, shield, and other components of the case. The base lower back and base front back can be made of plastic.

Figure 77:
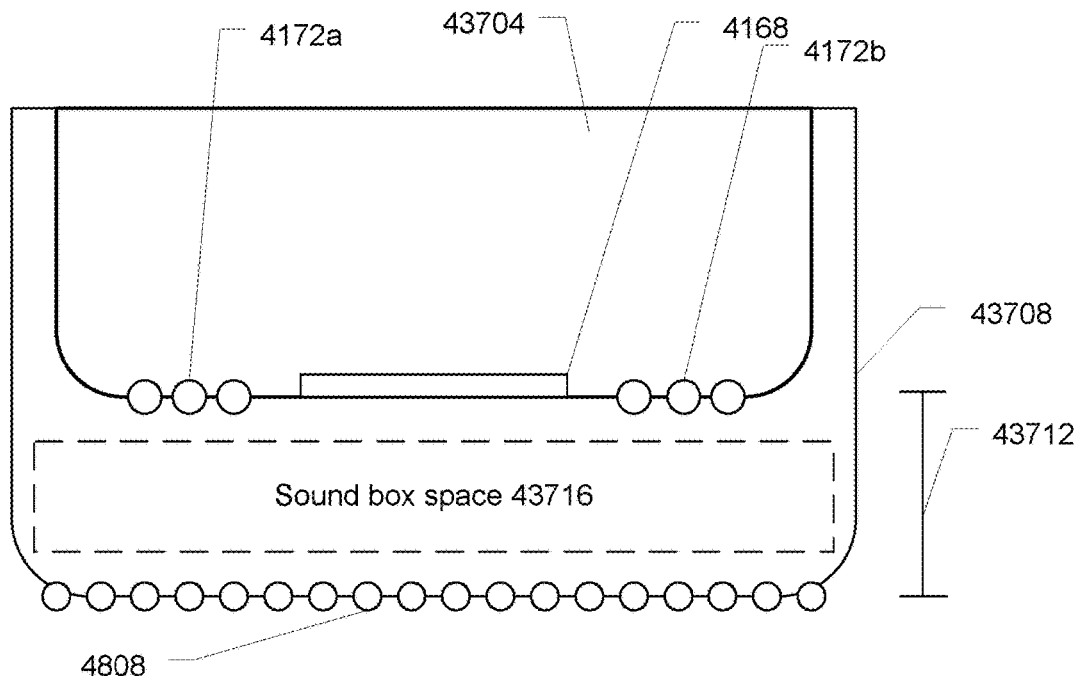
FIG. 77 shows a top view of a sound box portion of the case.

FIG. 77 shows a top view of a sound box formed by base lower back 43704 and base front back 43708. In addition to housing the circuitry, the base lower back and base front back provides a sound box, which enhances the sound and audio characteristics of the portable electronic device.

In particular, base lower back 43704 has audio openings (for a speaker or microphone, or both) 4172a and 4172b. The openings can be for two channels for stereo sound. See FIG. 41B which show the speaker openings for a specific implementation.

A base front back 43708 has audio openings or grille 4808. See FIG. 48 for a specific implementation. A distance 43712 between the audio openings in the base lower back and base front back is about 12 millimeters. Between the openings in the base lower back and base front back is the enclosure space that enhances the sound. This space may be referred to as a sound box space 43716. For example, this space helps deepen the bass (e.g., better low frequency response) of the audio and generally enhances the sound.

Distance 43712 can be any value, such as 9, 10, 11, 13, 14, 15, 16, or greater than 20 millimeters. The greater distance 43712 is, the better the low frequency response generally will be because the enclosure is larger.

Generally, it is desirable to locate the openings such that they are aligned, parallel to, or coaxial with a direction that the sound is traveling. This helps to improve the transmission quality and clarity of the sound.

In a specific implementation, openings 4172a and 4172b and grille 4808 are located near the case circuitry. This location helps heat released from the circuit escape from the case.

These audio openings may be of any size, any shape, any combination of sizes, or any combination of shapes. Some examples of shapes include circles, squares, rectangles, crescents, and ovals. An opening may be bounded on all sides by the case. Or, an opening may be partially bounded by the case. There may be any number of openings and these openings may be located anywhere on the case.

Figure 78:
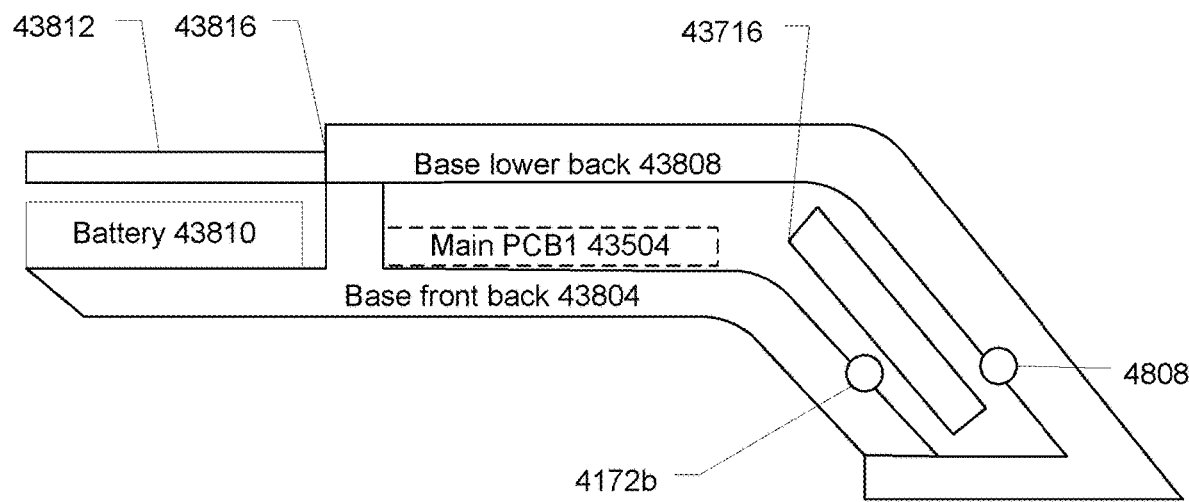
FIG. 78 shows a cross section of the sound box.

FIG. 78 shows a side view of the sound box formed by a base front back 43804 and a base lower back 43808. FIG. 78 shows sound box 43716 and main PCB1 43504 enclosed between base front back 43804 and base lower back 43808. A case battery 43810 is between base front back 43804 and a base upper back 43812.

Base lower back 43808 and base upper back 43812 meet at a seam line 43816 and are not flush with each other. The base lower back rises slightly above the base upper back so that when the upper case portion and lower case portions meet, the exterior surfaces of the upper case portion and the base lower back become flush with each other.

In a specific implementation, the case material is hard or rigid plastic or a nonelastomeric material such as a polycarbonate (e.g., Bayer PC2405 or Makrolon® by Bayer Material Science LLC). The case material can be a plastic such as a high density polyethylene, low density polyethylene, thermoplastic, amorphous thermoplastic, or other resin or polymer.

Some examples of thermoplastics includes acrylonitrile butadiene styrene (ABS), acrylic, celluloid, cellulose acetate, ethylene-vinyl acetate (EVA), ethylene vinyl alcohol (EVOH), fluoroplastics, ionomers, Kydex®, liquid crystal polymer (LCP), polyacetal (POM or acetal), polyacrylates (acrylic), polyacrylonitrile (PAN or acrylonitrile), polyamide (PA or nylon), polyamide-imide (PAI), polyaryletherketone (PAEK or ketone), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polyhydroxyalkanoates (PHAs), polyketone (PK), polyester, polyethylene (PE), polyetheretherketone (PEEK), polyetherketoneketone (PEKK), polyetherimide (PEI), polyethersulfone (PES), polysulfone, polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), and styrene-acrylonitrile (SAN).

A soft-touch or rubberized coating may be applied to the case surface to help improve a user's grip on the case. The soft-touch coating can make the case surface tacky or slightly tacky. In an implementation, both upper and lower case portions are made from the same material. However, in other implementations, the upper and lower case portions may be made of different types of materials (e.g., different types of plastics). In other implementations, the case material may be (or include), rather than a hard or rigid plastic, a compliant or rubber-like material such as a gel, elastomeric, silicone, or rubber.

When a hard plastic is used, some portions of the case can be polished to have a high gloss finish (e.g., similar to a glossy black piano), while other portions will have the soft-touch coating (which is a matte finish). In other implementations, all surfaces can have a high gloss finish. Or, all surfaces can be coated with the soft-touch coating.

In an implementation, base front surface 4164 (FIG. 50), upper interior surface 4916 (FIG. 49), inserts 41004*a* and 41004*b* (FIG. 50), have a high gloss finish. Surfaces 41104 (FIG. 51), 41212 (FIG. 52), 41208 (FIG. 52), 43812 (FIG. 50), 4408 (FIG. 44), 4412*a-e* (FIG. 44), 4420 (FIG. 52), 43816 (FIG. 48), 43818 (FIG. 47), 43827 (FIG. 45), and 43831 (FIG. 46) have the soft-touch coating.

The high gloss finish can be obtained or achieved by polishing, sanding, rubbing, or buffing the surface with a relatively fine grit material (e.g., sandpaper, polishing cloth, or paste). One can polish the plastic with successively finer grit materials until the desired finish is obtained. Polishing can be performed using a buffing machine, such as a rotary buffing machine or other buffing machine.

The soft-touch coating can be applied by, for example, spraying, brushing, or painting an appropriate coating on the desired surfaces. In a specific implementation, the coating has a thickness of about 0.1 millimeters. But the thickness of the coating can vary, for example, due to manufacturing variations. In other implementations, for example, the thickness can be from about 0.05 millimeters to about 0.3 millimeters. In further implementations, the coating can be less than 0.05 millimeters or greater than 0.3 millimeters. Generally, the surfaces where the soft-touch coating will be applied do not need to be polished before the coating is applied. However, it may be desirable to buff slightly before applying the coating to ensure the surface is smooth (but not necessarily a high gloss finish) before applying the coating.

As shown in FIG. 50, base front surface 4164 may include strips 4160*a* and 4160*b*, which are parallel to each other and vertical (when viewing the case in a portrait orientation). As discussed above, these strips help protect the finish of the back of the portable electronic device.

In other implementations, the case can be a material other than plastic. Some examples of case materials include metal (e.g., stainless steel or titanium), glass, transparent or translucent plastic, sapphire, diamond, leather, vinyl, quartz, granite, and many others.

Some specific flows and techniques are described for making a case of the invention in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figure 79:
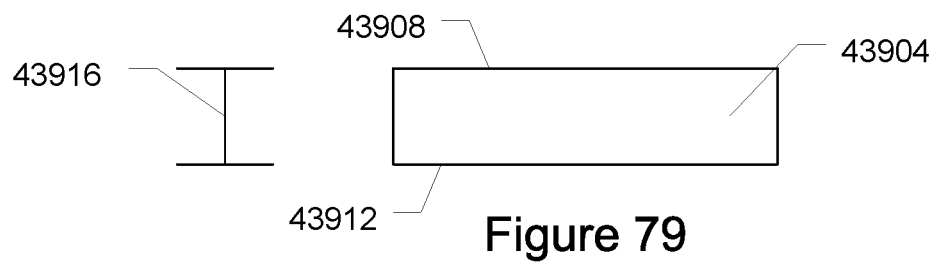
FIGS. 79-82 show steps in a process of making a flush indicator light covering for the case.

In an implementation, the back of the lower case portion has a flush-mounted case button and flush lighting indicators. FIGS. 79-82 show steps in a process for making a flush lighting indicator on a surface of the case (e.g., 4412*a-e* of FIG. 44). In an implementation, the process includes:

1. Providing a starting material having a uniform thickness. As shown in FIG. 79, the case material is a plastic 43904 having a certain thickness. This plastic is about 95 percent or greater opaque, which means visible light (e.g., LED light) will not shine through it easily. The plastic can be less than 95 percent opaque. For example, the material may be transparent or translucent.

The plastic has two sides, a first side 43908 and a second side 43912. The first side is the side which the user will see and can touch. The second side is the underside, which faces the circuitry and is generally hidden from the user. Between the first side and second side is a thickness 43916. In a specific implementation, thickness 43916 is about 1.4 millimeters. Thickness 43916 can vary. In other implementations, for example, thickness 43916 is from about 0.95 millimeters to about 2 millimeters. In further implementations, the thickness is less than 0.95 millimeters or greater than 2 millimeters.

Figure 80:
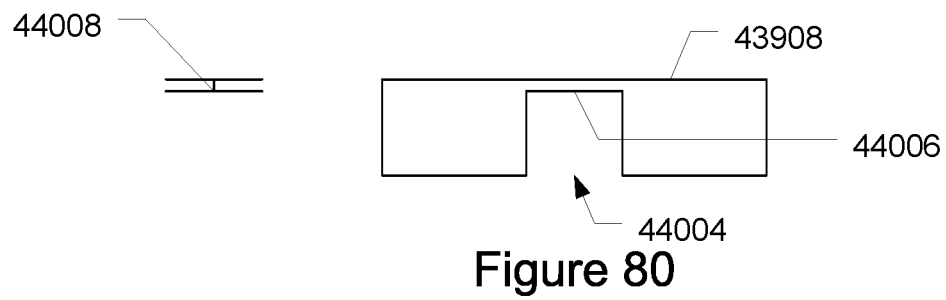

2. Forming a cavity in the material. As shown in FIG. 80, a cavity 44004 (e.g., trench or lacuna) is formed in the starting material. Cavity 44004 is a partial opening and does not go through the entire thickness of material 43904. The cavity may be formed using any process for creating an opening including molding, melting, drilling, and etching. For example, cavity 44004 is created by drilling into the plastic from the second side to the first side but not through the first side.

A thickness from a bottom 44006 of the cavity to the first side is a thickness 44008. In a specific implementation, thickness 44008 is about 0.4 millimeters. However, thickness 44008 can vary depending, for example, on manufacturing variations. For example, the thickness can vary from about 0.2 millimeters to about 0.7 millimeters.

A ratio of thickness 44008 to thickness 43916 is about 0.286 (i.e., 0.4 millimeters/1.4 millimeters). If thickness 44008 remains at 0.4 millimeters, the ratio can vary depending on the thickness 43916. As thickness 43916 increases, the ratio will decrease. In other implementations, a ratio of thickness 44008 to thickness 43916 is about 0.05, 0.12, 0.15, 0.18, 0.20, 0.22, 0.28, 0.32, 0.33, 0.38, or 0.42, or any other ratio.

Thickness 44008 will be sufficiently thin so the plastic will be much less than 95 percent opaque, so light can very easily pass through a thin portion 44008, but not through the thick portion 43916. The light will be visible from the first side through thickness 44008. For example, for thickness 44008, the opacity can be in a range from about 5 percent to about 30 percent.

The degree of opaqueness can be varied by varying a thickness 44008. A thinner 44008 will generally allow greater light transmission, while a thicker 44008 will block light transmission. Thus, depending on the material, and by selecting an appropriate thickness 44008, the brightness of the indicator lights can be adjusted as desired.

Figure 83:
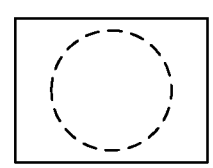
FIG. 83 shows a top view of the flush indicator light covering.

In an implementation, the cavity is circular to create a circular indicator light, such as shown in FIG. 83. But in other implementations, the cavity can be other shapes. For example, the cavity shape can be a triangle, trapezoid, square, rectangle, oval, pentagon, hexagon, octagon, or other.

Figure 81:
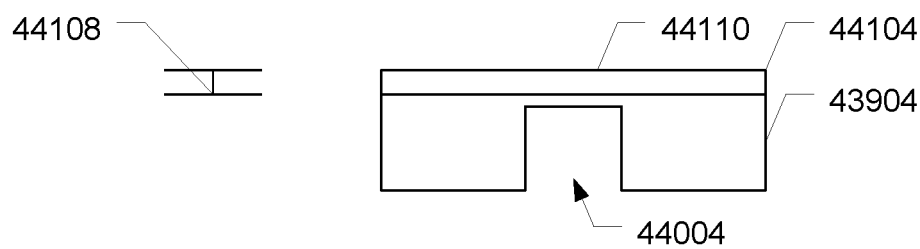

3. Coating one side of the material. As shown in FIG. 81, the first side of the plastic, which is the side opposite the opening, is applied (e.g., painted, sprayed, or brushed on) with a coating 44104. The coating sprayed has a thickness 44108, less than thickness 43916. In a specific implementation, the coating is sprayed over the first side of the plastic including the surface above the opening. Before and after applying the coating, the exterior surface (43908 and 44104) of the case is smooth.

In a specific implementation, the coating is clear and allows visible light from the second side to pass through and be visible from the first side. Coating 44104 is the same soft-touch coating that is applied to the exterior of the rest of the case. This soft-touch coating allows visible light from the second side to pass through and be visible from the first side. In another specific implementation, coating thickness 44108 and the coating of the case both have the same thickness. In this specific implementation, coating 44108 and the coating of the case have a thickness of about 0.1 millimeters. As discussed above, this thickness may vary.

Figure 82:
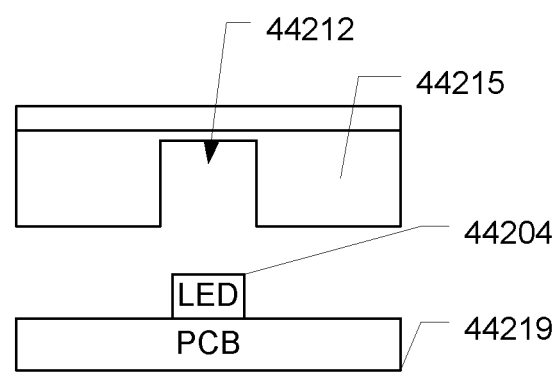

4. Positioning the cavity over a lighting source. As shown in FIG. 82, the opening is positioned above a lighting source 44204 such as an LED. The opening can be above the lighting source (e.g., offset or to the side) as long as light from the light source can pass through the opening and be visible from the first side. In a specific implementation, the opening is directly above the lighting source. In another specific implementation, the lighting source is positioned facing toward the cavity such that when the lighting source emits visible light, it passes through thickness 44008 and 44108, but not thickness 43916, to the first side.

When the LED lights up, the light from the second side is visible through the opening and coating (44212) from the first side. But light is not visible through other portions (44215) where the case material is thicker. The LED may be on a printed circuit board PCB 44219.

FIG. 83 shows a top view of the lighting indicator from the first side of the plastic. The lighting indicator is shown using broken lines to indicate it is hidden when it is not lighted. Specifically, when LED 44204 lights up, a user can see light through the opening and coating. The shape of the cavity will be the shape of the light. With the flush lighting cover of the invention, when the LED is not lighted up, the user may not even realize that the lighting indicator is there. When not lighted, the surface of the case over the opening (44212) appears the same as the thicker portions (44215).

Therefore, the lighting indicator does not project out from the surface, resulting in a smooth back surface and a smooth tactile feel (e.g., completely flush). In other implementations, the lighting indicators may bulge above or be recessed in the surface of the case.

Figure 84:
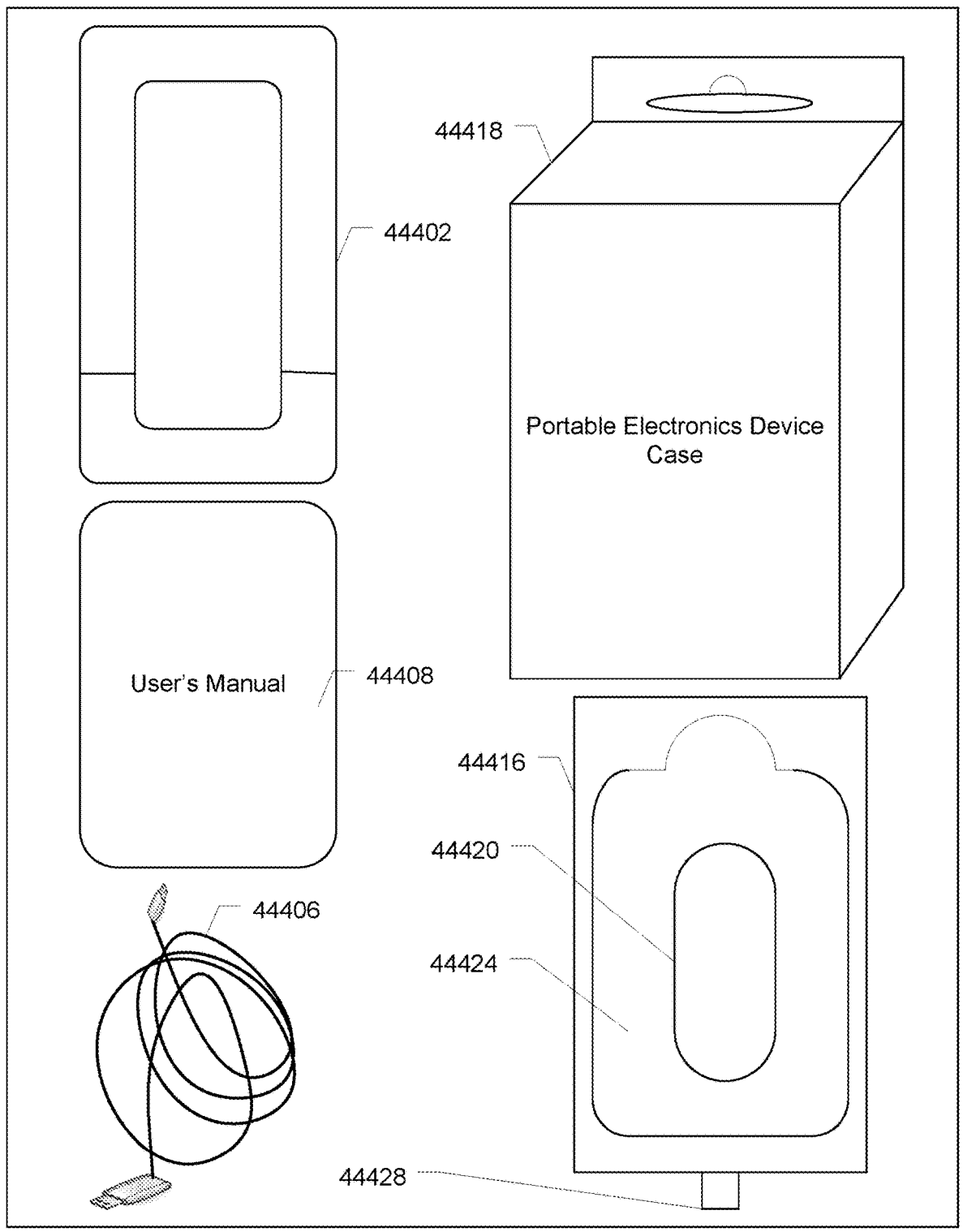
FIG. 84 shows a kit for a portable electronic case with a battery including a tray to hold the case and a cable.

FIG. 84 shows a kit including a portable electronic device case with a battery (as described above). The kit includes a portable electronic device battery case 44402, a cable 44406 (e.g., USB cable), a user manual 44408, a tray 44416, and a box 44418. The portable electronic device battery case can be a case as described in this application. The tray holds the case, cable, and user manual. The tray with components slides into the box. The user manual describes the features of the case and how to use them. The cable is for charging the case and also for synchronizing. The cable can be a USB or a universal serial bus cable having a first end with a USB Type A plug connector and a second end having USB Mini-B plug connector.

Figure 85:
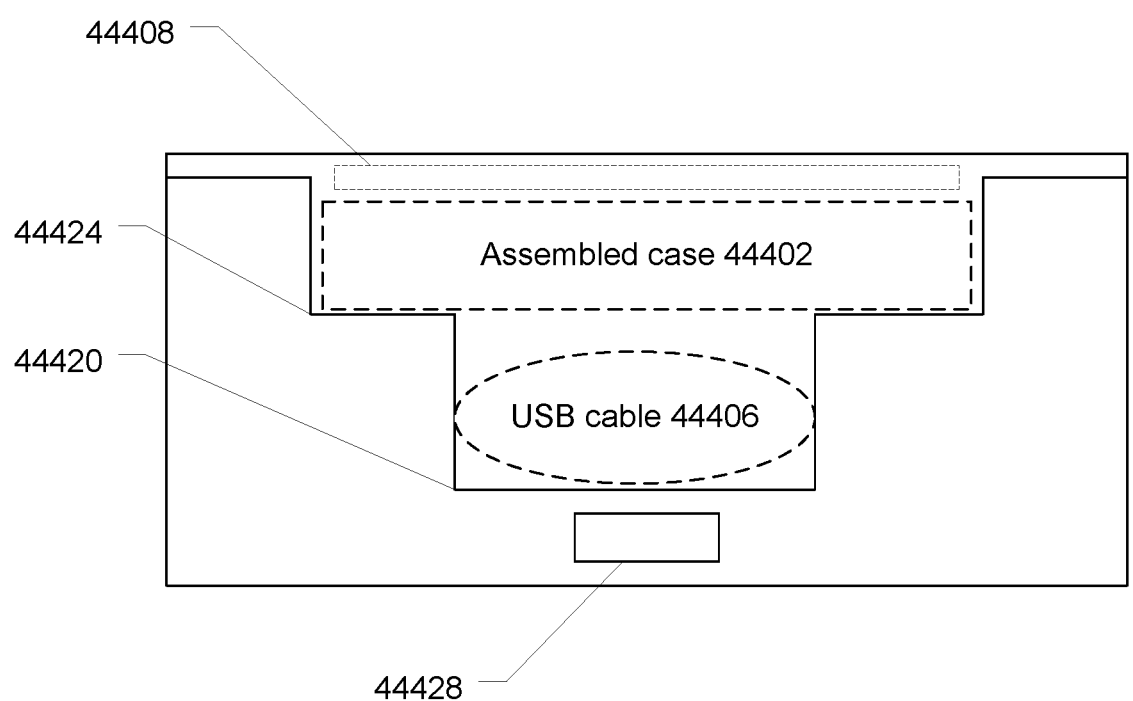
FIG. 85 shows a cross section of an implementation of a tray for the kit. This tray has multilevel compartments.

The tray is designed with compartments to hold the case, cable, and user manual neatly. FIG. 84 shows a top view of the tray and multilevel compartments, while FIG. 85 shows a cross-sectional view. The shape and depth of each compartment is customized for the component which it will hold (i.e., case or cable). In other implementations, the trays are not multileveled, but on a single level or on the same level, so that each item is accessible without removing another item first. The tray can be made of a foam material (e.g., black foam) or nonfoam material.

The tray has a first level compartment 44420 to hold the cable. Above the first level compartment is a second level compartment 44424 to hold the case. The second level compartment is larger in area than the first level compartment. Generally, a bigger or larger area compartment is needed to store the case than the cable. The user manual can be placed between the case and cable compartments. Or the user manual may be placed over both the case and cable such as shown in FIG. 85.

On a side of the tray (e.g., top or bottom) is a loop 44428. When assembling the kit, the tray is inserted into the box so that loop 44428 is immediately visible and accessible to the user when the user opens the box. After the user opens the box top, the user will see loop 44428 and can easily grab the loop to pull the tray out of the box.

In other implementations, however, there may be any number of cavities with different arrangements. In another specific implementation, the tray has a separate cavity (e.g., on a single level) for the user manual, case, and cable. The cavity levels allow the kit to have a thin and organized packaging.

The kit was described as having the box, user manual, cable, and tray. In other implementations, however, components of the kit can include any combinations of these components and can contain more components. For example, a kit can contain two USB cables, a tray, and a box.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A method comprising:
providing a base layer of a case for a portable electronic device, wherein the base layer has an interior side, an exterior side, and a base layer thickness between the interior and exterior sides, and wherein the base layer is oriented in a portrait orientation in a first direction and a landscape, orientation in a second direction;
providing sidewalk transverse to the base layer, wherein the sidewalk extend from the base layer, and wherein the sidewalls and interior side form a compartment configured to reversibly receive a portable electronic device;
providing an opening in the base layer, wherein the opening extends from the interior side to the exterior side of the base layer, and wherein the opening has an opening length and opening width, wherein the opening width is longer than the opening length; and coupling a ring to the opening, wherein the ring comprises a dark color, wherein the ring comprises a ring inner length and a ring inner width, and wherein the ring inner width is longer than the ring inner length, the ring inner width increases in a direction from the interior side to the exterior side of the base layer, and the ring inner length increases in a direction from the interior side to the exterior side of the base layer.

2. A protective case for reversibly receiving and retaining a portable electronic device, the case comprising:

a base layer that has an interior side, an exterior side, and a base layer thickness between the interior and exterior sides, wherein the base layer is oriented in a portrait orientation in a first direction and a landscape orientation in a second direction;

sidewalk transverse to the base layer, wherein the sidewalk extend fro the base layer, and wherein the sidewalk and interior side form a compartment configured to reversibly receive a portable electronic device;

an opening in the base hoer, wherein the opening extends from the interior side to the exterior side of the base layer, and wherein the opening has an opening length and opening width, wherein the opening width is longer than the opening length; and a ring coupled to the opening in the base layer, wherein the ring is a dark color, wherein the ring comprises a ring inner length and a ring inner width, and wherein the ring inner width is greater than the ring inner length, the ring inner width increases in a direction from the interior side to the exterior side of the base layer, and the ring inner length increases in a direction from the interior side to the exterior side of the base layer.

3. The case of claim 2 wherein the ring inner width is less than the opening width, and the ring inner length is less than the opening length.

4. The case of claim 2 wherein the ring has a ring outer width that is greater than the ring inner width, and the ring has a ring outer length that is greater than the ring inner length.

5. The case of claim 2 wherein an edging of the ring is rounded.

6. The case of claim 2 Wherein the ring comprises a ring outer length and a ring outer width, and wherein the ring outer length is about constant in a direction from the interior side to the exterior side of the base layer and the ring outer width is about constant in a direction from the interior side to the exterior side of the base layer.

7. The case of claim 2 wherein the ring comprises a ring outer length and a ring outer width, and wherein at least a portion of the ring outer width is greater than a minimum width of the opening width and at least a portion of a ring outer length is greater than a minimum length of the opening length.

8. The case of claim 2 wherein the exterior side of the base layer is a black color and the ring is a black color.

9. The case of claim 2 wherein the ring is a first color, the exterior side of the base layer is a second color, and the first color is darker than the second color.

10. The case of claim 2 wherein the ring is a first color, the exterior side of the base layer is a second color, and the first color is different from the second color.

* * * * *